United States Patent
Long et al.

(10) Patent No.: US 11,433,601 B2
(45) Date of Patent: Sep. 6, 2022

(54) SYNTHESIS AND 3D PRINTING OF PHOTOCURABLE COLLOIDS

(71) Applicant: VIRGINIA TECH INTELLECTUAL PROPERTIES, INC., Blacksburg, VA (US)

(72) Inventors: Timothy E. Long, Blacksburg, VA (US); Viswanath Meenakshisundaram, Blacksburg, VA (US); Philip J. Scott, Blacksburg, VA (US); Christopher B. Williams, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 0 days.

(21) Appl. No.: 17/442,807

(22) PCT Filed: Mar. 26, 2020

(86) PCT No.: PCT/US2020/024793
§ 371 (c)(1),
(2) Date: Sep. 24, 2021

(87) PCT Pub. No.: WO2020/198404
PCT Pub. Date: Oct. 1, 2020

(65) Prior Publication Data
US 2022/0088851 A1    Mar. 24, 2022

Related U.S. Application Data

(60) Provisional application No. 62/823,478, filed on Mar. 25, 2019.

(51) Int. Cl.
| | |
|---|---|
| C08K 3/36 | (2006.01) |
| C08K 9/10 | (2006.01) |
| C08L 9/06 | (2006.01) |
| B29C 64/124 | (2017.01) |
| B33Y 10/00 | (2015.01) |
| B33Y 70/10 | (2020.01) |

(52) U.S. Cl.
CPC ............ *B29C 64/124* (2017.08); *B33Y 10/00* (2014.12); *B33Y 70/10* (2020.01); *C08K 3/36* (2013.01); *C08K 9/10* (2013.01); *C08L 9/06* (2013.01)

(58) Field of Classification Search
CPC .... C08K 3/36; C08K 9/10; C08L 9/06; B29C 64/124
USPC ......................................................... 264/401
See application file for complete search history.

(56) References Cited

U.S. PATENT DOCUMENTS

| | | | |
|---|---|---|---|
| 6,117,612 A | 9/2000 | Halloran et al. | |
| 6,352,805 B1 | 3/2002 | Taylor et al. | |
| 2014/0035202 A1 | 2/2014 | Southwell et al. | |
| 2015/0290610 A1* | 10/2015 | Roose | C08F 283/008 522/90 |

FOREIGN PATENT DOCUMENTS

| | | |
|---|---|---|
| WO | 2018/035368 A1 | 2/2018 |
| WO | 2019/203646 A1 | 10/2019 |

* cited by examiner

*Primary Examiner* — Deve V Hall
(74) *Attorney, Agent, or Firm* — Innovators Legal

(57) ABSTRACT

Photocurable colloid binders are provided that overcome deficiencies associated with 3D printing of high molecular weight polymers via VAT photopolymerization. Methods of additive manufacturing are also provided using the binders. The approaches described herein effectively decouple the viscosity-molecular weight relationship by synthesizing and processing photo-reactive aqueous colloids that are sequestered within a photocrosslinkable scaffold. Sequestering polymers within discrete internal phases prevents interparticle entanglement of the polymer chains, thus ensuring low viscosity. VP of polymer colloids results in a solid green body embedded with high molecular weight polymer particles. A post-processing heated drying step allows the polymers to coalesce and further entangle, forming a semi-interpenetrating network with mechanical performance of the high molecular weight material. The resins can further include inorganic particles such as silica and other ceramics, metal particles, and the like. The coalescence can result in the particles being encapsulated in polymer, yielding unique hybrid materials with tunable properties.

20 Claims, 35 Drawing Sheets

A) Photocurable latex

SYNTHESIS AND 3D PRINTING OF PHOTOCURABLE COLLOIDS

CROSS-REFERENCE TO RELATED APPLICATIONS

This application is the 35 U.S.C. § 371 national stage application of PCT Application No. PCT/US2020/024793, filed Mar. 26, 2020, where the PCT claims priority to, and the benefit of, U.S. provisional application entitled "SYNTHESIS AND 3D PRINTING OF PHOTOCURABLE POLYMER COLLOIDS" having Ser. No. 62/823,478, filed Mar. 25, 2019, both of which are herein incorporated by reference in their entireties.

TECHNICAL FIELD

The present disclosure generally relates to additive manufacturing methods and compositions.

BACKGROUND

Vat photopolymerization (VP), also termed stereolithography, represents a versatile additive manufacturing (AM) platform, which enables the fabrication of precise and complex geometries that are unachievable through conventional polymer processing techniques. However, the printed objects typically comprise highly crosslinked, brittle polymeric networks, which severely restrict their utility as functional parts. VP conventionally delivers patterned UV light in a layer-by-layer fashion with free radical initiated photocuring of liquid precursors. The resulting three-dimensional objects exhibit superior micron-scale resolution, isotropic mechanical properties, and surface finish compared to other AM platforms.[1,2] The typical maximum VP printable viscosity ($\lesssim 10$ Pa·s) dictates the maximum molecular weight of the liquid precursors; the recoating process between the photocuring of each microscale layer is the primary determinant.[3] Successful VP printing demands that each layer provides sufficient modulus to maintain feature fidelity, and our preliminary efforts have identified a necessary storage modulus (typically in the $10^4$-$10^6$ Pa range) to ensure feature fidelity in a printed object.[4-6] VP photocuring conventionally employs covalent crosslinking and high crosslink densities, which result in an imperfect network from low molecular weight precursors, leading to a suitable modulus but inferior mechanical performance (e.g., elasticity). Linear copolymerization of monomers in the VP printing environment, which potentially reduces crosslink density, fails to attain sufficient molecular weight in the printer due to atmospheric oxygen inhibition. Thus, current compositions in the literature do not achieve the prerequisite modulus without high concentrations of a crosslinking reagent.[7]

Compared to other Additive Manufacturing (AM) processes, Vat Photopolymerization (VP) offers superior resolution, accuracy, and surface finish. Despite these advantages, VP has seen limited industrial adoption for fabricating end-use products due to process-imposed material constraints. Specifically, the need for multiple photo-reactive functional groups results in highly cross-linked polymeric networks that do not possess the elasticity and toughness to make them viable for dynamic loading.

Core Problem: VP can only process low viscosity resins, which effectively prohibits the use of polymers with high molecular weights and thus limits parts' mechanical properties.

There remains a need for improved 3D printing methods and compositions and articles made therefrom that overcome the aforementioned deficiencies.

SUMMARY

Photocurable colloid binders are provided that overcome deficiencies associated with 3D printing of high molecular weight polymers via VAT photopolymerization. Methods of additive manufacturing are also provided using the binders. The approaches described herein effectively decouple the viscosity-molecular weight relationship by synthesizing and processing photo-reactive aqueous colloids that are sequestered within a photocrosslinkable scaffold. Sequestering polymers within discrete internal phases prevents inter-particle entanglement of the polymer chains, thus ensuring low viscosity. VP of polymercolloids results in a solid green body embedded with high molecular weight polymer particles. A post-processing heated drying step allows the polymers to coalesce and further entangle, forming a semi-interpenetrating network with mechanical performance of the high molecular weight material. The resins can further include inorganic particles such as silica and other ceramics, metal particles, and the like. The coalescence can result in the particles being encapsulated in polymer, yielding unique hybrid materials with tunable properties.

In some aspects, a method is provided comprising photopolymerizing a resin composition to form a green body, the resin composition comprising a polymer colloid comprising a discontinuous polymer phase comprising polymer particles and a continuous solvent phase; one or more photocrosslinkable scaffold precursors; and a photoinitiator; wherein the green body comprises a photocrosslinked network of the scaffold precursors having the polymer particles entrapped and dispersed therein; drying the green body to produce the article, wherein the drying results in penetration of the polymer from the polymer particles through the scaffold and coalescence of the polymer between the polymer particles.

Other systems, methods, features, and advantages of resins and additive manufacturing methods will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

FIG. 6A is a schematic of photocurable latex, (FIG. 6D) photocured green body, and (FIG. 6G) dried sIPN. (FIG. 6B) TEM of uncured, photocurable latex spin-casted on grid. Apparent aggregation of particles is artifact of sample preparation. (FIG. 6C) DLS confirms consistent particle size and distribution with and without scaffold monomers. (FIG. 6E) TEM of spin-casted photocured latex in green body state (FIG. 6F) Green body G_N^0 across scaffold compositions (FIG. 6H) TEM of spin-casted photocured latex in dried, IPN state. (FIG. 6I) DMA of sIPNs across scaffold composition (FIG. 6J) Tensile performance of photocast & dried IPNs across scaffold compositions. (FIG. 6K) Cyclic loading to confirm elastic deformation and hysteresis (0.2:1 PEGDA:NVP).

(FIG. 7C) Normalization reveals non-uniform scattering inside the projection area. (FIG. 7D) Comparing the desired dimension (box) with the square pillar printed without compensating for the XY-UV scatter highlights that the printed part exceeds design dimensions and has rounded edges with poor edge definition (FIG. 7E) Compensating for XY-UV scatter through iterative optimization of projected intensity distribution results in the fabrication of pillars with improved dimensional accuracy and edge definition. (FIG. 7F) Modeling the energy distribution for specimens printed via scanning process enables control of cure-through and dimensional accuracy by varying scan speed and projection frame rate. The optimized printing parameters selected for this work are predicted to induce a XY-dimensional reduction of 8 μm at a cure depth of 100 μm. Truncating the cure depth by setting the layer thickness to 100 μm results in a cure profile that is similar to the desired profile.

(FIG. 28A) Strain sweep and (FIG. 28B) stress sweep experiments elucidate critical yield strains and stress, respectively.

(FIG. 31C) Cyclic tensile experiments of 30:70 Silica:SBR at a constant (FIG. 31C) and progressive (FIG. 31D) maximum strain elucidate reversible elongation and permanent set.

(FIG. 32A & FIG. 32E) 0:100 Silica:SBR, (FIG. 32B & FIG. 32F) 10:90 Silica:SBR, (FIG. 32C & FIG. 32G) 30:70 Silica:SBR, and (FIG. 32D & FIG. 32H) 50:50 Silica:SBR.

DETAILED DESCRIPTION

Figure 1:
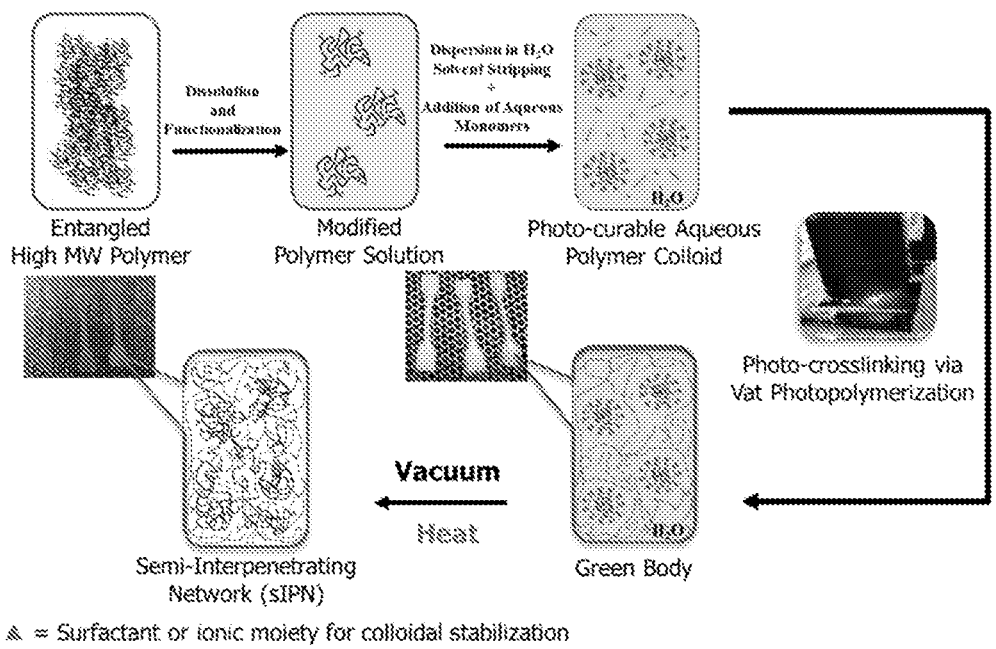
FIG. 1 is a schematic of the synthesis and printing of aqueous polymer colloids according to certain aspects of the disclosure.
Figure 2:
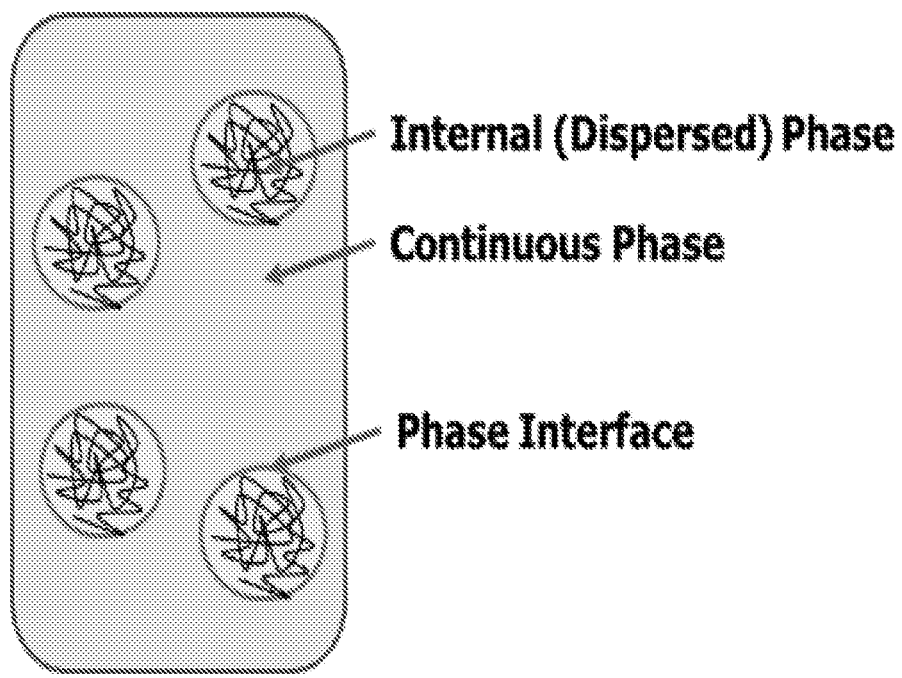
FIG. 2 is a schematic of phase elements of polymer dispersion according to certain aspects of the disclosure.
Figure 3:
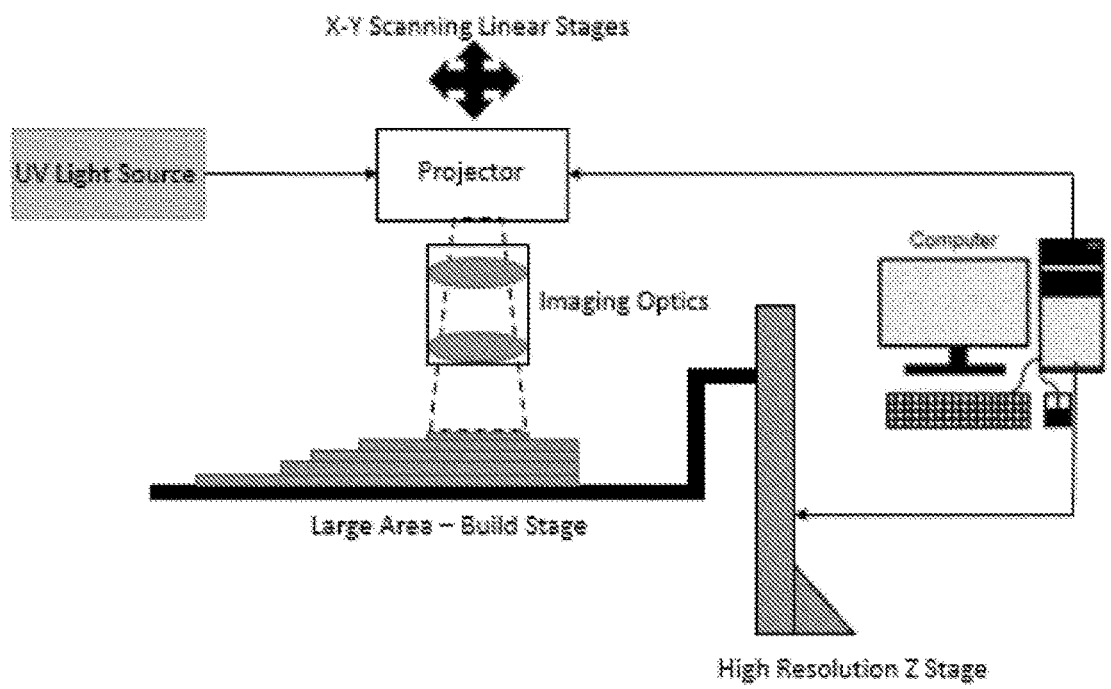
FIG. 3 is a schematic of custom scanning-mask projection vat-photopolymerization (S-MPVP) machine utilized in certain aspects of the disclosure.

In various aspects, binders and methods of additive manufacturing using the binders are provided that overcome one or more of the aforementioned deficiencies. This is accomplished by effectively decoupling the molecular weight from the viscosity of the binder by temporarily dispersing the materials (polymers, inorganic materials, and the like) in a colloidal form. The colloidal morphology effectively decouples the viscosity-molecular weight relationship for polymers with the sequestering of macromolecules into discrete nanoscale particles, which mitigates inter-chain entanglement. The colloidal materials are dispersed in a solvent with photocrosslinkable materials that can be photocrosslinked to form a scaffold, thereby encapsulating the colloidal particles. A scaffold provides structure to the green body, which can then be heated in a subsequent drying step. The drying step results in a coalescence or entanglement of the particles to form a continuous or essentially continuous phase penetrating the scaffold, thereby realizing the mechanical properties of the high molecular weight material from the colloid.

Using the colloidal particles as a vat photopolymerization material and printing platform that employs common polymeric latexes as high molecular weight, low viscosity precursors to address the VP printability-performance paradox. Photocrosslinking of water-soluble network precursors in the continuous phase forms a tunable scaffold that surrounds the latex particles, which yields a robust, freestanding green body object with suitable modulus for VP operations. We employ unprecedented computer-vision-based process parameter generation in the VP printer that compensates for light scattering by the colloid and enables light-based printing of complex shapes without UV absorbers. Subsequent dehydration of printed green bodies under mild conditions promotes 3D coalescence of the latex particles throughout the printed scaffold. This strategy forms a semi-interpenetrating polymer network (sIPN) and harnesses the mechanical properties of the dispersed, high molecular weight polymer without requiring extraordinary polymer thermal stability or disrupting the complex geometric features defined during the VP printing process. This leads to 3D printed elastomers that establish a new benchmark for performance that approaches bulk elastomeric films.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of additive manufacturing, nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

In some instances, units may be used herein that are non-metric or non-SI units. Such units may be, for instance, in U.S. Customary Measures, e.g., as set forth by the National Institute of Standards and Technology, Department of Commerce, United States of America in publications such as NIST HB 44, NIST HB 133, NIST SP 811, NIST SP 1038, NBS Miscellaneous Publication 214, and the like. The units in U.S. Customary Measures are understood to include equivalent dimensions in metric and other units (e.g., a dimension disclosed as "1 inch" is intended to mean an equivalent dimension of "2.5 cm"; a unit disclosed as "1 pcf" is intended to mean an equivalent dimension of 0.157 $kN/m^3$; oar unit disclosed 100° F. is intended to mean an equivalent dimension of 37.8° C.; and the like) as understood by a person of ordinary skill in the art. Conversions between units are readily known to those skilled in the art, for example a temperature in ° F. may be converted to an approximate temperature in ° C. using the well-known formula $T_{(°C.)}=(T_{(°F.)}-32)\times5/9$. Unless otherwise specified, values and measurements referred to herein are based on atmospheric pressure (i.e. one atmosphere) and room temperature.

The use of "for example" or "such as" to list illustrative examples should not be construed to limit the disclosure or the claims to only the listed examples. Thus, "for example" or "such as" can mean "for example, but not limited to" or "such as, but not limited to" and encompasses other similar or equivalent examples. This is not to mean that, in some aspects, such illustrative examples may not be preferred aspects under the circumstances.

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The terms "ambient temperature" and "room temperature," as interchangeably used herein, refer to a temperature between about 18° C. and about 30° C. Usually, room temperature ranges from about 20° C. to about 25° C.

The term "substituted" as used herein, refers to the substitution of one functional group for another functional group, e.g. substituting a hydrocarbon group with another group. Groups can include hydrocarbons, hydrogen atoms, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amines, amino-functional groups, amido-functional groups, and cyano-functional groups; sulphur atoms; and sulphur atom containing groups such as mercapto groups.

The term "polymer," as used herein, is given its ordinary meaning as used in the art, i.e., a molecular structure comprising one or more repeat units (monomers), connected by covalent bonds. The repeat units may all be identical, or in some cases, there may be more than one type of repeat unit present within the polymer. If more than one type of repeat unit is present within the polymer, then the polymer is said to be a "copolymer." It is to be understood that in any embodiment employing a polymer, the polymer being employed may be a copolymer in some cases. The repeat units forming the copolymer may be arranged in any fashion. For example, the repeat units may be arranged in a random order, in an alternating order, or as a block copolymer, i.e., comprising one or more regions each comprising a first repeat unit (e.g., a first block), and one or more regions each comprising a second repeat unit (e.g., a second block), etc. Block copolymers may have two (a diblock copolymer), three (a triblock copolymer), or more numbers of distinct blocks.

The term "polymer backbone" refers to the main chain of the polymer and has one or more types of repeating subunits. One or more side chains can be attached to the polymer backbone and can have a multitude of structures.

The term "branch-chained polymer," as used herein, indicates a polymer which is not linear, that is, one in which the polymer molecule is not composed primarily of a single linear chain of monomers linked end to end. Examples of branched-chain polymers include short-chain branched polymer; a long-chained branched polymer; a hyperbranched polymer, a cyclic polymer; a comb-type polymer; a 3-arm star type polymer, a 4-arm star type polymer, a dendritic polymer, and a combination thereof. Branched-chain polymers differ from cross-linked polymer networks which tend towards an infinite size having interconnected molecules and which are generally not soluble. In some instances, branched polymers have advantageous properties when compared to analogous linear polymers. For example, higher molecular weights of branched-chain polymers can be solubilized more easily than those of corresponding linear polymers. Highly branched polymers include, for example, dendrimers and hyperbranched polymers.

The term "short-chain branched polymer" refers to branched-chain polymers where the individual polymer chains have about 10 to about 500 repeat units. The term "long-chained branched polymer" refers to branched-chain polymers where the individual polymer chains have more than about 500 repeat units.

The term "hyper-branched polymer," refers to polymers or oligomers that have highly branched, three-dimensional, tree-like structures with a plurality of branching points. Hyper-branched polymers can be distinguished from star-type polymers which consist of multiple polymer or oligomer chains (three or more chains) extending from a central core. Some hyperbranched polymers, on the other hand, can be characterized by having a "nucleus" and multiple generations of branches, e.g. one or more generations of branches and an outermost generation of branches that terminate with end group functionalities. As used herein, "nucleus" refers to a central monomer from which branches extend. In some aspects, a hyper-branched polymers can be monodisperse, having a regular and highly symmetric branching structure. Such monodispersed hyper-branched polymers can be referred to in the art as "dendrimers" or "dendritic" polymers.

The term "cyclic polymer," as used herein, refers to a polymer where ends of the polymer backbone are covalently joined to form a large cyclic structure.

The term "comb-type polymer," as used herein, refers to a polymer having two, three, four, or more polymer chains extending from a backbone of a shorter polymer or oligomer.

The term "star type polymer," as used herein, refers to a polymer having three or more polymer or oligomer chains extending from a central core molecule. Star-type polymers can be characterized by the number of "arms" extending from the central core structure. For example. a "3-arm star type polymer" has three polymer chains extending from the central core where a "4-arm star type polymer" has four polymer chains extending from the central core.

As used herein, the term "number average molecular weight" or "$M_n$" refers to the common mean or average of the molecular weights of the individual polymers. The number average molecular weight of a polymer can be determined by gel permeation chromatography, viscometry (Mark-Houwink equation), light scattering, analytical ultracentrifugation, vapor pressure osmometry, end-group titration, and colligative properties.

As used herein, the term "weight average molecular weight" or "$M_w$" is an alternative measure of the molecular weight computed by the formula $$M_w = \frac{\Sigma_i N_i M_i^2}{\Sigma_i N_i M_i}$$

where $N_i$ is the number of molecules having molecular weight $M_i$.

As used herein, the terms "polydispersity" and "polydispersity index" (PDI) refer to the ratio of the weight average to the number average ($M_w/M_n$).

Compared to other Additive Manufacturing (AM) processes, Vat Photopolymerization (VP) offers superior resolution, accuracy, and surface finish. Despite these advantages, VP has seen limited industrial adoption for fabricating end-use products due to process-imposed material constraints. Specifically, the need for multiple photo-reactive functional groups results in highly cross-linked polymeric networks that do not possess the elasticity and toughness to make them viable for dynamic loading. One problem is that vat photopolymerization required low viscosity resins, which effectively prohibits the use of polymers with high molecular weights and thus limits parts' mechanical properties.

To address this deficiency, this disclosure described an approach to photopolymer synthesis and printing to effectively decouple the viscosity-molecular weight relationship by synthesizing and processing photo-reactive aqueous polymer colloids. Sequestering polymers within discrete internal phases prevents inter-particle entanglement of the polymer chains, thus ensuring low viscosity. VP of polymer colloids results in a solid, structural green body embedded with high molecular weight polymer particles. A subsequent post-processing heated drying step allows the polymer particles to coalesce and further entangle, forming a semi-interpenetrating network with increased mechanical performance. In addition to introducing photocuring chemistry to polymer dispersions and emulsions, this work provides an ideal combination of low viscosity and high strain properties unprecedented in available VP photopolymers.

Among the seven modalities of additive manufacturing (AM) processes, vat photopolymerization (VP, also referred to as "stereolithography") remains a popular choice for fabricating prototypes due to its fine feature resolution, high dimensional accuracy, and excellent surface finish. However, despite these advantages relative to other AM processes, VP has seen limited industrial adoption for fabricating end-use products primarily due to the limited diversity and quality of its processable materials.

These material limitations stem from the requirement that, to be processable via VP, the polymeric (or monomeric) material must feature a photo-crosslinkable site. Typically, the polymeric design integrates an inert core with photo-crosslinkable functional groups such as acrylates, alkenes or epoxies.[1] When photocured, these multifunctional monomers/oligomers form highly cross-linked polymeric networks that exhibit high modulus and brittleness, and do not possess the elasticity and the toughness to make them viable for dynamic loading in many end-use part applications. The VP process also imposes a rheological constraint on potential resins. In general, 3 Pa-s is the upper limit of resin zero-shear viscosity for VP processing, as viscous materials can damage intricate features or even dislodge parts from the build platform during the recoating process.[2] Recoating highly viscous resins also creates considerable production bottlenecks in the layer-wise printing process. This viscosity constraint effectively prohibits the use of polymers with high molecular weights, and thus limits the range of mechanical properties of final printed parts.

While commercial photopolymer vendors (e.g., Formlabs, Stratasys) have recently offered elastomeric photopolymers for their photopolymerization AM processes, their materials do not offer suitable toughness for end-use application. Carbon's latest polyurethane materials currently offer the maximum commercially available toughness (following a thermal post-curing process), with tensile strengths ranging from 5-45 MPa and maximum elongations in the range of 120-300%. However, as this material requires blocked isocyanate and amine chemistry for the post-processing step, the scope of viable polymers is majorly restricted.[3] Furthermore, being proprietary materials, end-users cannot tailor the material properties for specific applications.

Synthetic strategies are required to maintain the perfect balance between precursor molecular weight, viscosity, and final network cross-link density to create tunable elastomers. Among the current synthetic strategies for elastomers, mechanisms with hydrogen bonding exhibit the highest elongation properties. Patel et al. report the synthesis of a family of versatile elastomers, capable of elongations up to 1100%, by blending different ratios of epoxy aliphatic acrylates with aliphatic urethane diacrylates.[4] The high strain capability is attributed to the presence of hydrogen bonds, which act as physical crosslinks between the hard domains of the aliphatic urethane diacrylates. Although this system possesses exceptional strain performance through hydrogen bonding association, this strategy does not circumvent viscosity issues of higher molecular weight polymers and therefore cannot provide high elasticity under tensile loading. Also, as with the system stated before, this system is restricted to polyurethanes and hydrogen-bonding containing materials which severely limits the library of polymers available to this approach. Expansion of the concept to high molecular weight systems will increase the viscosity of the photopolymer system beyond the working limits of most VP systems.

Others have shown the use of thiol-ene chemistry to tune the mechanical properties of single phase VP resins. Hoyle, Lee and Roper's investigation of thiol-ene click chemistry, a free-radical coupling process, demonstrates that mechanical properties of acrylate networks are tunable with controlled addition of multifunctional thiols, due to the uniformity in the network cross-link density.[5] Ware et al. also report the use of thiol-ene chemistry for the synthesis of programmable liquid crystalline elastomers capable of achieving strains up to 150%.[6] Baudis et al. report the tunability of mechanical properties creating linear polymer chains with controlled crosslinking using thiol-ene chemistry.[7] By varying concentrations of diacrylates, dithiols and monoacrylates, Baudis created parts that exhibit strains in the range of 100-400%.

Colloids are a class of heterogenous mixtures comprised of a continuous phase and a dispersed, phase (droplets, particles, etc.) on length scales of approximately (0.1-10 μm). Stable colloids do not exhibit flocculation and sedimentation of the dispersed phases. The term emulsion describes a liquid-liquid colloid, whereas "dispersion" or "sol" refers to a solid colloidally dispersed in a liquid.[9] Polymer colloids (commonly termed "latex") can exist as either an emulsion of polymer in organic solution with water or as a dispersion in which only the solid polymer is dispersed in water (formed through emulsion polymerization or through emulsification with subsequent solvent stripping). This work enables the additive manufacturing of any liquid polymer colloid through photo-reactive chemistry, and therefore encompasses both polymer emulsions and polymer dispersions. Because all colloidal curing chemistry occurs at the interface or within the aqueous, continuous phase the presence of organic solvent in the dispersed phase does not affect the applicability of this invention.

Although the techniques for the formation and polymerization of aqueous polymer colloids has received significant attention[10-18], little has been done to explore the unique synthetic platform of colloidal systems for advanced technologies. Most applications of dispersions solely focus on their utilization as low viscosity mixtures for dipping or coating onto surfaces followed by drying to provide functionality and properties. As described below, previous literature has investigated the introduction of new chemistries to latex. However, few examples exist of curing chemistry to provide solids directly from the colloidal state and no examples exist for the application of colloidal photocuring to provide high molecular weight, high performance objects from any processing technique, including AM.

As previously discussed, VP AM requires controllable, photo-reactive chemistry to create 3D objects. The introduction of crosslinking chemistry in aqueous polymer colloids has been studied. Of note, Schlogl et al. provided an early investigation into photo-crosslinking within aqueous polymer dispersed systems.[19] However, this technique only resulted in crosslinking within each dispersed polymer particle (when performed directly in the colloidal state), yielding a liquid mixture of individually crosslinked particles. This "prevulcanized" liquid product was merited to providing increased mechanical properties after film formation and drying. Roesler et al. developed functional polyurethane aqueous dispersions with acrylate functionality preferentially located at the phase interface.[20] Estrin et. al. also developed a photocurable form of maleinized polybutadiene rubber through reaction of the maleic anhydride group with hydroxyethyl acrylate and subsequent neutralization of the carboxylic acid with acrylate amines.[21] Both of these strategies provided photocurability of water-dispersible polymers, but required removal of the aqueous phase before crosslinking. As a result, these approaches only provided structural benefits to the final film after polymer particle coalescence and are not suitable for direct implementation in VP AM.

The primary use of emulsion in AM is found in the fabrication of highly porous structures.[22-23] The general technique involves using a water-in-oil emulsion in which the green body consists of a highly crosslinked, hydrophobic network, effectively surrounding entrapped water droplets. The water droplets are subsequently evaporated, ultimately yielding a porous, rigid network. Minas et al. demonstrated the use of Direct-Ink Writing (DIW) with high internal phase emulsions (HIPE's) to create hierarchical porous ceramics[24]. Sears et al. fabricated highly porous polymeric structures using photo-reactive DIW fabrication with HIPE inks.[22] However, the rheological restrictions limit the resin development for photopolymerizable HIPE's for DIW processes. Highly controllable and well defined hierarchical porous structures have also been fabricated by vat-photopolymerization of HIPE's.[23,25] AM of HIPE's has provided highly complex hierarchical porous structures, but their contributions are mainly in the areas of drug delivery, membrane exchange, cell growth, etc., and there are no reports of fabricating high performance structural components.[26] Roh et al explored the DIW AM of dispersions of poly(dimethylsiloxane) (PDMS).[27] Liquid, low molecular weight, vinyl-terminated PDMS was emulsified into an aqueous poly(vinyl alcohol) solution and heated to form crosslinked PDMS particles in dispersed water. Additional vinyl-terminated PDMS oligomer was then added to the crosslinked PDMS dispersion to form an increased viscosity paste-like "gel" suitable for DIW AM. The printed parts were then heated to promote flowing of the liquid PDMS particles and further crosslinking via the vinyl end groups. This resulted in high resolution objects capable of a maximum strain of approximately 140%, however the high viscosity and lack of photo-activated curing chemistry restricts this technique to DIW AM, precluding the increased resolution capability afforded by VP.

There is no precedent for the successful implementation of aqueous polymer colloids in vat-photopolymerization AM to yield high resolution, high performance 3D objects. Lukid et al. jetted liquid rubber latex onto a substrate, mimicking an ink-jetting process, and thermally dried the latex to form a solid film.[28] However, processing challenges (nozzle clogging) limited the fabrication to a monolayer film. Zheng and Deotte's patent describes the broad idea of heterogeneous material systems for VP; however, there is no discussion about materials selection, interfacial interaction, or synthetic strategy—hence it neither challenges nor lends insight into the development aqueous polymer colloids as described in this work.[29] Hsiao et al developed photo-crosslinkable PDMS "nanoemulsions" through addition of poly(ethylene glycol) diacrylate (PEGDA) to the aqueous phase.[30] The emulsions are then printed at temperatures above the "thermogelation" temperature at which the PEGDA inserts into the colloidal interface, bridging the particles, before being photo-crosslinked through the acrylate end groups. This results in the formation of an "organo-hydrogel" of crosslinked PEGDA containing droplets of PDMS oligomer. Similar to the work by Roh and coworkers, this study is restricted to low molecular weight (5 cP) polymer in the internal phase. The result is a low molecular weight, highly crosslinked system with low mechanical performance. There is no evidence of the ability of the internal phase polymer to interpenetrate the hydrogel scaffold, further restricting the mechanical performance capability of these materials. Zhang and coworkers demonstrate VP printing of PTFE latex, however their method relies on the thermal stability of PTFE to thermally remove the scaffold and sinter the particles, thus restricting material selection.[32]

To date, a versatile catalogue of engineering polymers does not yet exist to complement the VP AM process. To address this research gap, and thus to enhance the industrial adoption of VP, this work describes a synthetic and printing strategy to effectively decouple the viscosity-molecular weight relationship by synthesizing and processing photoreactive aqueous colloids (dispersions or emulsions). Illustrated in FIG. 1, this strategy explores an approach to the AM of polymer colloids, focusing on the introduction of high molecular weight, high mechanical performance polymers at viscosities suitable for VP. Printing components from these colloids involves a two-step process chain wherein (i) a "green body" is first created via vat photopolymerization. This is accomplished through introduction of water-soluble scaffolding monomers to the continuous, aqueous phase of a polymer colloid which can be photo-crosslinked to form a supportive scaffold around the dispersed, high molecular weight internal phase. (ii) A subsequent heated drying of the printed green body enables coalescence and penetration of the embedded polymer particles through the scaffold network, resulting in a semi-interpenetrating network with high mechanical performance. Introduction of an array of monomers with varied degree of functionality provides the imperative tunability of the scaffold to permit interpenetration while also providing structural integrity to maintain green body shape. Preliminary experiments support the claim that the use of photo-curable aqueous polymer colloids enables VP processing of high molecular weight polymers with tunable material properties and high mechanical performance without commensurate increases in resin viscosity. While this approach focused on colloidally dispersed SBR for preliminary investigation, this technique is applicable to any polymer that can be colloidally dispersed or emulsified in water.

This approach enables printing of high performance, high molecular weight polymers through synthesis of photoreactive polymer colloids. Polymer dispersions or emulsions from either emulsion-state polymerization or the emulsification of preformed polymer are viable in this invention. Although preliminary work focuses on polydiene elastomers, this invention can be applied to any polymer composition, architecture, and molecular weight that can form a stable colloid in water.

Emulsification of preformed polymers is well-studied an is possible through high-shear mixing of organic polymer solutions with a nonsolvent (such as water) in the presence of polar or ionic stabilizing groups. For cases in which a free surfactant agent is employed, nearly any polymer backbone can be emulsified into a colloid by this method.[11-13, 17] This is an ideal approach when polymer versatility is desirable over interface tunability, or for cases in which the polymer cannot be easily modified.

However, stabilizing functionality can also be covalently incorporated on the polymer increasing the tunability of the colloidal system. This can be accomplished through copolymerization of monomers with acidic moieties (in the case of emulsion polymerization of carboxylated-SBR[31]), or through post-polymerization techniques[15]. Although this invention encompasses a wider variety of polymer compositions, alkene-containing polymers provide an idea combination of mechanical performance (strain capability, elasticity, etc.) and functionalization potential. Shown in Schemes 1 and 2 below, post-polymerization modification of alkene containing polymers (including but not limited to homopolymers and copolymers containing the monomers butadiene, isoprene, dicyclopentadiene (DCPD), ethylidene norbornene (ENB), vinyl norbornene (VNB), and chloroprene) can provide tunable, pendant ionic or polar chemistry for stabilization of the phase interface, particularly in water-based systems. This provides a surfactant-free approach to emulsification of preformed polymers and enables tunable functionality at the phase interface. Poussard et. al. provides an example of using thiol-ene post-polymerization modification to provide ionic moieties for colloidal stabilization.[15]

Scheme 1. One example thiol-ene modification and deprotonation of a polydiene polymer to provide carboxylate ionic moieties for colloidal stabilization at the interface.

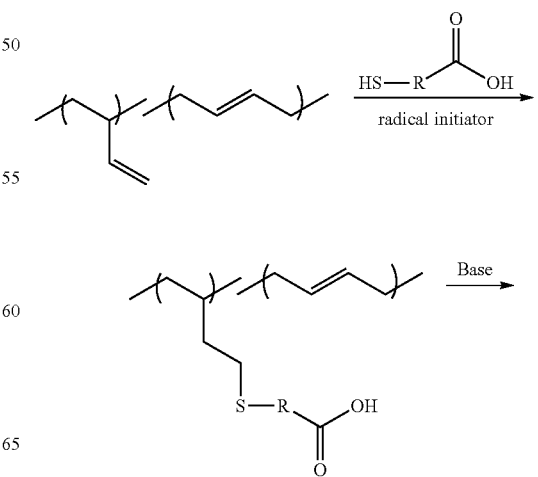

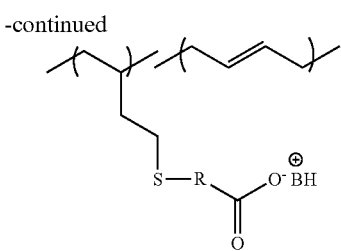

Scheme 2. An example of sulfonation followed by deprotonation of ethylene-propylene-diene (EDPM) polymer to provide sulfonate ionic moieties for colloidal stabilization.

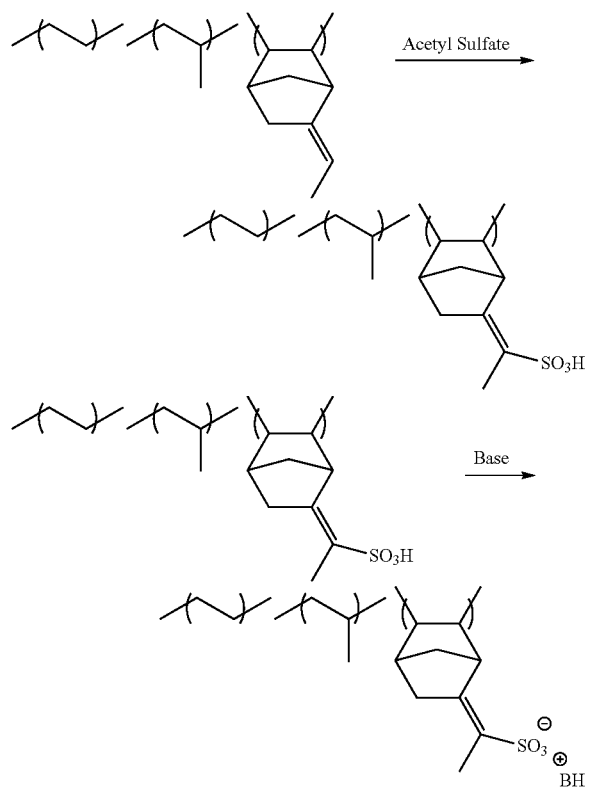

Scheme 1 illustrates one example that has been reduced to practice with R representing any alkyl carbon sequence, however functionalization strategies are not limited to these compounds or chemistries. Further work has explored epoxidation of internal alkenes followed by base-catalysed thiol-epoxy coupling of thiol functional alkyl carboxylic acids. Other possible approaches include the incorporation of other polar or ionizable moieties, such as sulfonates, imidazoles, ethers, nitriles, hydrophilic polymer etc.

Scheme 2 illustrates an example that has been reduced to practice. Sulfonation of EPDM is a well-known reaction that efficiently adds sulfonate moieties to a variety of EPDM monomer compositions.

For all cases in which ionic functionality is added to a polymer through an acidic moiety, deprotonation can occur with any basic compound. Such compounds include but are not limited to mono- and multivalent salts, hydroxide salts, amine-containing compounds, carbonate salts, hydrides, nitrogenous bases. It is well understood that the base selected for deprotonation will determine the chemical identity of the ion and therefore the functionality present at the colloidal interface. It is also well understood that these ions can be exchanged in a later step to another cationic species.

For cases in which ionic functionality is provided through the incorporation of basic moieties, protonation to form pendant cations can occur with any acidic compound. Such compounds include but are not limited to hydrogen halides, carboxylic acids, sulfuric acid, ammonium-containing compounds, carbonic acids, citric acid, acetic acid, and phosphoric acid. It is well understood that the acid selected for protonation will determine the chemical identity of the ion and therefore the functionality present at the colloidal interface. It is also well understood that these ions can be exchanged in a later step to another cationic species.

For cases in which ionic functionality is present through groups that are not significantly responsive to acid-base reactions, it is understood that the ions can be exchanged before or after polymer modification to provide the desired counter-ion and functionality present at the colloidal interface.

Photo-crosslinkable moieties can be introduced to the continuous phase and/or the phase interface of polymer dispersions and emulsions through two main approaches. As a "scaffolding approach", a combination of soluble/miscible monomers or low molecular weight oligomers can be added to the continuous phase of a dispersion by mixing. Combined with a photo-initiators, these provide the photo-reactive precursors that provide network formation and curing of the continuous phase. The result is a solid "green body" consisting of discrete high molecular weight domains supported by a support scaffold network. Mixture of singly and multifunctional monomers tunes scaffold crosslink density, providing a balance of structural integrity without hindering interpenetration by the internal phase polymer. Applicable monomers are any water-soluble monomer that undergoes polymerization or coupling in response to an initiation process. Examples of these monomers include but are not limited to any water-soluble compounds that contain any amount or combination of the following moieties: acrylate, methacrylate, epoxide, thiol, alkene, or alkyne. Scheme 3 below provides a few common examples of viable monomers for this approach but does not encompass all possibilities due to the versatile nature of this strategy.

Scheme 3. Some common examples of water soluble monomers that can provide network formation within continuous, aqueous phase.

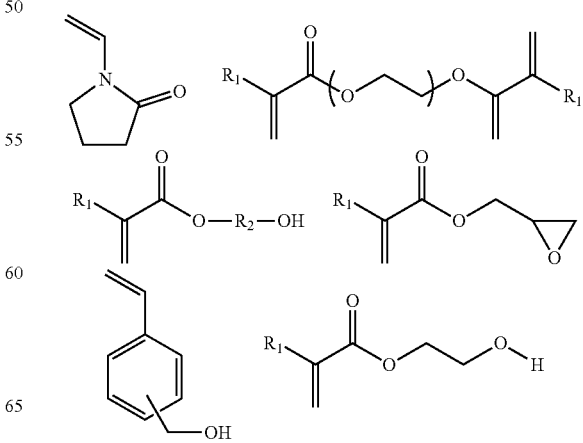

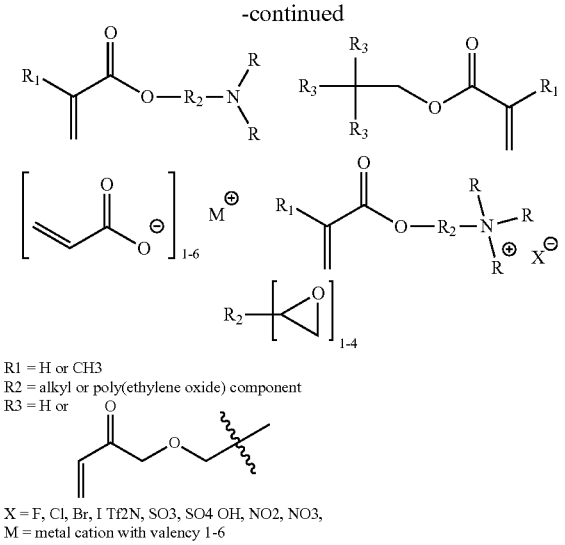

R1 = H or CH3
R2 = alkyl or poly(ethylene oxide) component
R3 = H or [epoxide structure]

X = F, Cl, Br, I Tf2N, SO3, SO4 OH, NO2, NO3,
M = metal cation with valency 1-6

In another approach, photo-reactive functionality can be attached to the polymer in combination with amphiphilic stabilizing moieties to present reactivity at the phase interface. Described above, this similar chemistry was employed by earlier work[20-21], but only used to form crosslinked networks after drying and film formation. Therefore use of ionic, photocurable moieties on polymers as a reactive colloidal interface remains unexplored. Deprotonation of bound acid functional groups on the polymer backbone with basic compounds which contain reactive or polymerizable moieties, such as aminoacrylates, provides ionic, photo-crosslinkable groups at the colloidal interface. Schemes 4-6 below provide examples of this approach to reactive colloidal interfaces, however any polymer containing acidic moieties (through post-polymerization modification or emulsion copolymerization) is viable for this approach. While this reactive ion approach is described separately, it is well understood that it can be used in conjunction with the scaffolding method to provide further reinforcement of the cured green body as well as strong association between the high molecular weight, hydrophobic polymer and the scaffold network. It can be assumed that this interaction will act as a form of a crosslinking in the final, semi-interpenetrating network to further enhance mechanical performance.

Scheme 4. Example of thiol-ene modification of polydiene to provide photoreactive moieties at colloidal interface.

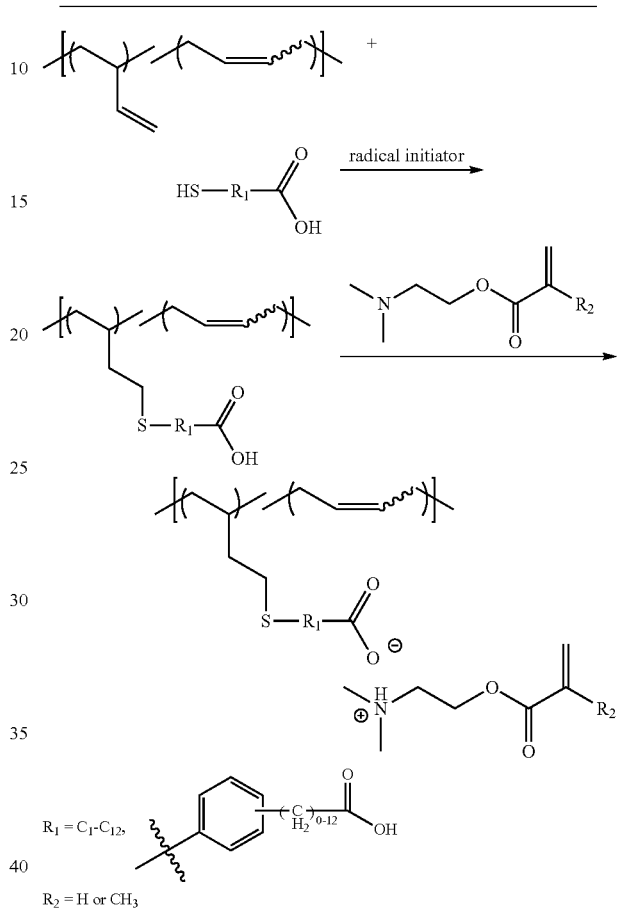

R1 = C1-C12,
R2 = H or CH3

Scheme 5. Example of epoxidation and subsequent thiolysis to provide photoreactive moieties at the colloidal interface.

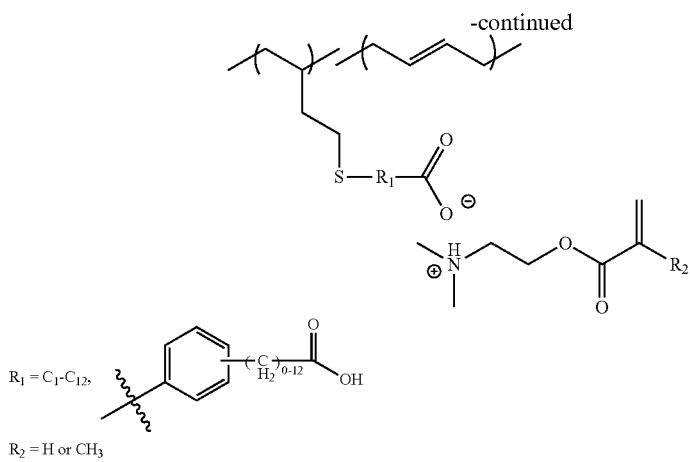

$R_1 = C_1-C_{12}$, $R_2 = H$ or $CH_3$

Scheme 6. Example of sulfonation and subsequent deprotonation with reactive amine to provide photoreactive ionic moiety at the colloidal interface.

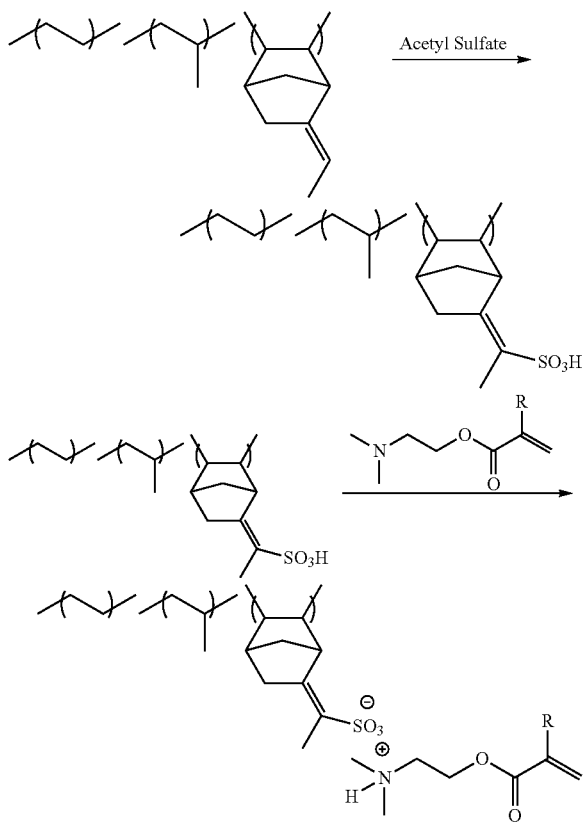

In both the scaffolding and reactive ion strategies described above, photo-initiators are necessary to convert the UV radiation from the printer to initiate chemical cross-linking. For most activated alkenes (acrylates, methacrylates, vinyl pyrrolidinones, etc.) radical initiators are necessary. Any radical photo-initiator, Type I or Type II, known to those knowledgeable in the art is applicable in this invention including, but not limited to benzoin ethers benzil ketals α-dialkyoxyacetophenones, α-hydroxyalkylphenones, α-aminoalkylphenones, acylphosphineoxides, benzophenones/amines, and thioxanthones/amines. Scheme 7 below shows structures of the most common radical photo-initiators employed for vat polymerization. In the case of epoxide functional monomers and crosslinkers, a photoacid generator is preferable for reaction. Examples of these initiators include but are not limited to Lanthanum(III) trifluoromethanesulfonate and triarylsulfonium hexafluorophosphate salts.

Scheme 7: Structures of Diphenyl(2,4,6-trimethylbenzoyl)phosphine oxide (TPO), phenylbis-(2,4,6-trimethylbenzoyl)phosphine oxide (PPO), and 2,2-Dimethoxy-2-phenylacetophenone (DMPA), respectively.

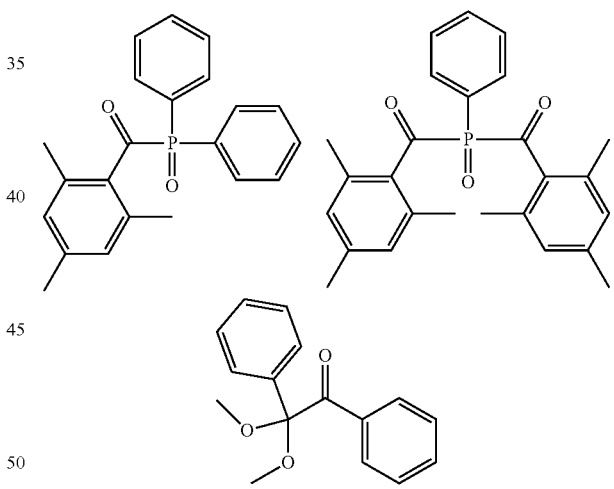

The AM manufacturing cycle involves three important processes, namely (a) Fabrication of green-bodies via VP systems, (b) UV post curing the green bodies and (c) Drying the green bodies to create the final part with the required thermos-mechanical properties.

The schematic of the machine used for converting the idea to practice is shown above. A custom scanning-mask projection vat-photopolymerization (S-MPVP) machine was used with a build size of 250×250 mm and a feature resolution of 150 μm. In the S-MPVP system, the projection device traverses over the resin surface while simultaneously projecting a continuous bitmap movie. The bitmap movie is a 1:1 scale representation of the features in a single slice of the desired part. The scan speed of the projection device and the bitmap movie are synchronized to provide each projected pixel with the necessary energy for curing up to the desired layer thickness only.

The STL file of a tensile specimen was sliced into bitmaps of 200 μm layer thickness using Netfabb®. A custom MATLAB program generated a moving mask for each layer and the corresponding scan speed based on the exposure time estimated from the working curves. A glass vat filled with resin was loaded into the build area. Glass slides were attached to the build platform to enhance the adhesion between the printed parts and the substrate. The projector traversed over the resin surface while projecting the moving mask over the resin. Recoating was performed by lowering the build stage into the resin vat. After a brief pause for resin settling, a recoating blade smoothened meniscus over the build platform, ensuring a smooth and level resin surface for fabrication of the consequent layers. This process continued until the entire part was fabricated. During fabrication, the linear stages, the projector and the recoating mechanism are actively monitored and controlled using a custom LabVIEW program. The printed parts, extracted from the build platform, were rinsed with an appropriate solvent and wiped with Kimwipes™ to remove non-cured material.

While this represents only one of the possible configurations of VP systems, any of the combinations resulting from the combination of currently listed parameters or future parameters, that result in the creation of a new VP process, will deliver a green body at the end of the VP fabrication process.

| Light Path | Light source | Mask | Reaction Environment |
|---|---|---|---|
| Top Down | Lamp, LED, Laser | Static Mask | Reactive environments that inhibit polymerization (i.e. oxygen) |
| Bottom Up | Ultraviolet (UV) | Dynamic Mask (i.e DMD, LCOS, LCD) | Pro-polymerization environments (i.e. Argon, Nitrogen) |
| Holographic | Any EM spectra capable of initiating photo-polymerization | Scanning Mask | |
| Special/voxel | | | |

Fabricated green bodies maybe subjected to a UV (or suitable EM radiation) treatment to complete the polymerization of the moieties in the green body. This step controls the mechanical property of the final part. Again, rates of post-curing, environment and use of catalysts to affect the polymer conversion and hence the mechanical properties, fall under the scope of the post-curing section, even though not explicitly stated by the inventors.

The process of removing the continuous phase solvent (water) is referenced henceforth as drying. While the use of a vacuum oven is the traditional method of drying, any other process that results in drying falls under the scope of the patent declaration. The drying process may lead to further entanglements of the polymer chains, or set-off a secondary polymerization reaction or terminate a polymerization occurring within the part, all of which affect the mechanical properties of the final part.

While the primary intent of the disclosure was to facilitate the 3D printing of high-performance polymers, it is necessary to point out that the material synthesis strategies are equally valid for processes that do not require 3D printing i.e. Ultra-fast cure paint (non-drip), sealant, coating etc. In the non-printing applications, photo, thermal or chemical initiators can be used to drive the polymerization, while still retaining the properties of the high-performance polymers.

Areas of application of the methods can include, for example, automobile industry components such as tires, gaskets, etc.; sealants, coatings in a variety of fields, packaging materials, composites, structural materials, and the like.

Aspects of the Disclosure

The present disclosure will be better understood upon reading the following Aspects which should not be confused with the claims. Any of the numbered Aspects below can, in some instances, be combined with other aspects described elsewhere herein even though such combination may not be expressly disclosed as such herein.

Aspect 1. A method of additive manufacturing of an article, the method comprising: photopolymerizing a resin composition to form a green body, the resin composition comprising a polymer colloid comprising a discontinuous polymer phase comprising polymer particles and a continuous solvent phase; one or more photocrosslinkable scaffold precursors; and a photoinitiator; wherein the green body comprises a photocrosslinked network of the scaffold precursors having the polymer particles entrapped and dispersed therein; drying the green body to produce the article, wherein the drying results in penetration of the polymer from the polymer particles through the scaffold and coalescence of the polymer between the polymer particles.

Aspect 2. The method according to any one of Aspects 1-30, wherein the polymer particles comprise a polymer having a number average molecular weight of about 50 kg $mol^{-1}$ to about 10000 kg $mol^{-1}$, about 50 kg $mol^{-1}$ to about 5000 kg $mol^{-1}$, about 50 kg $mol^{-1}$ to about 5000 kg $mol^{-1}$, about 100 kg $mol^{-1}$ to about 5000 kg $mol^{-1}$, about 100 kg $mol^{-1}$ to about 2000 kg $mol^{-1}$, about 100 kg $mol^{-1}$ to about 1000 kg $mol^{-1}$, or about 200 kg $mol^{-1}$, about 500 kg $mol^{-1}$, about 1000 kg $mol^{-1}$, or about 1500 kg $mol^{-1}$·t Aspect 3. The method according to any one of Aspects 1-30, wherein the polymer particles comprise a dispersible polymer selected from the group consisting of polycarbonates, polymethacrylates, polystyrenes, polyamides, polyurethanes, poly(ethylene terephthalate), poly(lactic acid), poly(glycolic acid), polyhydroxybutyrate, polydioxanones (e.g., 1,4-dioxanone), 5-valerolactone, 1-dioxepanones (e.g., 1,4-dioxepan-2-one and 1,5-dioxepan-2-one), polyesters, poly(ethylene glycol), poly(ethylene oxides), polyacrylamides, vinyl polymers, silk, collagen, alginate, chitin, chitosan, hyaluronic acid, chondroitin sulfate, glycosaminoglycans, poly(hydroxyethyl methacrylate), polyvinylpyrrolidone, poly(vinyl alcohol), poly(acrylic acid), polyacetate, polycaprolactone, poly(propylene, glycol)s, poly(amino acids), copoly (ether-esters), poly(alkylene oxalates), polyamides, poly(iminocarbonates), polyoxaesters, polyorthoesters, polyphosphazenes, polypeptides and copolymers, block copolymers, homoploymers, blends and combinations thereof.

Aspect 4. The method according to any one of Aspects 1-30, wherein the polymer particles comprise an elastomer.

Aspect 5. The method according to any one of Aspects 1-30, wherein the elastomer is selected from the group consisting of natural rubber, polyisoprene rubber, styrenic copolymer elastomers (i.e., those elastomers derived from styrene and at least one other monomer, elastomers that include styrene-butadiene (SB) rubber, styrene-butadiene-styrene (SBS) rubber, styrene-ethylene-butadiene-styrene (SEBS) rubber, styrene-ethylene-ethylene-styrene (SEES) rubber, styrene-ethylene-propylene-styrene (SEPS) rubber, styrene-isoprene-styrene (SIS) rubber, styrene-isoprene-butadiene-styrene (SIBS) rubber, styrene-ethylene-propylene-styrene (SEPS) rubber, styrene-ethylene-ethylene-propylene-styrene (SEEPS) rubber, styrene propylene-styrene (SPS) rubber, and others, all of which may optionally be hydrogenated), polybutadiene rubber, nitrile rubber, butyl rubber, and olefinic elastomer such as ethylene-propylene-diene rubber (EPDM) and ethylene-octene copolymers, and copolymers and blends thereof.

Aspect 6. The method to any one of Aspects 1-30, wherein the polymer particles comprise a high $T_g$ polymer such as a poly(arylether), polyester, a polyamide, acrylate polymers such as polym(methacrylate) and poly(methyl methacrylate), or copolymers thereof.

Aspect 7. The method according to any one of Aspects 1-30, wherein the polymer particles comprise polymers having a $T_g$ of about 300° C., about 250° C., about 200° C., about 150° C., about 100° C., or less.

Aspect 8. The method according to any one of Aspects 1-30, wherein the polymer particles comprise a polymer having a $T_g$ below a thermal degradation temperature of the photocrosslinked network of the scaffold precursors.

Aspect 9. The method according to any one of Aspects 1-30, wherein the particles have an average diameter of about 50 nm to about 2.5 µm, about 50 nm to about 1 µm, about 100 nm to about 1 µm, about 50 nm to about 250 nm, about 50 nm to about 500 nm, about 250 nm to about 1 µm, about 100 nm to about 250 nm, about 50 nm to about 150 nm, or about 1 µm to about 2.5 µm.

Aspect 10. The method according to anyone of Aspects 1-30, wherein the solvent phase comprises water or other aqueous solvents, organic solvents, or a mixture thereof.

Aspect 11. The method according to any one of Aspects 1-30, wherein the polymer particles comprise alkene containing polymers selected from the group consisting of homopolymers and copolymers containing the monomers butadiene, isoprene, dicyclopentadiene (DCPD), ethylidene norbornene (ENB), vinyl norbornene (VNB), and chloroprene.

Aspect 12. The method according to any one of Aspects 1-30, wherein the polymer colloid comprises a surfactant.

Aspect 13. The method according to any one of Aspects 1-30, wherein the polymer particles comprise polymers having pendant acidic functionality some of which has been converted to ionic functionality via reaction with a base such as mono- and multivalent salts, hydroxide salts, amine-containing compounds, carbonate salts, hydrides, and nitrogenous bases.

Aspect 14. The method according to any one of Aspects 1-30, wherein the polymer particles comprise polymers having pendant basic functionality some of which has been converted to ionic functionality via reaction with an acid such as hydrogen halides, carboxylic acids, sulfuric acid, ammonium-containing compounds, carbonic acids, citric acid, acetic acid, and phosphoric acid.

Aspect 15. The method according to any one of Aspects 1-30, wherein the photocrosslinkable scaffold precursors comprise crosslinkable groups selected from the group consisting of hydrogen halides, carboxylic acids, sulfuric acid, ammonium-containing compounds, carbonic acids, citric acid, acetic acid, and phosphoric acid.

Aspect 16. The method according to any one of Aspects 1-30, wherein the photocrosslinkable scaffold precursors are in the continuous phase.

Aspect 17. The method according to any one of Aspects 1-30, wherein the photocrosslinkable scaffold precursors are covalently attached to the polymer particles at an interface between the discontinuous polymer phase and the continuous solvent phase.

Aspect 18. The method according to any one of Aspects 1-30, wherein the photoinitiator is a suitable ultraviolet free radical photoinitiator such as diphenyl(2,4,6-trimethylbenzoyl)phosphine oxide (TPO), lithium phenyl-2,4,6-trimethylbenzoylphosphinate (LAP), oligo(2-hydroxy-2-methyl-1-(4-(1-methylvinyl)phenyl)propanone), 2-hydroxy-2-methyl-1-phenyl-1-propanone, 2,4,6-trimethylbenzophenone, 4-methylbenzophenone, 2,2-dimethoxy-1,2-diphenylethanone, 2-butoxy-1,2-diphenylethanone, 2-(2-methyl propoxy)-1,2-diphenylethanone, benzophenone, 2-alpha hydroxy ketone, other alpha hydroxy ketones, other benzophenone derivatives or mixtures thereof.

Aspect 19. The method according to any one of Aspects 1-30, wherein a weight ratio of the polymer material to the scaffold precursor material is about 2:1 to about 20:1, about 2:1 to about 5:1, about 4:1 to about 5:1, about 5:1 to about 10:1, about 10:1 to about 15:1, or about 15:1 to about 20:1.

Aspect 20. The method according to any one of Aspects 1-30, wherein a weight ratio of the polymer material to the scaffold precursor material is optimized to maximize the polymer concentration without disrupting the colloidal stability.

Aspect 21. The method according to any one of Aspects 1-30, wherein drying the green body is done at a temperature above a glass transition temperature of the polymer in the polymer particles.

Aspect 22. The method according to any one of Aspects 1-30, wherein the article has porosity of about 100 nm, about 50 nm, about 20 nm, or less.

Aspect 23. The method according to any one of Aspects 1-30, wherein the article is transparent and/or translucent.

Aspect 24. The method according to any one of Aspects 1-30, wherein a transmission electron microscopy reveals nanoscale phase separation and an absence of polymer particles after coalescence.

Aspect 25. The method according to any one of Aspects 1-30, wherein the article has a $T_g$ that is within 25%, within 20%, within 15%, within 10%, within 10° C., within 5° C., or within 2° C. of a theoretical prediction of the $T_g$ using the Fox method and based on random copolymers of the polymer and neat scaffold.

Aspect 26. The method according to any one of Aspects 1-30, wherein the polymer colloid further comprises inorganic particles; and wherein the coalescence of the polymer results in the inorganic particles being encapsulated and dispersed within the polymer.

Aspect 27. The method according to any one of Aspects 1-30, wherein the inorganic particles comprise silica, carbon particles, metal particles, ceramic particles, and the like.

Aspect 28. The method according to any one of Aspects 1-30, wherein ceramic particles include alumina, silicon carbide, silicon nitride, barium titanate, or combination thereof.

Aspect 29. The method according to any one of Aspects 1-30, wherein the metal particles include silver, nickel, iron, cobalt, tungsten, molybdenum, other metals, and alloys and mixtures thereof, Aspect 30. The method according to any one of Aspects 1-30, wherein carbon particles include carbon black, carbon nanotubes, graphene, graphite, and other carbon nanoparticles.

Aspect 31. A resin composition comprising a polymer-colloid comprising a discontinuous polymer phase comprising polymer particles and a continuous solvent phase; one or more photocrosslinkable scaffold precursors; and a photoinitiator;

Aspect 32. The resin composition according to any one of Aspects 31-55, wherein the polymer particles comprise a polymer having a number average molecular weight of about 50 kg mol$^{-1}$ to about 10000 kg mol$^{-1}$, about 50 kg mol$^{-1}$ to about 5000 kg mol$^{-1}$, about 50 kg mol$^{-1}$ to about 5000 kg mol$^{-1}$, about 100 kg mol$^{-1}$ to about 5000 kg mol$^{-1}$, about 100 kg mol$^{-1}$ to about 2000 kg mol$^{-1}$, about 100 kg mol$^{-1}$ to about 1000 kg mol$^{-1}$, or about 200 kg mol$^{-1}$, about 500 kg mol$^{-1}$, about 1000 kg mol$^{-1}$, or about 1500 kg mol$^{-1}$·t Aspect 33. The resin composition according to any one of Aspects 31-55, wherein the polymer particles comprise a dispersible polymer selected from the group consisting of polycarbonates, polymethacrylates, polystyrenes, polyamides, polyurethanes, poly(ethylene terephthalate), poly (lactic acid), poly(glycolic acid), polyhydroxbutyrate, polydioxanones (e.g., 1,4-dioxanone), 5-valerolactone, 1-dioxepanones (e.g., 1,4-dioxepan-2-one and 1,5-dioxepan-2-one), polyesters, poly(ethylene glycol), poly(ethylene oxides), polyacrylamides, vinyl polymers, silk, collagen, alginate, chitin, chitosan, hyaluronic acid, chondroitin sulfate, glycosaminoglycans, poly(hydroxyethyl methacrylate), polyvinylpyrrolidone, poly(vinyl alcohol), poly(acrylic acid), polyacetate, polycaprolactone, poly(propylene, glycol)s, poly(amino acids), copoly (ether-esters), poly(alkylene oxalates), polyamides, poly(iminocarbonates), polyoxaesters, polyorthoesters, polyphosphazenes, polypeptides and copolymers, block copolymers, homoploymers, blends and combinations thereof.

Aspect 34. The resin composition according to any one of Aspects 31-55, wherein the polymer particles comprise an elastomer.

Aspect 35. The resin composition according to any one of Aspects 31-55, wherein the elastomer is selected from the group consisting of natural rubber, polyisoprene rubber, styrenic copolymer elastomers (i.e., those elastomers derived from styrene and at least one other monomer, elastomers that include styrene-butadiene (SB) rubber, styrene-butadiene-styrene (SBS) rubber, styrene-ethylene-butadiene-styrene (SEBS) rubber, styrene-ethylene-ethylene-styrene (SEES) rubber, styrene-ethylene-propylene-styrene (SEPS) rubber, styrene-isoprene-styrene (SIS) rubber, styrene-isoprene-butadiene-styrene (SIBS) rubber, styrene-ethylene-propylene-styrene (SEPS) rubber, styrene-ethylene-ethylene-propylene-styrene (SEEPS) rubber, styrene propylene-styrene (SPS) rubber, and others, all of which may optionally be hydrogenated), polybutadiene rubber, nitrile rubber, butyl rubber, and olefinic elastomer such as ethylene-propylene-diene rubber (EPDM) and ethylene-octene copolymers, and copolymers and blends thereof.

Aspect 36. The resin composition according to any one of Aspects 31-55, wherein the polymer particles comprise a high $T_g$ polymer such as a poly(arylether), polyester, a polyamide, acrylate polymers such as polym(methacrylate) and poly(methyl methacrylate), or copolymers thereof.

Aspect 37. The resin composition according to any one of Aspects 31-55, wherein the polymer particles comprise polymers having a $T_g$ of about 300° C., about 250° C., about 200° C., about 150° C., about 100° C., or less.

Aspect 38. The resin composition according to any one of Aspects 31-55, wherein the polymer particles comprise a polymer having a $T_g$ below a thermal degradation temperature of the photocrosslinked network of the scaffold precursors.

Aspect 39. The resin composition according to any one of Aspects 31-55, wherein the particles have an average diameter of about 50 nm to about 2.5 µm, about 50 nm to about 1 µm, about 100 nm to about 1 µm, about 50 nm to about 250 nm, about 50 nm to about 500 nm, about 250 nm to about 1 µm, about 100 nm to about 250 nm, about 50 nm to about 150 nm, or about 1 µm to about 2.5 µm.

Aspect 40. The resin composition according to any one of Aspects 31-55, wherein the solvent phase comprises water or other aqueous solvents, organic solvents, or a mixture thereof.

Aspect 41. The resin composition according to any one of Aspects 31-55, wherein the polymer particles comprise alkene containing polymers selected from the group consisting of homopolymers and copolymers containing the monomers butadiene, isoprene, dicyclopentadiene (DCPD), ethylidene norbornene (ENB), vinyl norbornene (VNB), and chloroprene.

Aspect 42. The resin composition according to any one of Aspects 31-55, wherein the polymer colloid comprises a surfactant.

Aspect 43. The resin composition according to any one of Aspects 31-55, wherein the polymer particles comprise polymers having pendant acidic functionality some of which has been converted to ionic functionality via reaction with a base such as mono- and multivalent salts, hydroxide salts, amine-containing compounds, carbonate salts, hydrides, and nitrogenous bases.

Aspect 44. The resin composition according to any one of Aspects 31-55, wherein the polymer particles comprise polymers having pendant basic functionality some of which has been converted to ionic functionality via reaction with an acid such as hydrogen halides, carboxylic acids, sulfuric acid, ammonium-containing compounds, carbonic acids, citric acid, acetic acid, and phosphoric acid.

Aspect 45. The resin composition according to any one of Aspects 31-55, wherein the photocrosslinkable scaffold precursors comprise crosslinkable groups selected from the group consisting of hydrogen halides, carboxylic acids, sulfuric acid, ammonium-containing compounds, carbonic acids, citric acid, acetic acid, and phosphoric acid.

Aspect 46. The resin composition according to any one of Aspects 31-55, wherein the photocrosslinkable scaffold precursors are in the continuous phase.

Aspect 47. The resin composition according to any one of Aspects 31-55, wherein the photocrosslinkable scaffold precursors are covalently attached to the polymer particles at an interface between the discontinuous polymer phase and the continuous solvent phase.

Aspect 48. The resin composition according to any one of Aspects 31-55, wherein the photoinitiator is a suitable ultraviolet free radical photoinitiator such as diphenyl(2,4,6-trimethylbenzoyl)phosphine oxide (TPO), lithium phenyl-2,4,6-trimethylbenzoylphosphinate (LAP), oligo(2-hydroxy-2-methyl-1-(4-(1-methylvinyl)phenyl)propanone), 2-hydroxy-2-methyl-1-phenyl-1-propanone, 2,4,6-trimethylbenzophenone, 4-methylbenzophenone, 2,2-dimethoxy-1,2-diphenylethanone, 2-butoxy-1,2-diphenylethanone, 2-(2-methyl propoxy)-1,2-diphenylethanone, benzophenone, 2-alpha hydroxy ketone, other alpha hydroxy ketones, other benzophenone derivatives or mixtures thereof.

Aspect 49. The resin composition according to any one of Aspects 31-55, wherein a weight ratio of the polymer material to the scaffold precursor material is about 2:1 to about 20:1, about 2:1 to about 5:1, about 4:1 to about 5:1, about 5:1 to about 10:1, about 10:1 to about 15:1, or about 15:1 to about 20:1.

Aspect 50. The resin composition according to any one of Aspects 31-55, wherein a weight ratio of the polymer material to the scaffold precursor material is optimized to maximize the polymer concentration without disrupting the colloidal stability.

Aspect 51. The resin composition according to any one of Aspects 31-55, wherein the polymer colloid further comprises inorganic particles; and
wherein the coalescence of the polymer results in the inorganic particles being encapsulated and dispersed within the polymer.

Aspect 52. The resin composition according to any one of Aspects 31-55, wherein the inorganic particles comprise silica, carbon particles, metal particles, ceramic particles, and the like.

Aspect 53. The resin composition according to any one of Aspects 31-55, wherein ceramic particles include alumina, silicon carbide, silicon nitride, barium titanate, or combination thereof.

Aspect 54. The resin composition according to any one of Aspects 31-55, wherein the metal particles include silver, nickel, iron, cobalt, tungsten, molybdenum, other metals, and alloys and mixtures thereof.

Aspect 55. The resin composition according to any one of Aspects 31-55, wherein carbon particles include carbon black, carbon nanotubes, graphene, graphite, and other carbon nanoparticles.

Aspect 56. An article made by photopolymerizing a resin composition according to any one of Aspects 31-55.

Aspect 57. An article made by a process according to any one of Aspects 1-30.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1. 3D Printing Latex: A Route to Complex Geometries of High Molecular Weight Polymers This example describes concurrent photopolymer and VP system use of polymeric colloids (latexes) that effectively decouple the dependency of viscosity on molecular weight. Photocrosslinking of a continuous-phase scaffold, which surrounds the latex particles, combined with in-situ computer-vision print parameter optimization, which compensates for light scattering, enables high-resolution VP of high molecular weight polymer latexes as particle-embedded green bodies. Thermal post-processing promotes coalescence of the dispersed particles throughout the scaffold, forming a semi-interpenetrating polymer network (sIPN) without loss in part resolution. Printing a styrene-butadiene rubber (SBR) latex, a previously inaccessible elastomer composition for VP, exemplified this approach and yielded printed elastomers with precise geometry and tensile extensibilities exceeding 500%.

Experimental
Materials
Styrene-butadiene rubber (SBR) latex (Rovene 4176) was generously donated by Mallard Creek Polymers Inc. The latex has a solids content of 50 wt %, a particle diameter range of 120-170 nm, and a viscosity of 400 cps as measured by the manufacturer. The SBR copolymer was approximately 50/50 by weight styrene and butadiene with a low level of carboxylic acid monomer neutralized with ammonia to provide colloidal stability. The polymer contains a high insoluble (gel) content from the polymerization process due to intra-particle crosslinking during the polymerization process. 1-vinyl-2-pyrrolidinone (NVP) and poly(ethylene glycol) 575 g/mol (PEGDA 575), and diphenyl(2,4,6-trimethylbenzoyl)phosphine oxide (TPO) were purchased from Millipore Sigma and used as received.

TABLE 1

(Thermo)mechanical data for sIPN's and neat SBR from latex

| Scaffold Composition NVP:PEGDA (wt:wt) | Scaffold Loading SBR:Scaffold (wt:wt) | Plateau G' (GN0) (kPa) | Tg (° C.) | Strain @ Break (%) | Stress @ Break (MPa) | Stress @ 100% Strain |
|---|---|---|---|---|---|---|
| 1:5 | | 200 | 16 | 360 | 5.4 | 1.2 |
| 1:1 | 4:1 | 50 | 24 | 420 | 5.3 | 1.1 |
| 2.5:1 | 4:1 | 30 | 9 | 500 | 5.5 | 1.1 |
| 5:1 | 4:1 | 8 | 18 | 540 | 5 | 1 |
| Neat SBR | 1:0 | — | 5 | 590 | 2 | 0.5 |

Photocurable Latex Preparation
As a standard example (4:1 polymer:scaffold, 5:1 NVP: PEGDA), 50 mg TPO photoinitiator was added to a 20-mL vial followed by the addition of 0.5 g NVP. The photoinitiator was fully dissolved via vortex mixing before addition of PEGDA and further mixing. The monomer/photoinitiator solution was then added via dropwise addition to 5 g latex stirring rapidly in a separate 20-mL vial. The photocurable latex was then vortexed for 30 s to ensure complete mixing. For print-scale preparation, a similar method was used, employing a 1 L beaker and mechanical stirrer during the monomer/photoinitiator addition to 400 g of latex.

Analytical Methods
Dynamic light scattering (DLS) measurements were conducted with a Malvern Zetasizer Nano, reporting intensity distributions. DLS samples were prepared with latex which was diluted to 1 wt % solids with deionized water to minimize particle-particle interactions. Photorheology was performed on a TA Instruments DHR-2 equipped with a SmartSwap® UV assembly with 20-mm aluminum upper plate, 20-mm quartz lower plate, and Omnicure S2000 high-pressure mercury light source (320-500 nm filter). UV intensity was measured with a Silverline radiometer and 20 mm sensor attachment for the quartz parallel plate. Data was gathered at a 500 μm gap, 0.2% strain, and 1 Hz. UV radiation was applied at an intensity 200 mW/cm$^2$ for 150 s after a 30 s delay. The rheometer was set to maintain 0 N axial force within a ±1 N tolerance through slight adjustments in gap size. Samples were run under air without purge of inert gas. All samples were run in triplicate to ensure consistency and reproducibility of this technique. Plateau storage moduli values were calculated from the last 20 s of the G' curve; moduli crossover (G'/G") values were determined using the dedicated feature in TA Instruments TRIOS software. Gel fractions were determined as the difference in dry weight before and after extraction and averaged over three replicates. Density measurements were conducted with a specific gravity kit and balance according to a previously reported procedure.[16] Dynamic mechanical analysis (DMA) was performed on a TA Instruments Q800 Dynamic Mechanical Analyzer in tension mode at 1 Hz frequency, 0.2% strain amplitude, and a heating rate of 3° C./min-140 to 150° C. Tensile experiments were performed on an Instron 5500R tensile tester at a strain rate of 5 mm/min at 23° C. Measurements of engineering stress at 100% strain in addition to engineering stress and strain at break are reported. Hysteresis experiments were performed on the same instrument from 0-300% strain at a strain rate of 20% strain/min.

Preparation of TEM Samples

Transmission electron microscopy (TEM) was performed in the dried state on spin-coated TEM grids (Formvar/Carbon 200 mesh, copper) and in liquid state via BioMatek k-kits with a 200 nm channel height, purchased through Ted Pella. Imaging was performed with both a Philips EM420 (120 kV acceleration voltage) and a JEOL 2100 (200 kV acceleration voltage) for the dry and liquid-state samples, respectively.

Spin-Casted & Photocured TEM Grids

Photocurable latex (4:1 polymer:scaffold, 5:1 NVP: PEGDA) was prepared as described above, using 1 wt % diluted latex in lieu of 50 wt % to aid imaging. Pure latex (without monomer and photoinitiator) at 1 wt % dilution was also prepared for comparison. 70 μL of each latex sample was then applied to the surface of a TEM grid and spin coated at 4000 rpm for 20 s. For photocured samples (green body akgnd IPN state), UV irradiation was applied via an Omnicure S2000 (details above), at 10% shutter for 5 s. IPN state samples were placed in a vacuum oven at 65° C. for 12 h. All other samples were mounted onto a glass slide and placed into a sealed centrifuge tube with water-saturated kim wipes to minimize drying prior to imaging. TEM imaging occurred promptly after sample preparation. The wet samples were placed directly into the TEM sample load lock to rapidly dry immediately before insertion into the instrument and imaging. The dried (IPN state) sample was imaged after directly after removal from vacuum oven.

Liquid-Cell (k-Kit) TEM (Wet-State)

Photocurable latex (4:1 polymer:scaffold, 5:1 NVP: PEGDA) was prepared as described above, using 1 wt % diluted latex in lieu of 50 wt % to aid imaging and a neat 1 wt % without added monomer and photoinitiator for comparison. Each sample was loaded into the k-kit according to a modified version of the procedure provided with the k-kit toolkit and employing a stereoscope for visualization of the process. 0.2 uL of latex was placed on the sample loading stage. The k-kit channel ends were opened via removing the sealing tips at each end, then one end of the channel was dipped into the sample droplet, ensuring contact via stereoscope observation. The ends of the k-kit body were cleaned using polypropylene swabs, followed by sealing of each end with Hysol 1C high vacuum sealant. The k-kit was allowed to sit for 1 h at atmospheric temperature and pressure to allow hardening of the sealant before mounting into the provided copper grid holder with the supplied epoxy. The k-kit was then placed in a vacuum oven at 15 mmHg and room temperature to accelerate curing of the sealant and mounting epoxy. Finally, the sample was covered in aluminum foil and stored in a cool, dark place overnight to allow full curing of the sealant.

Preparation of DMA Samples

Greenbody discs cured via photorheology as described previously. The greenbody discs were then dried in the vacuum oven at 65° C. for 12 h, extracted in acetone for 12 h and subsequently dried in vacuo at room temperature for an additional 12 h. Rectangular specimens were cut from the IPN disc films and analyzed directly.

Preparation of Dogbones from Photocast Films for Tensile Analysis

Photocurable latex was prepared as described above. 3 g of each sample was placed into a glass petri dish (9 cm diameter) and irradiated for 30 s on each side with a belt-fed photocuring system (LC-6B) from Fusion UV Systems Inc equipped with a 100 W bulb. The films were subsequently dried in vacuum oven at 65° C. for 12 h to allow drying and particle coalescence. The IPN films were then removed from the petri dish and extracted in acetone for 12 h before another drying step in vacuum oven at room temperature for 12 h to remove acetone. Dogbones were then cut from the dried and extracted films using a Pioneer-Dietecs ASTM D-638-V die and analyzed directly.

Vat Photopolymerization of Latex

Scanning Mask Projection Vat Photopolymerization Apparatus (S-MPVP)

A custom S-MPVP apparatus was used for specimen fabrication.[30] The apparatus comprises a high-resolution projector with 1080p Texas Instruments DMD (0.65"). The projector is illuminated by Dymax Bluewave 75 spot-cure lamp with a broad-spectrum emission in the range of 300-500 nm. The intensity on the projection plane, measured with a 365 nm radiometer (xx name), is 2.4 mW/cm$^2$. Using imaging and conditioning optics (DLIinnovations-DLP6500), the projection area and projected pixel size on the focal plane were measured to be 61×34 mm and 31 μm respectively. The projector is fixed on cross-mounted X-Y linear stages (ZABER: A-LST0500A-E01) to enable continuous scanning in the X-Y plane. A build stage, additively manufactured using filament extrusion of ULTEM 9085, is mounted to a high-resolution Z-stage (ZABER: A-LST0250A-E01). A glass slide (Corning 294775X50) was mounted to the top surface of the build platform to ensure a smooth build surface and good adhesion with the printed part. A custom glass vat (150×150×40 mm) was manufactured for containing the photocurable latex. A recoating blade, mounted to a custom linear actuator, was directly mounted to the X-Y gantry, enabling the control over recoating speed and recoating depth. The mechatronic elements and the projection were controlled using a custom LABVIEW program.[30]

The scanning mask projection apparatus was used in this work because it enables the fabrication of large area parts with high-resolution through the use of the unique scanning process. Instead of projecting a static frame on the resin surface, the S-MPVP system projects a movie and scans across the resin surface simultaneously. During the fabrication process, a bitmap corresponding to the layer to be printed is sliced into smaller projection rows. Each row is then split into multiple static frames such that when they are played as a movie, the entire row is projected without loss of information. The speed at which the movie is played is related to the scan speed through the S-MPVP model. Through the use of a custom rendering program, the movie is created and played real-time while the projector is scanning across the resin surface. This process is repeated for all the scanning rows and all layers if the part to be fabricated. The synchronization of the movie and the scanning process are carefully monitored to ensure consistent part fabrication.

Working Curve Generation 30 mL of photocurable latex was transferred into a glass petri dish and placed in the focal plane of the projector. A test feature (20×20 pix) was projected on the resin surface with exposure times of 5, 6, 7, 8, 10, 11, 12 and 18 seconds. The resulting cured specimens were rinsed with water and UV postcured (Melodysusie 36 W, 365 nm) for 10 minutes each side. The thickness of the specimens was plotted against exposure to generate the working curve to compute the values for Critical energy and Depth of penetration (resin curing parameters) (FIG. 13).[1]

Printing Parameter Generation with S-MPVP Model

The intensity distribution, resulting from the projection of a 1-pixel wide line on the resin surface was captured with an embedded digital camera (Logitech C920) and processed using a custom computer vision (MATLAB) program. Using a depth of penetration (Dp) and critical energy (Ec), computed via working curve, of 206 μm and 74 mJ/cm$^2$ respectively, the S-MPVP model was applied to the test specimen.[30]

Figure 14:
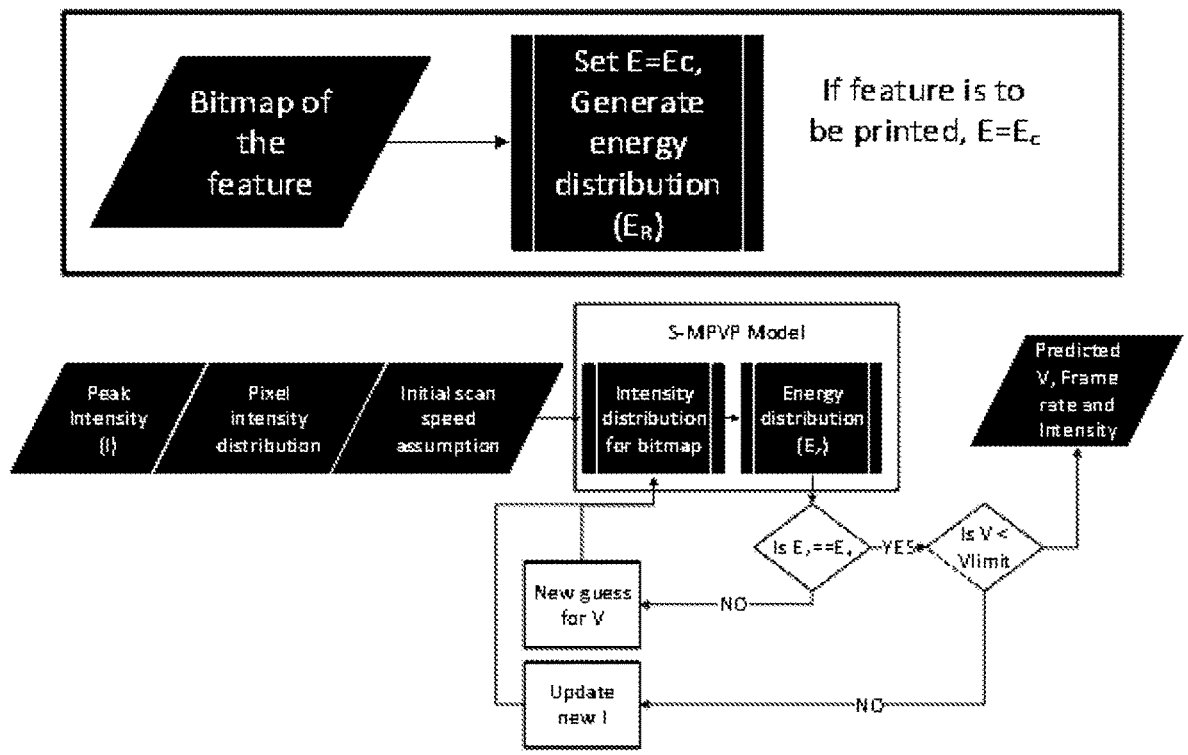
FIG. 14 is a flowchart of a method to determine the process parameters for printing with the S-MPVP system. First the desired energy distribution (ER) is numerically computed. Then, through the use of known parameters (pixel intensity distribution measured via in-situ computer vision technique and resin curing properties (Ec and Dp), the scan speed (V) and intensity (I) required to fabricate the part are iteratively determined. Additional constrains such as speed limit of the linear stages (Vlim) and the maximum intensity of the UV lamp are supplied to ensure the predicted parameters are within achievable ranges.

The reference energy distribution required to fabricate an accurate test specimen was numerically determined by setting all the energy levels equal to the resin's Ec. Then, the bitmap pattern corresponding to a layer to be fabricated was fed into the irradiance model (Equation 2) and the actual intensity distribution on the resin surface was computed. Using an algorithm to iteratively select the exposure time and projection intensity, the cured specimen dimensions were simulated with the S-MPVP model and multiple energy distributions were generated. The simulated cure dimensions were then compared against the desired specimen dimension. The combination of exposure time and intensity that resulted in fabrication of feature with error <10 μm was selected for specimen fabrication. The flowchart for the process parameter optimization is shown in FIG. 14.

For fabrication of specimens in the static mode, the optimization algorithm was modified as per Scheme 8. Through iterative selection of exposure time and grayscaling ratio, the cured specimen dimensions were simulated with the S-MPVP model. The combination of process parameters that resulted in the fabrication of features with errors <10 μm was selected for specimen fabrication.

Specimen Fabrication Via Static MPVP

Autodesk Netfabb was used to slice the STL file of the Schwarz lattice (pore size of 5 mm) and the impellor molds into 100 μm layers. The layers were then converted into bitmap images with a resolution of 801 DPI. Photocurable latex was transferred into the resin vat and the build platform was lowered 100 μm (layer thickness) into the resin. The projector, while remaining stationary above the build platform, projected bitmap patterns corresponding to each layer for an exposure time of 8 seconds. The first layer was exposed 3 times to ensure good adhesion with the glass slide. The build platform was then lowered into the resin to agitate the latex and prevent evaporation of water. After accounting for the layer thickness, the build platform was raised to the appropriate height for recoating. A recoating blade traversed across the printed tensile specimen to enforce deposition of a uniform layer of uncured resin. The recoating speed was controlled to 5 mm/s to prevent dislodging of printed specimen. The projection and recoating cycles were repeated until complete fabrication of the part. Printed greenbodies were removed from the build platform and cleaned thoroughly with water to remove uncured resin. Cleaned greenbodies were UV-postcured for 10 minutes (each side).

Specimen Fabrication Via Scanning Mask Projection Vat Photopolymerization (S-MPVP)

Autodesk Netfabb was used to slice the STL file of the tensile specimens (modified ASTM-638 V) into 100 μm layers. The layers were then converted into bitmap images with a resolution of 801 DPI. Photocurable latex was transferred into the resin vat and the build platform was lowered 100 μm (layer thickness) into the resin. The projector scanned across the resin surface with a scan speed of 4.286 mm/s, while simultaneously projecting the generated bitmap layers as a movie with a frame rate of 135 frames/second. The first layer was exposed three consecutive times to ensure good adhesion with the glass slide. The build platform was then lowered into the resin to agitate the latex and prevent evaporation of water. After accounting for the layer thickness, the build platform was raised to the appropriate height for recoating. A recoating blade traversed across the printed tensile specimen to enforce deposition of a uniform layer of uncured resin. The recoating speed was controlled to 5 mm/s to prevent dislodging of printed specimen. The projection and recoating cycles were repeated until complete fabrication of the part. Printed greenbodies were removed from the build platform and cleaned thoroughly with water to remove uncured resin. Cleaned greenbodies were UV-postcured for 10 minutes (each side).

Post-Processing of 3D Printed Objects

Post-cured specimens were transferred onto Teflon sheets and placed in a vacuum oven, preheated to 45° C. The specimens were placed under vacuum, 3 in. Hg, for 48 hours. The pressure inside the vacuum chamber was slowly equilibrated over 10 minutes and the dried parts were removed for imaging and mechanical testing.

Results and Discussion

Synthetic Design of Photocurable Polymer Latexes

Figure 4:
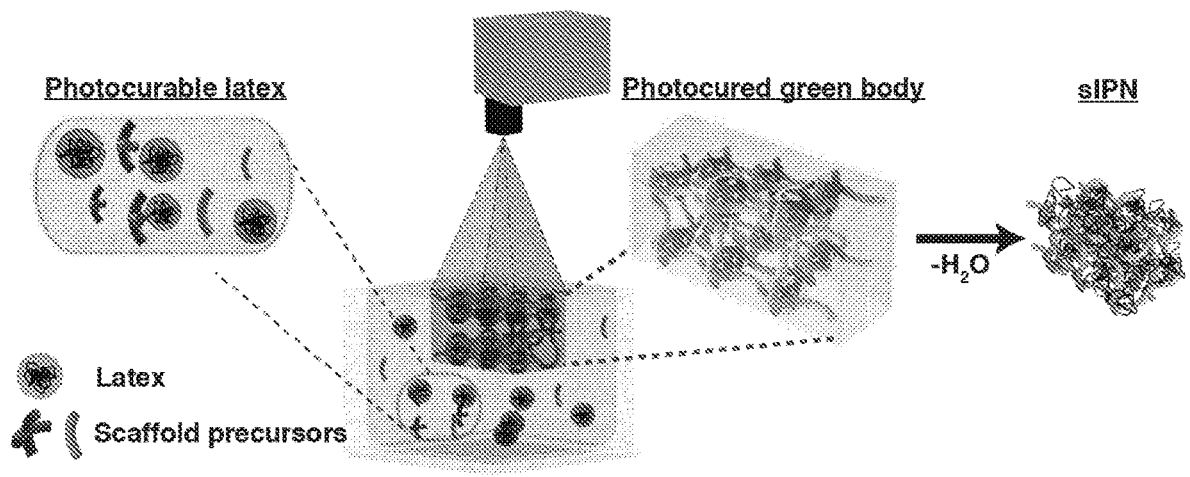
FIG. 4 is a schematic of Vat photopolymerization printing and post-print processing of photocurable latex into semi-interpenetrating polymer networks (sIPN).

FIG. 4 illustrates VP of photocurable polymeric latexes to print high molecular weight polymers. Facile addition of network precursors and photoinitiator to the continuous, aqueous phase of the latex enables photogeneration of the supporting scaffold. UV exposure during printing initiates photocrosslinking of these precursors to form a supporting scaffold around the latex particles, which yields a freestanding "green body" hydrogel embedded with high molecular weight latex particles. Subsequent drying and annealing of the green body enables the polymeric particles to diffuse and coalesce throughout the printed object. The resulting sIPN consists of two discrete components: (1) a photo-crosslinked scaffold network, which serves to design the 3D shape of the object, and (2) an entangled, high molecular weight latex polymer, which dictates mechanical performance of the final printed object. This strategy is suitable for any polymeric colloid; however, our initial focus on elastomers provides a convincing example of the importance of high molecular weight to attain high mechanical performance. Emulsion polymerization commonly affords styrene-butadiene rubber (SBR) latexes and represents a pervasive industrial elastomer otherwise unavailable for AM.

FIG. 4 shows a schematic of Vat photopolymerization printing and post-print processing of photocurable latex into semi-interpenetrating polymer networks (sIPN). Photocrosslinking of scaffold molecules in the continuous phase of latex entraps polymer particles into a solid green body. Drying of the greenbody enables the polymer within the particles to penetrate the scaffold and coalesce, harnessing the mechanical properties of the latex polymer.

A suitable scaffold must meet three basic criteria: (i) scaffold monomers and photoinitiators must not disrupt the latex stability, (ii) scaffold monomers must rapidly photocure into a robust network capable of supporting colloidal particles in a 3D design with sufficient modulus for printing, and (iii) scaffold composition must enable both printability (curing kinetics, green body strength) and part performance (tensile strength, elasticity). Addressing each criterion is critical to enable robust green bodies, which maintain complex geometric features during printing, and ensure desired performance upon particle coalescence and drying.

Figure 5:
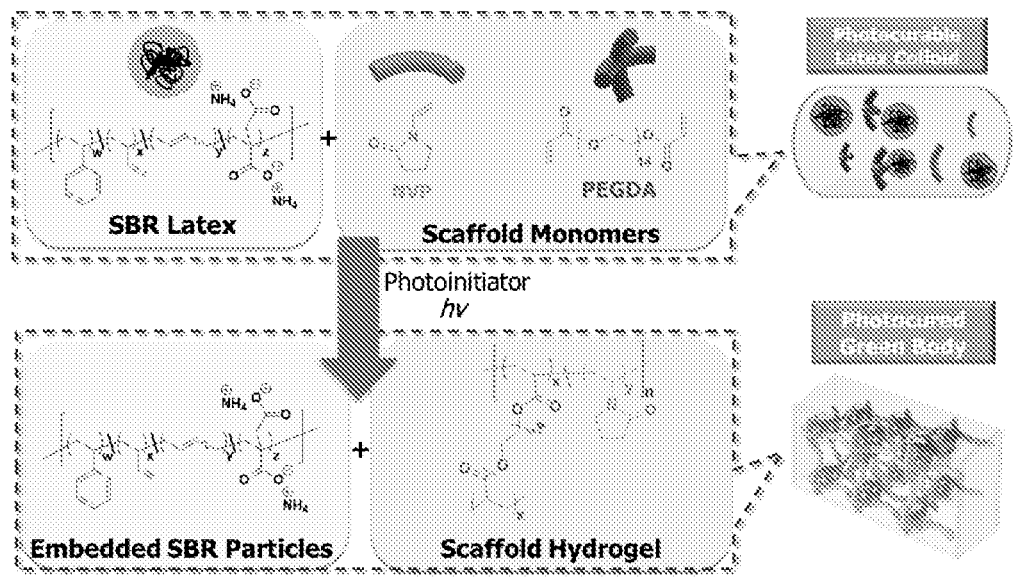
FIG. 5 is a schematic of continuous-phase photocrosslinking strategy to create photocurable latex.
Figure 6A:
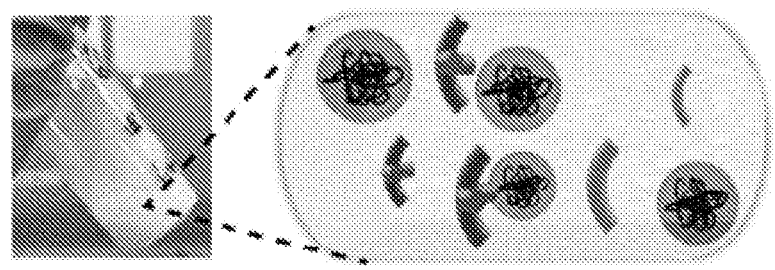
FIGS. 6A-6K show investigation of photocurable latex to sIPN approach.
Figure 6B:
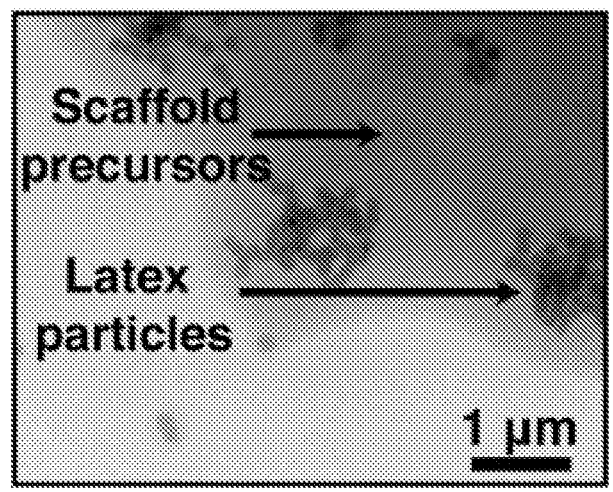
Figure 6C:
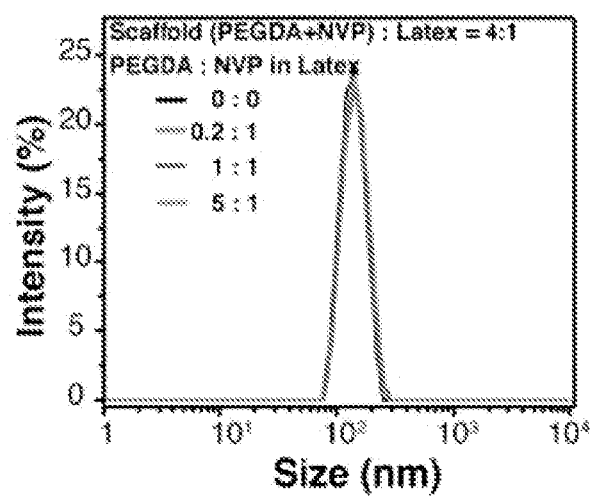
Figure 6D:
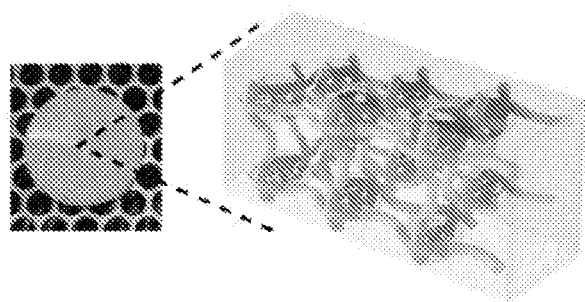
Figure 6E:
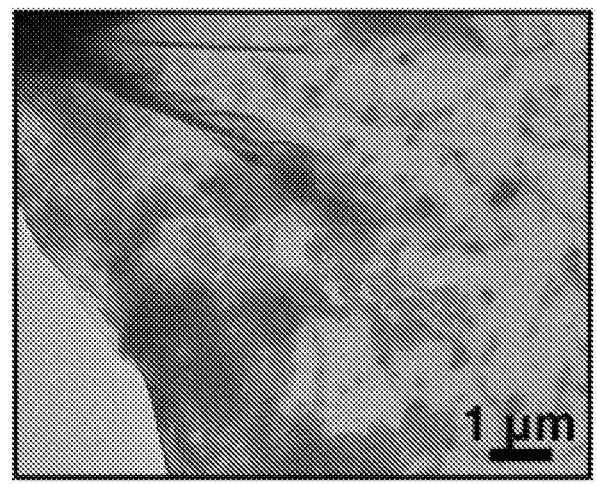
Figure 6F:
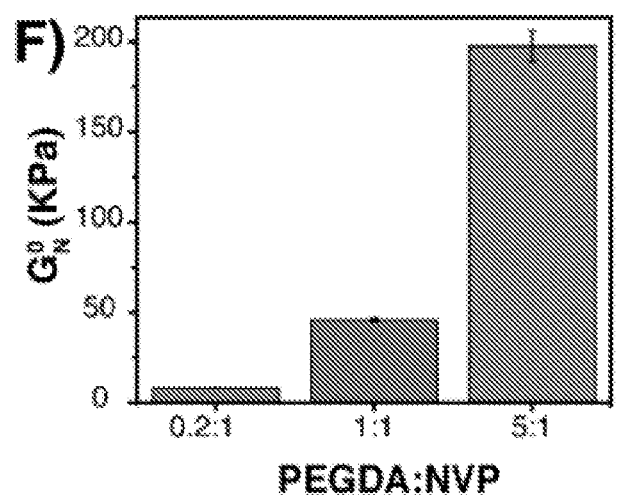
Figure 9:
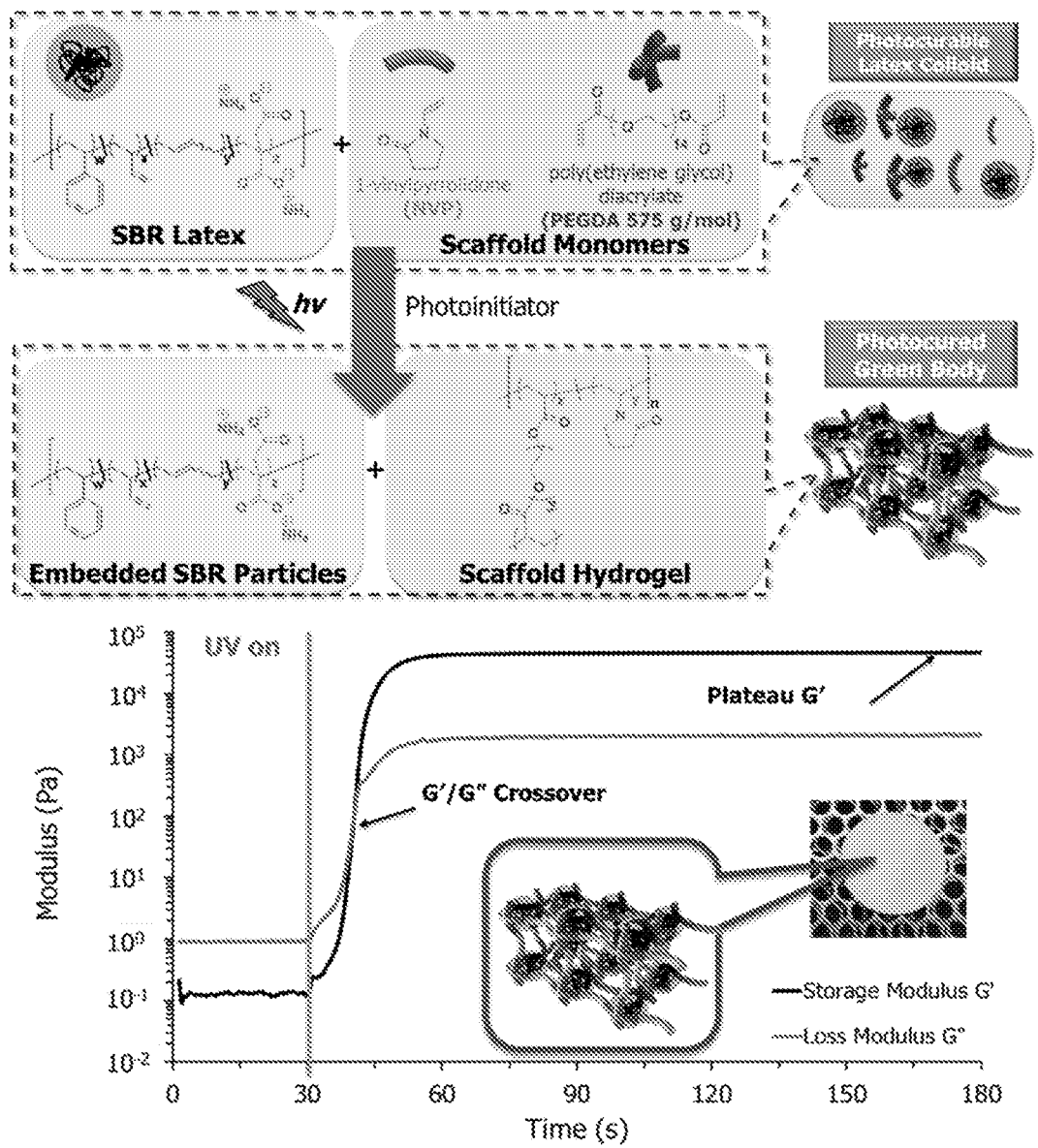
FIG. 9 is a schematic of photocuring of PEGDA and NVP in the continuous phase of SBR latex yields hydrogel embedded with SBR particles. Photorheology elucidates this photocuring behavior as storage modulus (G' & G") as a function of UV light exposure. Light on at 30 s mark.

Illustrated in FIG. 5, the combination of N-vinyl pyrrolidinone (NVP) and poly(ethylene glycol) diacrylate (PEGDA) served as a suitable scaffold monomer and crosslinker, respectively, and this combination allowed VP-printed SBR latexes. Dynamic light scattering (DLS), (FIG. 6C) confirmed that the scaffold monomers did not deleteriously influence SBR particle size or particle size distribution. Photorheological measurements demonstrated the potential for efficient photocuring and desirable green body storage moduli as a function of UV light exposure (FIG. 9). The plateau shear storage modulus ($G_N^0$) relates to the Moof the photocrosslinked network[8] and ensures structural rigidity of the green body as a function of monomer composition, as shown in FIG. 6F. $G_N^0$ increased significantly (8-200 kPa) with an increase in the concentration of the PEGDA crosslinker, i.e., higher weight ratios of PEGDA:NVP. Tuning this ratio enabled optimization of both printing (higher $G_N^0$ for structural fidelity of green bodies) and final sIPN mechanical performance (lower $G_N^0$ for better tensile properties post drying). Considerations of colloidal stability restricted total scaffold loading (SBR: scaffold) to more narrow compositional ranges and a 4:1 ratio (80 wt. % SBR and 20 wt. % scaffold) was deemed optimal for these studies.

FIG. 5 is a schematic of continuous-phase photocrosslinking strategy to create photocurable latex. Incorporation of n-vinyl pyrrolidinone (NVP) and poly(ethylene glycol) diacrylate (PEGDA) into continuous-phase enables photoactivated crosslinking and solidification of liquid latex.

Figure 6G:
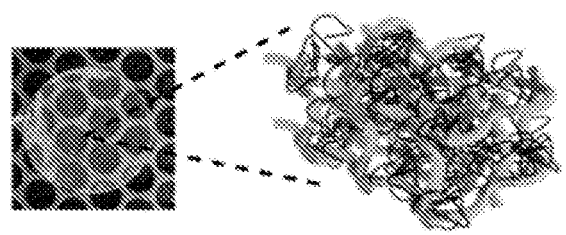
Figure 6H:
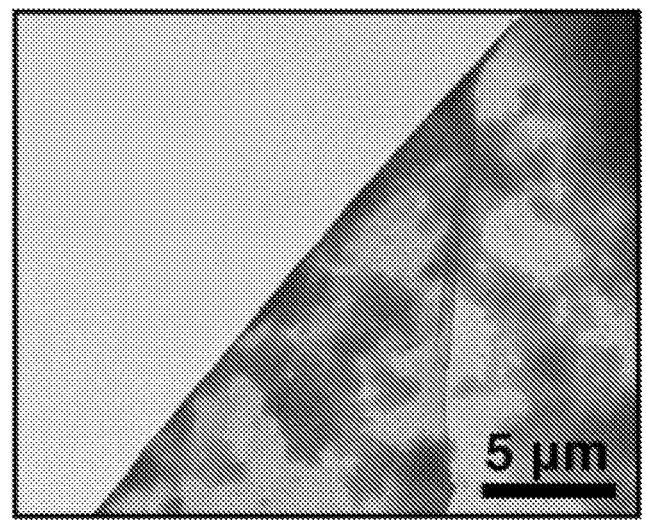
Figure 6I:
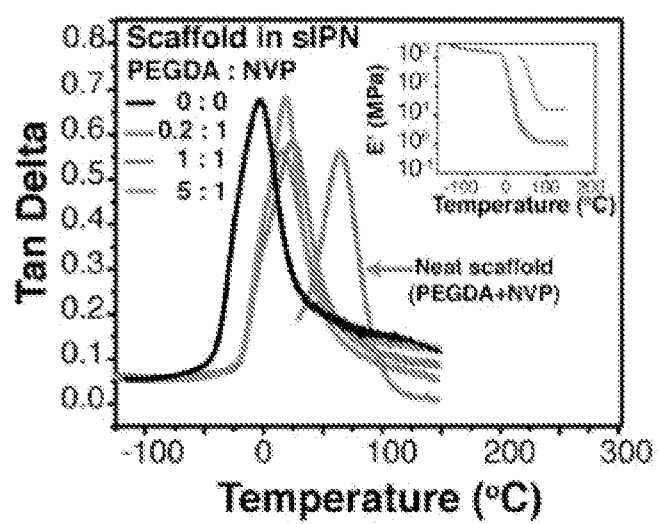
Figure 6J:
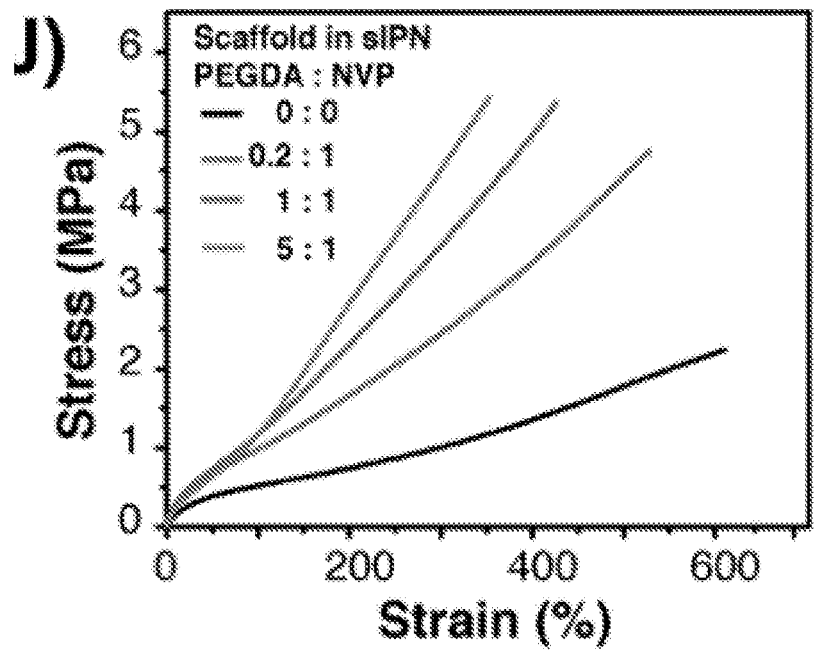
Figure 6K:
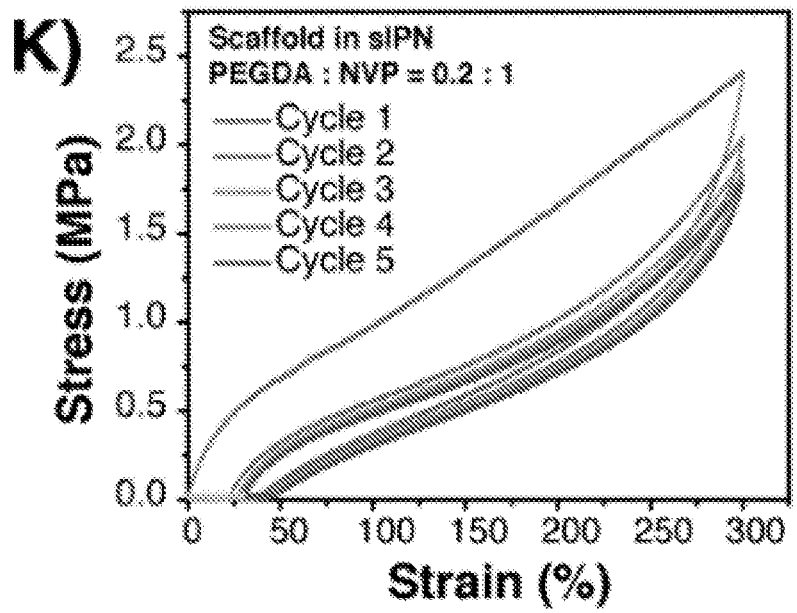

Drying the photocured green bodies in vacuo changed the film appearance from opaque white to translucent (shown in FIG. 6D & FIG. 6G), which was consistent with the loss of discrete, light-scattering nanoscale domains due to particle coalescence. Furthermore, their mechanical strength increased substantially from a soft, fragile green body hydrogel to ductile elastomers. FIG. 6J illustrates the effect of scaffold composition on tensile behavior; in particular, sIPN's exhibit a higher ultimate stress and lower ultimate strain at higher scaffold crosslink densities (increased PEGDA:NVP). Previous literature examples of elastomer-based IPNs are similar as a function of both elastomer concentration and network crosslink density.[25-27] Moreover, a more highly crosslinked scaffold will presumably decrease the particles' ability to diffuse and coalesce, leading to less extensibility. sIPNs at the lowest scaffold crosslink density (lowest PEGDA:NVP wt. ratio) achieved strains exceeding 500% and fully reversible deformation over five cycles at 300% strain (FIG. 6K). It is important to note that cross-linked scaffold controls (without latex) were too brittle and prevented tensile specimen preparation, which further suggested that the scaffold serves as a structural template for the printed 3D shape; the interpenetrating, high molecular weight SBR polymer dominates the ultimate mechanical properties. Thus, VP of latexes enables printing of low viscosity colloids that subsequently manifest mechanical performance of the high molecular weight polymers and, consequently, address the paradox of printability and performance for VP.

FIGS. 6A-6K show investigation of photocurable latex to sIPN approach. (FIG. 6A) photocurable latex, (FIG. 6D) photocured green body, and (FIG. 6G) dried sIPN. (FIG. 6B) TEM of uncured, photocurable latex spin-casted on grid. Apparent aggregation of particles is artifact of sample preparation. (FIG. 6C) DLS confirms consistent particle size and distribution with and without scaffold monomers. (FIG. 6E) TEM of spin-casted photocured latex in green body state (FIG. 6F) Green body $G_N^0$ across scaffold compositions (FIG. 6H) TEM of spin-casted photocured latex in dried, IPN state. (FIG. 6I) DMA of sIPNs across scaffold composition (FIG. 6J) Tensile performance of photocast & dried IPNs across scaffold compositions. (FIG. 6K) Cyclic loading to confirm elastic deformation and hysteresis (0.2:1 PEGDA:NVP).

Figure 10:
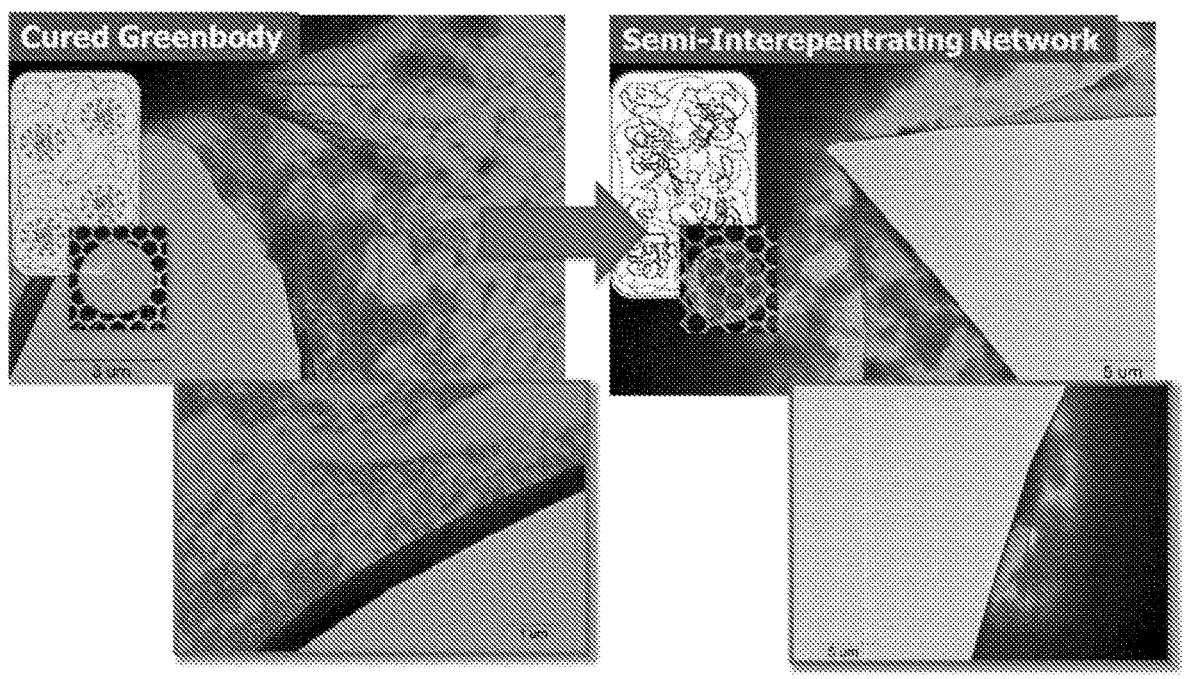
FIG. 10 shows drying of photocured greenbodies yields translucent sIPN networks. TEM confirms coalescence of SBR particles entrapped in NVP/PEGDA photocured scaffold.
Figure 11:
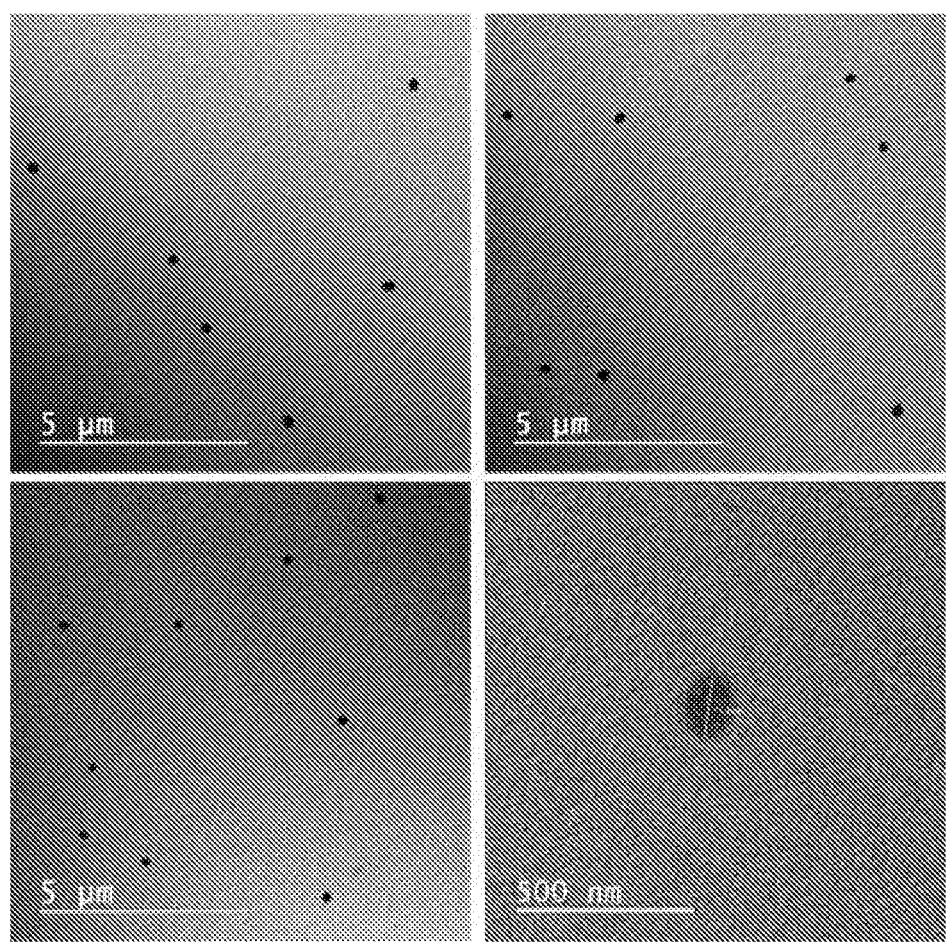
FIG. 11 shows TEM images of photocured latex greenbody in wet state (k-kit) showing well dispersed particles throughout curing process.
Figure 12:
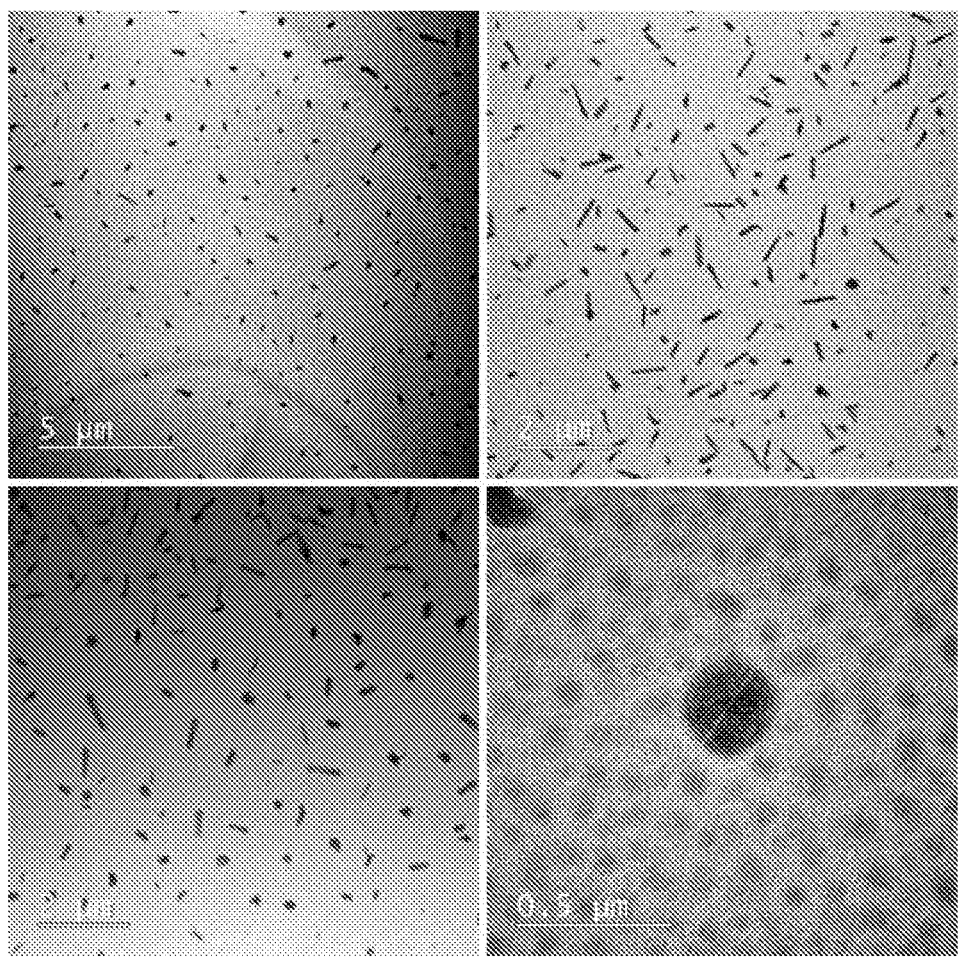
FIG. 12 shows TEM images of photocured latex in dried state (k-kit) showing well dispersed particles with increased radius due to penetration with scaffold. Rod-like objects are fragments that appeared after drying and are likely from the k-kit body itself.

Transmission electron microscopy revealed morphological transitions across the entire process from photocurable colloids to sIPNs. Spin-casted diluted latex samples (1 wt. % solids) onto TEM grids enabled imaging of the latex particles. Photocuring and subsequent drying of these grids facilitated analysis of the green bodies and sIPN's, respectively. In the colloid precursor (FIG. 6B), excellent contrast existed between the SBR particles and the scaffold monomers. TEM provided particle diameters that agreed well with DLS measurements in both the absence and presence of scaffold monomers, approximately 150 nm. The spin-coating process partially dries the samples, which presumably induces particle aggregation; DLS (FIG. 6C) and wet-cell TEM (FIG. 11 & FIG. 12) images confirm well-dispersed particles in the colloid precursor. Photocuring a spun-cast film on a TEM grid confirms a continuous scaffold film embedded with SBR particles (FIG. 6E). Particles were only located within this film, suggesting the network scaffold efficiently entraps the colloidal particles. After water removal in vacuo, the particles penetrated the scaffold and coalesced, and the loss of spherical shape and nanoscale phase separation supported this mechanism, as depicted in FIG. 6H & FIG. 10.

IPNs (containing two intertwined polymeric networks) and sIPNs (containing a single crosslinked network and non-crosslinked polymer) are widely recognized for their unique morphology and (thermo)mechanical properties.[28] Due to a high degree of network mixing, sIPNs commonly exhibit shifting of their component glass transition temperatures ($T_g$) to a single intermediate value, as predicted using the Fox relationship for random copolymers.[28,29] Dynamic mechanical analysis (DMA) (FIG. 6I) shows similar behavior for the all dried parts with single $T_g$'s at approximately 16, 24, and 18° C. (as measured from DMA tan 6 maxima) for the 5:1, 1:1, and 0.2:1 PEGDA:NVP, respectively. Each intermediate transition temperature favors the $T_g$ of the major component, SBR (80 wt. %), and occurs near the Fox prediction of 16° C. based on the $T_g$ of the neat scaffold (1:1 PEGDA:NVP). It is important to note that these results also suggest an unprecedented methodology for preparing sIPNs with implications for membrane technologies beyond the scope of additive manufacturing.

Printing Light-Scattering Materials Via Vat Photopolymerization

FIGS. 7A-7F show Vat photopolymerization of light-scattering latex. Scanning mask projection vat photopolymerization (S-MPVP) enables fabrication of specimens with large footprint and high resolution. (A-C) In-situ computer vision captures actual UV intensity distribution on the resin surface. Clear resins (A) scatter less UV light which results in uniform gradation of intensity on the resin surface (white→gray) while heterogeneous resins (B), such as the photocurable latex, scatter more UV light and lower the peak intensity distribution in the resin (gray throughout). (C) Normalization reveals non-uniform scattering inside the projection area. (D) Comparing the desired dimension (red box) with the square pillar printed without compensating for the XY-UV scatter highlights that the printed part exceeds design dimensions and has rounded edges with poor edge definition (E) Compensating for XY-UV scatter through iterative optimization of projected intensity distribution results in the fabrication of pillars with improved dimensional accuracy and edge definition. (F) Modeling the energy distribution for specimens printed via scanning process enables control of cure-through and dimensional accuracy by varying scan speed and projection frame rate. The optimized printing parameters selected for this work are predicted to induce a XY-dimensional reduction of 8 μm at a cure depth of 100 μm. Truncating the cure depth by setting the layer thickness to 100 μm results in a cure profile that is similar to the desired profile.

Our research demonstrates that photocurable latexes overcome the printability-mechanical performance paradox, enabling VP of high molecular weight polymers at a printable viscosity (<10 Pa·s); however, the existence of discrete colloidal particles introduces a new obstacle for VP. The colloidal particles in the photo-reactive latex scatter the patterned UV light, which is incident on the liquid surface.[23] Light scattering (i) lowers the average intensity that the latex experiences, which lengthens cure times, and (ii) lowers the achievable printed feature resolution and the surface finish of the printed parts. To the best of our knowledge, a process-based approach to compensate for this scattering does not exist in the literature, and therefore others typically employ UV absorbing additives in colloidal printing examples.[24] These additives potentially disrupt colloidal stability and restrict versatility of a latex printing approach. Thus, a new printing method is required, in concert with latex design, to mitigate light-scattering effects. Our approach involves a computer vision-based determination of printing parameters and enables precise fabrication of complex geometric features from polymer latexes.

Mitigation of light scattering in heterogeneous photopolymers requires (i) imaging of the scattered intensity distribution on the resin surface, (ii) prediction of resulting cured feature dimensions, and (iii) subsequent generation of corrected printing parameters (i.e., exposure time and gray scaling of the projected layer bitmap) to compensate for scattering effects and achieve target feature dimensions. Specifically, a machine vision device (i.e., digital camera) images a projected UV test pattern and the scattered light around the projected pattern at the resin surface. A computer vision algorithm then analyzes the captured image to extract the intensity distribution of a single projected pixel from the captured test pattern. In conjunction with part design specifications (layer bitmap pattern and thickness) and material curing parameters (depth of penetration, Dp, and critical energy, Ec), this computed single-pixel intensity profile quantifies scattering effects in the resin and enables the use of our previously described VP process model[30] to predict the cured feature dimensions for heterogenous polymeric systems in VP. The approach employs an optimization scheme, and printing parameters are iteratively varied in the model to maximize the fit of the predicted cured feature dimensions with design specifications.

Figure 7A:
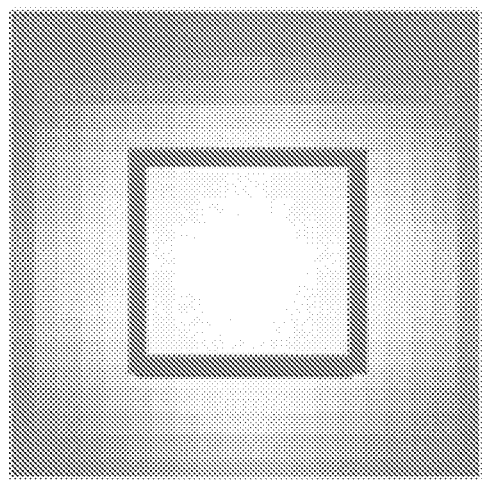
FIGS. 7A-7G show Vat photopolymerization of light-scattering latex. (7D FIG. 7A-FIG. 7C) In-situ computer vision captures actual UV intensity distribution on the resin surface. Clear resins (FIG. 7A) scatter less UV light which results in uniform gradation of intensity on the resin surface (white□gray) while heterogeneous resins (FIG. 7B), such as the photocurable latex, scatter more UV light and lower the peak intensity distribution in the resin (gray throughout).
Figure 7B:
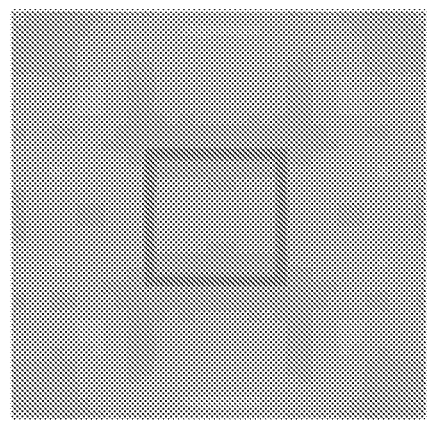
Figure 7C:
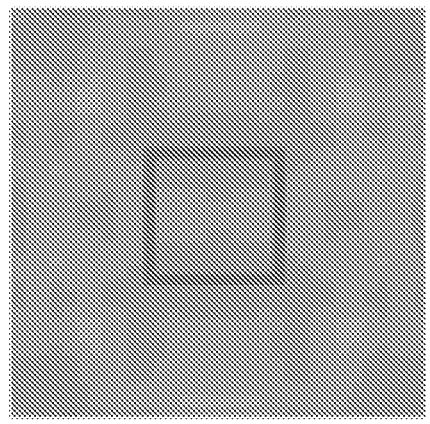
Figure 7D:
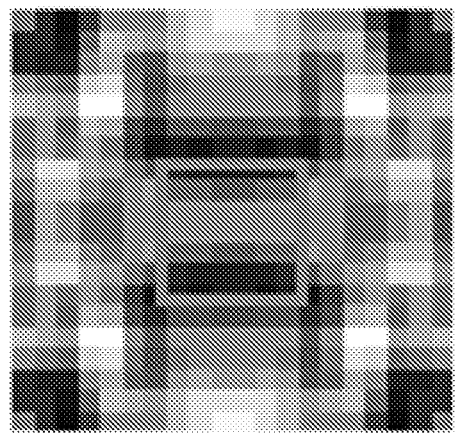
Figure 7D:
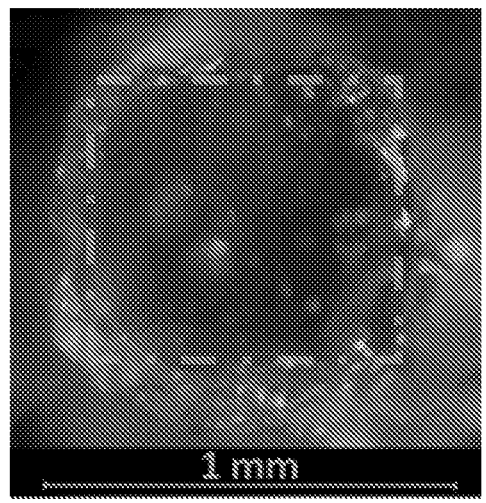
Figure 7E:
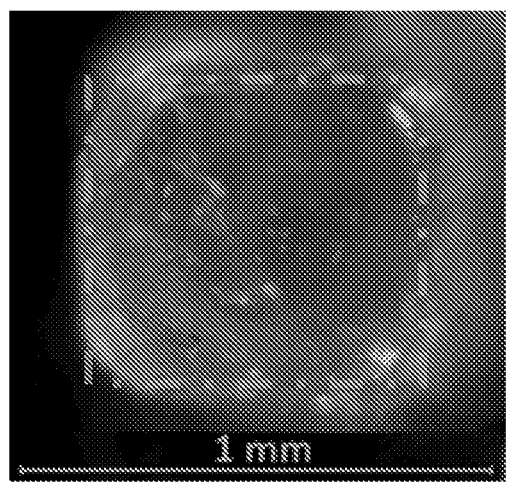

A digital camera captured the intensity map, $I_{camera}(X,Y)$ for a projected test pattern as a matrix with a relative intensity scale ranging from 0-255 (0=lowest intensity level, 255=highest intensity level). A computer-vision algorithm then extracted the intensity distribution of a pre-selected edge pixel ($I_{pix}(X,Y)$).[30] A thresholding condition (Equation 1) enabled the computation of the extent and magnitude of spatial scatter (XY plane; i.e., resin surface) around the selected pixel. Inputting the captured single pixel intensity distribution $I_{pix}(X,Y)$ into our previously described irradiance model[30] numerically reconstructed the overall intensity distribution of the projected test pattern ($I_{proj}(X,Y)$), as shown in Equation 2. Normalizing and mapping the computed $I_{proj}(X,Y)$ with the mean actual projection intensity measured with a UV radiometer, facilitated computation of the intensity levels in $I_{pix}(X,Y)$. Compared to homogeneous, clear systems, $I_{pix}(X,Y)$ for the latex elucidates extensive scattering and reduction in peak intensity, as evidenced by the low intensity levels (gray) in the reconstructed image (FIG. 6B & FIG. 6C). Scattering caused the projected intensity to spread to a radius of 58 μm (FIG. 6C) from the center of the projected pixel, which is 28 μm more than homogeneous, clear resins. Normalizing $I_{pix}(X,Y)$ revealed non-homogeneous intensity distribution due to UV scattering by polymer particles in the projection area, as shown in FIG. 7C.

$$I_{pix}(X,Y) = I_{camera}(X,Y), \text{ if } I_{camera}(X,Y) \geq I_{background} \quad (1)$$

where $I_{camera}(X,Y)$ and $I_{background}$ correspond to the intensity distribution captured by the camera and the threshold intensity value (when the resin is not irradiated with UV light) respectively.

$$I_{proj}(X,Y) = \Sigma I_{pix}(x,y) \times B_{i,j} \quad (2)$$

where i, j corresponds to the index of projected pixel in the bitmap image (1≤i≤1920, 1≤j≤1080) and $B_{i,j}$ is a discrete function that represents the state of the pixel in the bitmap pattern (i.e., $B_{i,j}$=1 if the pixel at location "On" and $B_{i,j}$=0 otherwise)

Figure 13:
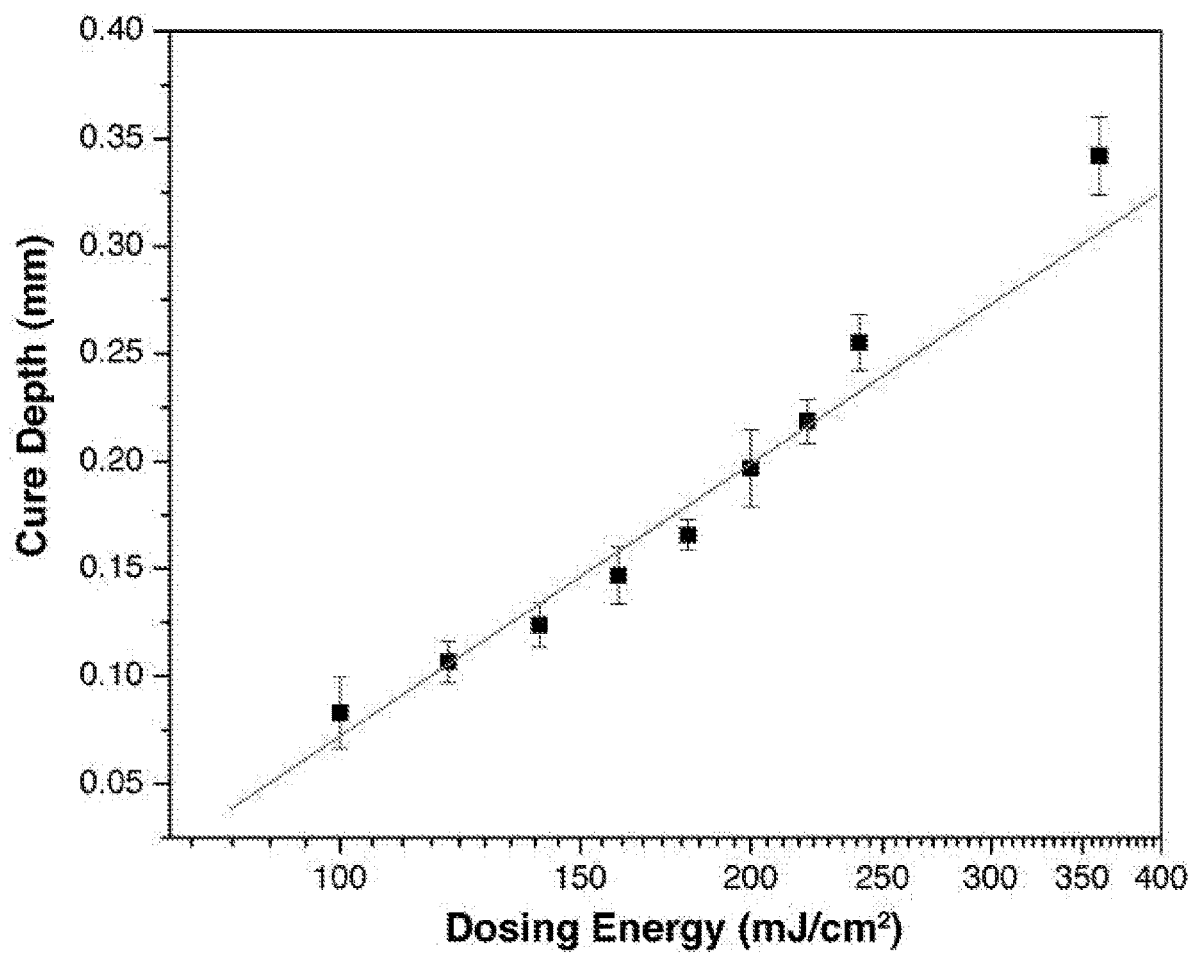
FIG. 13 is a graph of working curve of the 0.25:1 PEGDA:NVP latex composition shows adherence to the Jacobs equation when the layer thickness is <700 μm. The Critical Energy and Depth of penetration were calculated to be 74 mJ/cm2 and 206 μm respectively

The previously developed energy and cure models[30] remained valid for the photocurable SBR latex due to adherence to the Jacobs equation[1] for target layer thicknesses under 700 μm (FIG. 13). For the fabrication of small parts (<50×35 mm) with the standard mask projection vat photopolymerization apparatus, simulation of the energy profile and computation of cure width ($I_w$) for various exposure times (t) utilized the $I_{proj}(X,Y)$ input and predetermined curing parameters, i.e., depth of penetration and critical energy, in the standard mask projection energy and cure models as shown in Equation 3 and Equation 4, respectively.

$$E_{proj}(X, Y, Z) = E_{proj}(X, Y) \times e^{-z/D_p}, \text{ for } 0 < z < Z \text{ where} \quad (3)$$
$$E_{proj}(X, Y) = I_{proj}(X, Y) \times t, 0 < t < T$$

$$l_w(Z) = x_1 - x_2, \quad (4)$$
$$\forall Z > 0 \text{ where } x_1 = X \text{ when } E_{proj}(X, 0, Z) = E_c \text{ as } X > 0 \text{ and}$$
$$x_2 = X \text{ when } E_{proj}(X, 0, Z) = E_c \text{ as } X > x_1$$

Figure 17A:
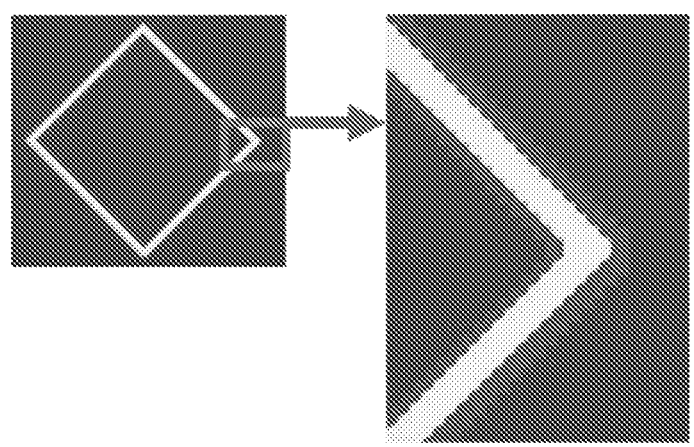
FIGS. 17A-17B shows the single-pixel intensity distribution, captured via computer vision, is used to compute the overall intensity profile for any pattern projected on the resin surface. Simulations of the intensity distributions arising from the projection of a simple square lattice (FIG. 17A) and the Schwarz lattice (FIG. 17B) illustrate the disagreement between the desired profile and the actual projected profile. The scattering at the edges leads (red and green regions in (FIG. 17A) and (FIG. 17B) respectively) to the fabrication of oversized features with poor edge definition
Figure 17B:
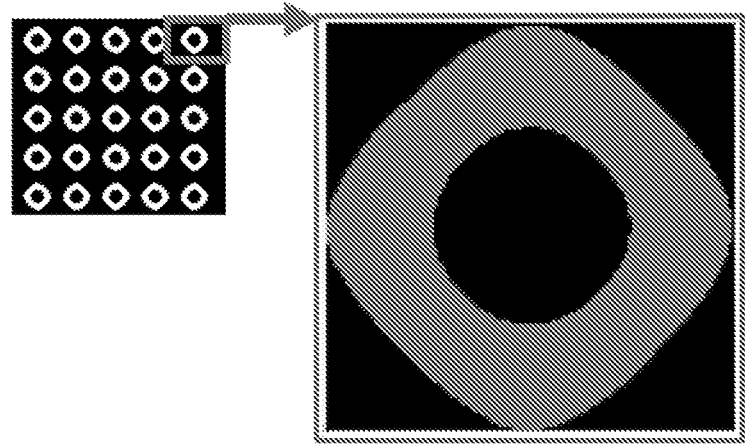
Figure 18A:
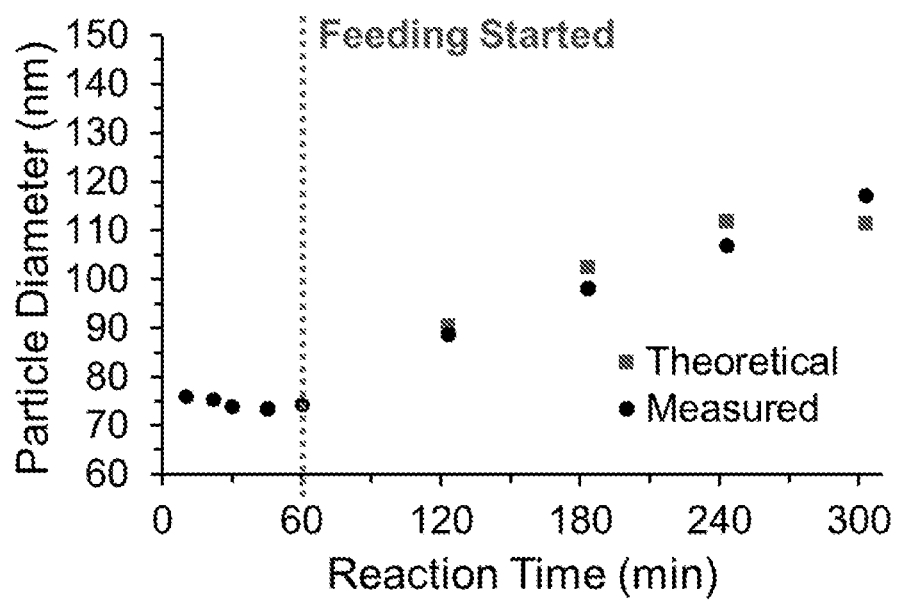
FIGS. 18A-18B show particle size and evolution of 50 wt % HMA latex during batch and semibatch (started at 60-min mark) emulsion polymerization (FIG. 18A) and DLS analysis of particle sizes of latexes across copolymer compositional range (FIG. 18B).
Figure 18B:
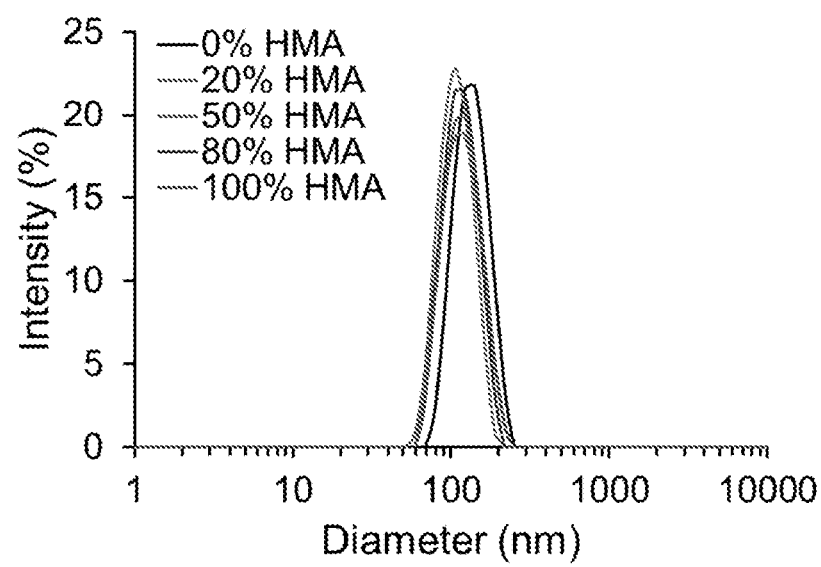
Figure 19:
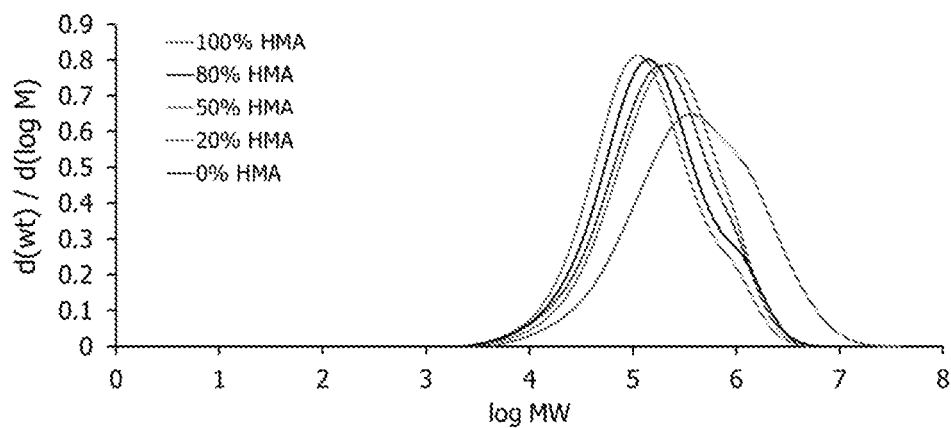
FIG. 19. SEC of MMA/HMA copolymers and homopolymers
Figure 20:
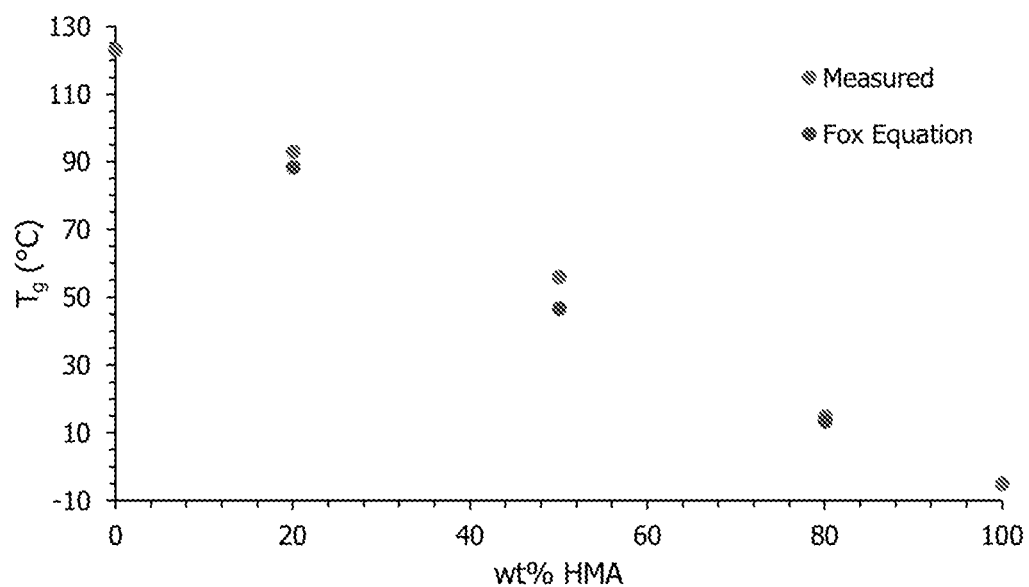
FIG. 20 is a graph of measured $T_g$ values (via DSC) for all latex polymers across compositional range. Close agreement with fox equation predictions suggests random copolymerization.
Figure 21:
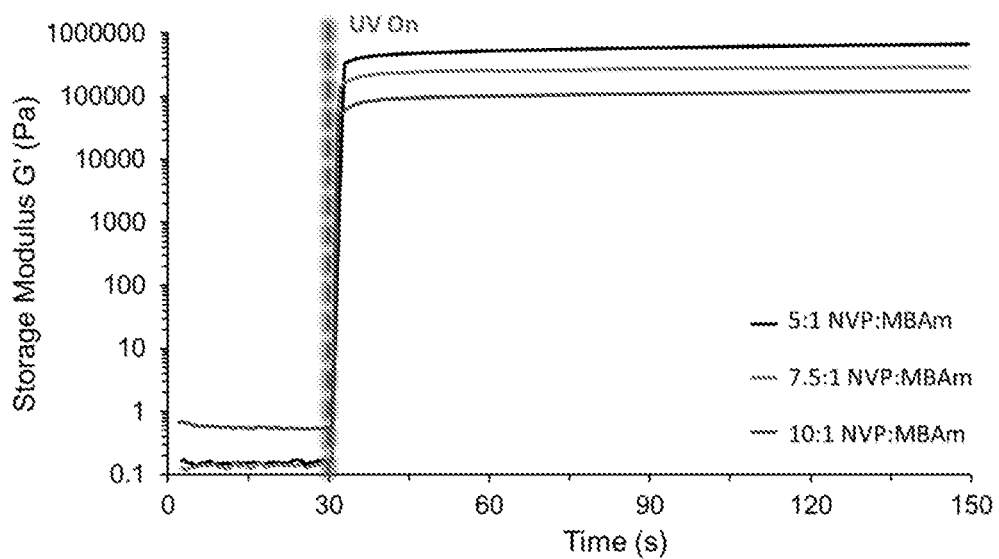
FIG. 21 is a graph of photorheology of 20 wt % HMA latex at total loading of 8:1 Latex:Scaffold. Investigation of varied scaffold monomer (NVP) to crosslinker (MBAM) weight ratios.
Figure 22:
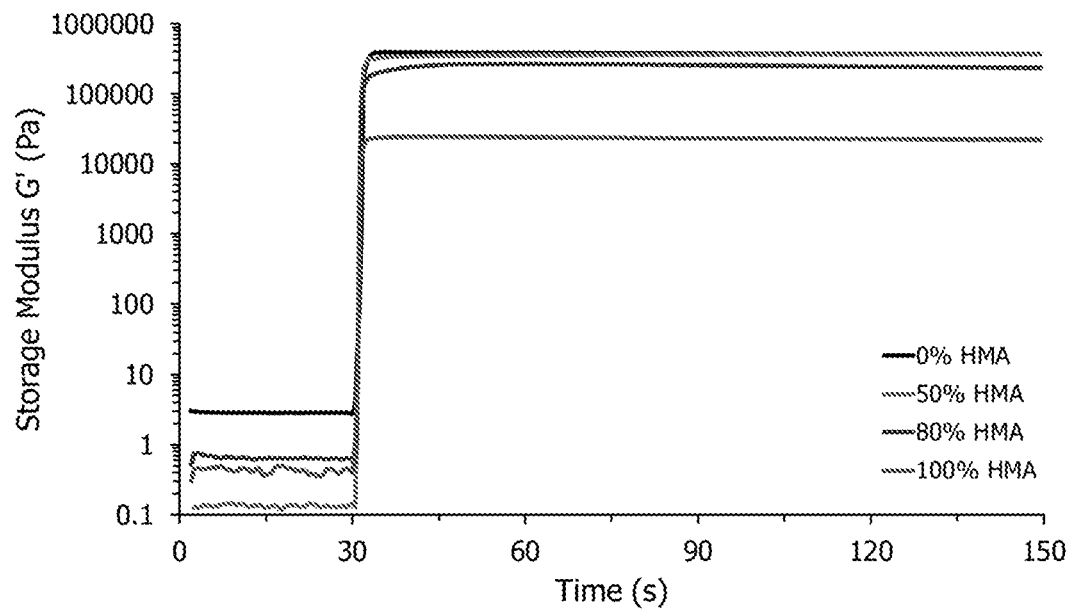
FIG. 22 is a graph of photorheology of MMA/HMA latex series with 8:1 Latex:Scaffold and 10:1 NVP:MBAm
Figure 23:
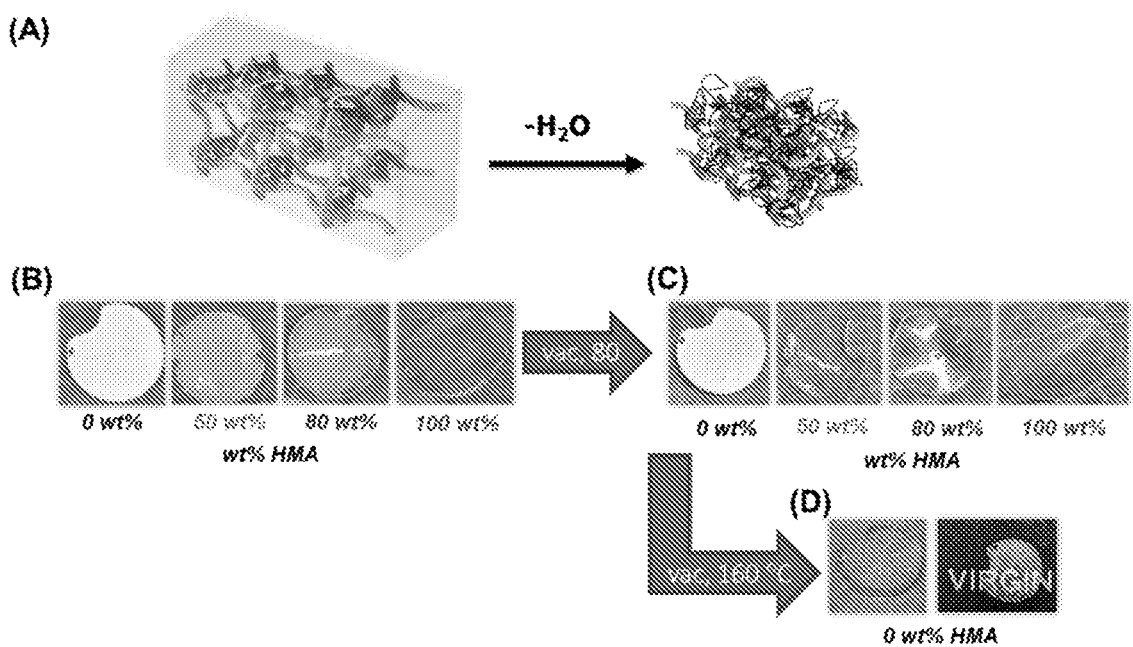
FIG. 23 is a schematic showing (part A) Graphical representation of drying and interpenetrating process from photocured greenbody to sIPN states. (part B) 20 mm photocured greenbody discs within minutes of photocuring (some drying on benchtop during sample preparation). (part C) Discs after drying in vacuo overnight at 80° C. Opacity implies retention of discrete latex particle domains. (part D) 0 wt % HMA (PMMA homopolymer) after drying overnight at 160° C.
Figure 24:
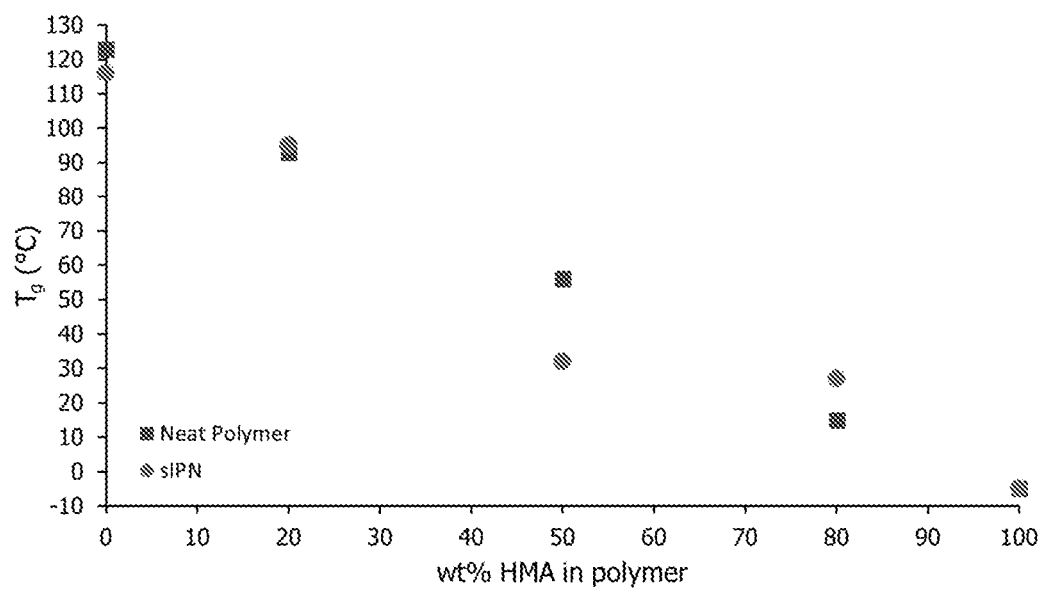
FIG. 24 is a graph of comparison of measured Tg values (from DSC) for neat latex polymers and their corresponding sIPN's.

Based on predetermined exposure time for a desired layer thickness (via the Jacobs equation), a characterization specimen with square pillars was fabricated. The printed pillar (FIG. 6E) and the simulations of the energy profiles for the Schwarz lattice (FIGS. 17A-17B) for the photocurable latex demonstrate poor edge definition and a disagreement between the projected cure width ($I_w$) and the design-specified width ($I_{wd}$) due to light scattering. An optimization scheme (Scheme 8) corrected this inaccuracy, as demonstrated in FIG. 6F, by iteratively varying the exposure time (t) and pixel gray-scaling ratio (p), which enabled both gross and fine control of cure width, respectively. As an illustrative example, the utilization of this optimization scheme to print a layer of the Schwarz primitive lattice from photocurable latex yielded an adjusted exposure time, gray-scaling ratio and layer thickness of 8 s, 0.7 and 129 µm, respectively. Specimens were printed with a layer thickness of 100 µm to improve inter-layer network formation.

For: $0 < t < T$ and $0 < p < 1$

Solve: $E_{proj}(X, Y, 0)$ where: $I_{proj}(X, Y) = \sum_{i,j} p \times I_{pix}(X, Y) \times B_{i,j}, \forall (X, Y)$ Subject to: $|l_w - l_{wd}| \leq 10^{-9}$ Scheme 8. Optimization scheme to maximize dimensional conformance on the resin surface in the XY plane for static VP systems; i.e. line width on the resin surface ($l_w$)=design line width ($l_{wd}$) To enforce this condition, layer exposure time (t) and pixel gray-scale ratio (p), are Iteratively incremented and the resulting energy profile ($E_{proj}(X,Y,0)$) and the line width L are numerically computed. The optimization ends when $|l_w-l_{wd}|$ is less than the selected tolerance of $10^{-9}$ and the resultant exposure time (f) and gray-scale ratio (p) are used for part fabrication.

Figure 16:
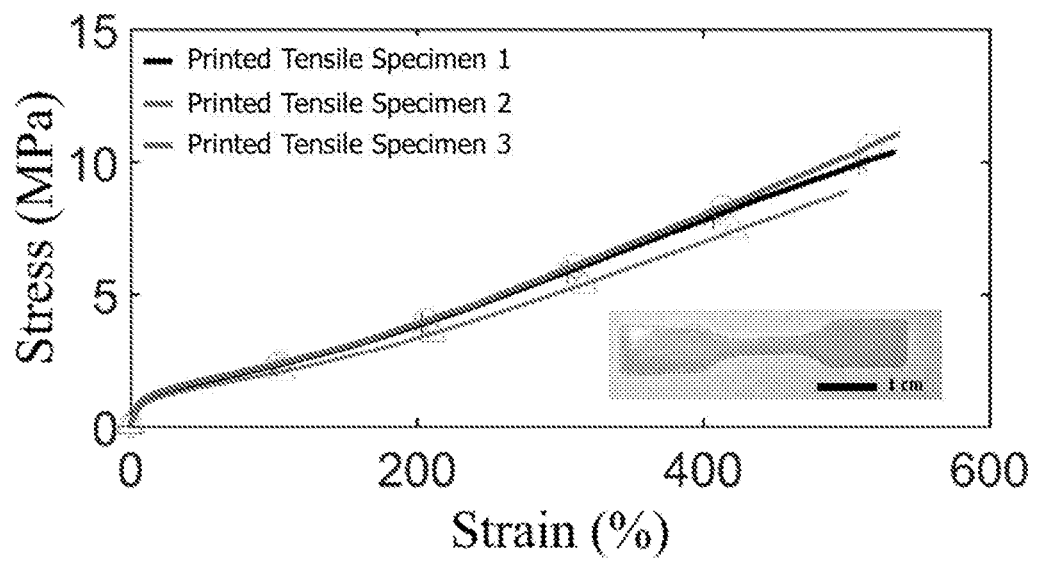
FIG. 16 is a graph of tensile analysis of VP printed tensile specimens (0.4:1 PEGDA:NVP). Confirms consistent tensile behavior between multiple specimens with all achieving extensibilities above 500%.

The inverse relationship between projection area and projection pixel size necessitated the utilization of our previously developed scanning mask-projection VP mode (S-MPVP)[4,30] for fabrication of large parts (>50×35 mm) such as the tensile dog bone specimens (FIG. 16). During S-MPVP, the projector scans across the resin surface (along the X axis) while projecting a movie of patterned UV light with a frame rate that is synchronized to the scanning velocity of the projector. In addition to increasing the printable XY scale, S-MPVP blends the intensity distributions of each pixel and the synchronized movie ensures equal energy delivery (i.e., exposure time (t)) for each pixel location on the part surface, thus eliminating the need for the complex gray scaling algorithms used in standard static mask projection VP systems. The total energy delivered ($E_{proj}(X,Y)$) to the resin is the cumulative spatial sum of the energy delivered during the scanning of each projected movie frame ($E_f(X_f,Y_f)$), as shown in Equation 5. As before, computation of the energy profile inside the latex and the cured line width occurs according to Eqns. 3 and 4, respectively.

$$E_f(X_f, Y_f) = \frac{1}{v_s} \int_0^{X+r} I_f(x, Y) \, dx \quad (5)$$

where r is the distance travelled by the projector, with velocity vs, before the projector frame is updated.

$$v_s = \frac{r}{t},$$

where t is the exposure time for a projected pixel. Thus, the frame rate of the movie ($F_{rate}$) then becomes $$F_{rate} = \frac{1}{t}.$$

$E_{proj}(X,Y)=E_{f1}(X_{f1},Y_{f1})+ \ldots +E_{fn}(X_{fn},Y_{fn})$, where $X_{fn},Y_{fn}$ correspond to the local projection co-ordinate system for the nth frame, where $X_{fn}=X_{f(n-1)}+r$.

Figure 7F:
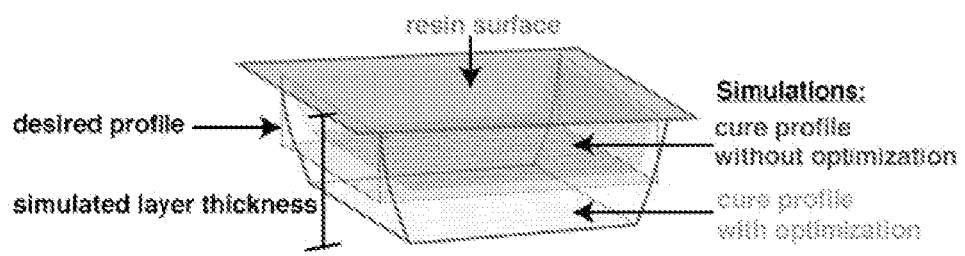
Figure 7E:
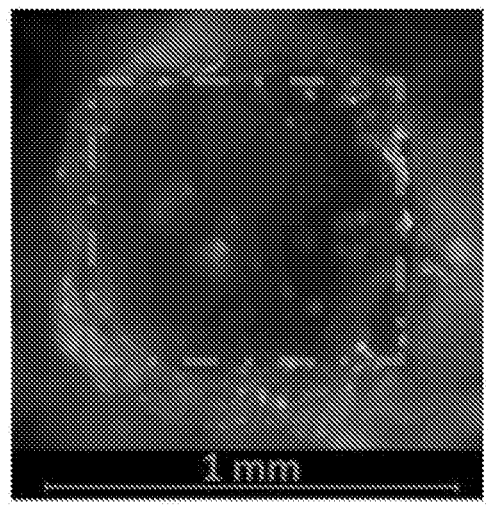
Figure 7F:
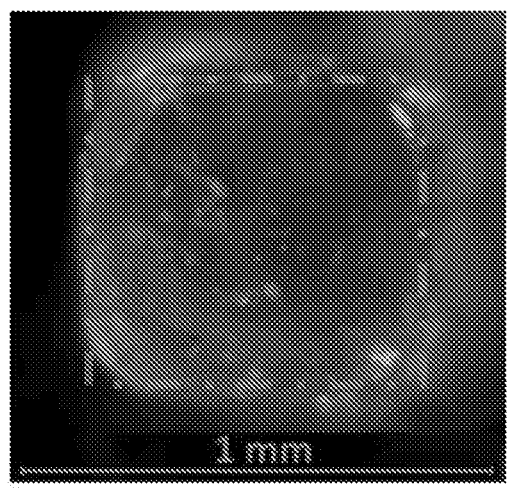
Figure 7G:
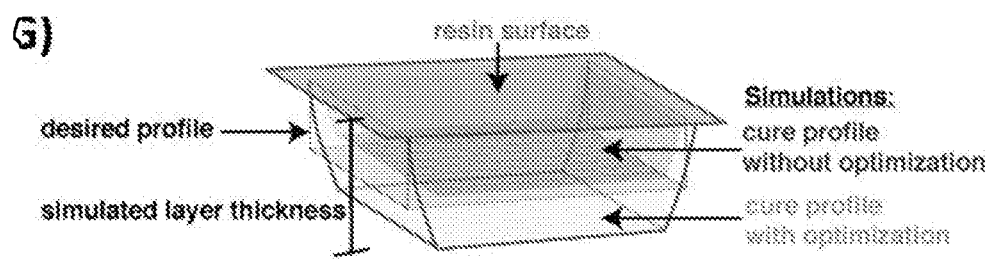

In an illustrative example, this approach simulated the fabrication of a 300-µm wide pillar, with r assumed to be equal to the pixel pitch (30 µm), for various exposure times. Like static VP scattering compensation, iterative variation of the exposure time (t) provided gross control to align computed line width ($I_w$) on the resin surface with design specifications ($I_{wd}$), shown in Scheme 9. However, S-MPVP introduced scan speed and frame rate as new print parameters, which, together with layer thickness, were subsequently computed using the optimized exposure time (FIG. 14). The simulation with optimized and non-optimized parameters, FIG. 7F, show that the line width with optimized parameters matches the designed line width and the cure profile resembles the desired cure profile when the cure depth is physically truncated by controlling the layer thickness. The optimized printing parameters in this work generated a cure profile with a XY dimension gradient of 8 µm for 100 µm cure depth and a cure through of 50 µm. The flow-chart highlighting the process parameter generation for the S-MPVP process is show in FIG. 14.

For: $0 < t < T$

Solve: $E_{proj}(X, Y, 0)$ where: $E_f(X_f, Y_f) = \frac{t}{r} \int_0^{X+r} I_f(x, Y) \, dx, \forall (X, Y)$ Subject to: $|l_w - l_{wd}| \leq 10^{-9}$ Scheme 9. Optimization scheme it to maximize dimensbnal conformance on the resin surface in the XY plane for scanning VP systems; i.e. line width on the resin surface ($i_w$)=design line width ($l_{wd}$). Energy delivered to the resin in scanning model is controlled by the exposure time per pixel (t). Hence, t is iteratively incremented and the resulting intensity distribution foreachframe ($I_t(x,Y)$ is computed. Then, the energy delivered to the resin surface ($E_{proj}(X,Y,0)$) and the line width $l_w$ are numerically computed for each iteration of t. The optimization ends when $|l_w-l_{wd}|$ is less than the selected tolerance of $10^{-9}$ and the resultant exposure time per pixel (f) is used to compute the scan speed and the frame rate used for part fabrication.

While the S-MPVP system coupled with a computer-vision based process parameter generation enable fabrication of parts with high resolution, it was imperative that the UV-crosslinked green bodies demonstrated sufficient modulus to form self-supporting features, which withstand drag forces experienced during a recoating process. Furthermore, to achieve high-speed, high-resolution fabrication, the manifestation of green body strength must occur with a low UV exposure time (<10 s). $G_N^0$ serves as a metric for green body modulus, and irradiation time to modulus crossover (G''/G'=1) gauges photocuring kinetics and aids in the determination of printability for the latex. A resin composition with 0.4:1 PEGDA:NVP was experimentally determined as an optimal composition for printing ($G_N^0$=30 kPa, crossover time ~1 s) while maintaining final sIPN ultimate strains above 500%. Printed green bodies, such as the lattice depicted in FIG. 7A, demonstrate successful and accurate fabrication of positive (lattice struts) and negative features (designed voids) throughout the bulk of the green body. This demonstrates that high-resolution features are achievable with light altered from light-scattering photo-reactive polymeric colloids.

Evaluating Geometric Complexity and Elastic Performance of Printed Elastomers

Figure 15:
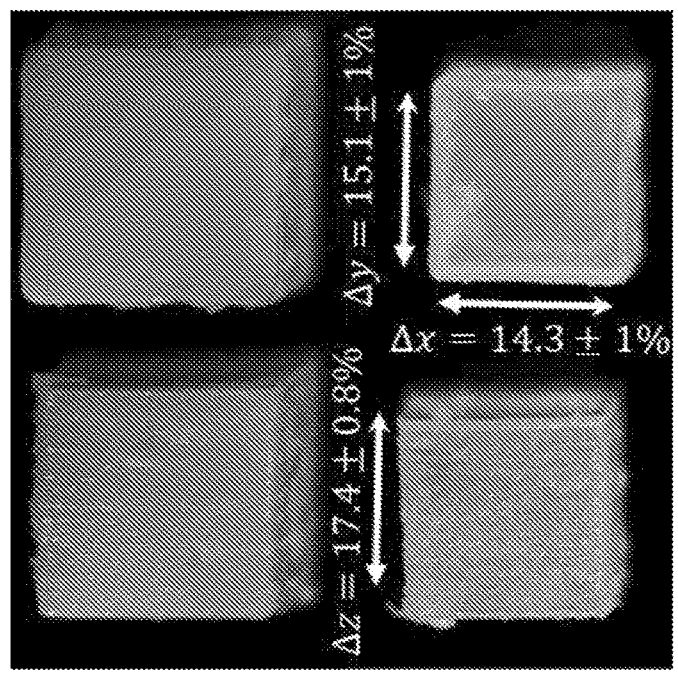
FIG. 15 is an image of VP printed cubes from 0.4:1 PEGDA:NVP latex composition for shrinkage analysis. Surfaces ridges are due to parabolic attenuation of light in the z direction, a common artifact for VP parts with large (>10 μm) layer thicknesses. Wet greenbody (left) and dried sIPN (right) states shown. sIPN cubes are clear along axis of direction (top right), confirming a lack of discrete interfaces between layers.

Drying printed green bodies to yield elastic sIPNs results in the loss of a large volume fraction of water (~45 vol. %), which is accompanied by a commensurate, isotropic volumetric shrinkage of approximately 40 vol. % (dimensional shrinkage of 15.6%). Literature suggests the unique promise of isotropic shrinkage as a mechanism for increasing the resolution of printed structures.[4,31,32] Similar to our previous drying procedures,[4] slow isotropic drying on a porous substrate preserved structural fidelity of the complex geometric features, even for thicker objects (FIGS. 8A-8G). Shown in FIG. 15, dry sIPN parts are optically clear along the direction of fabrication. This optical clarity confirms the absence of discrete interfaces between layers, which corroborates our previous work that attributes this feature to crosslinking between each layer.[4] Coalescence of particles both within and across layers further aids this process.

Figures 8A, 8B, 8C, 8D, 8E, 8F, 8G:
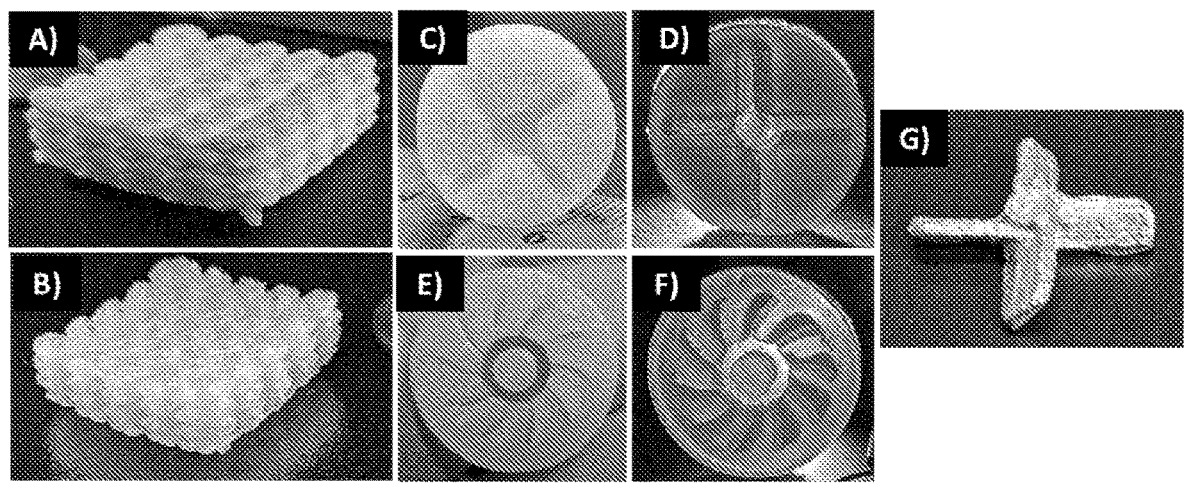
FIGS. 8A-8G show evaluation of 3D objects printed from latex. Images and performance of 3D printed photocurable latex objects: 3D printed Schwarz lattice in (FIG. 8A) green body and (FIG. 8B) dried sIPN states, (FIG. 8C-FIG. 8F) printed elastomer molds, and (FIG. 8G) impellor casted from Field's metal alloy.

3D printed tensile specimens (modified ASTM D-638 V) exhibit elongations over 500% with an average stress-at-break of 9.7 MPa (FIG. 16), thereby representing the first example of a 3D printed high-performance SBR elastomer. This approach successfully combined polymer performance with structural precision, enabling the fabrication of mechanically robust and reusable elastic molds, as shown in FIGS. 8A-8G. Specifically, we designed and printed a mold for an impeller with undercuts (i.e., profiles varying across X-Y-Z planes) to highlight an important application of printed elastomers: soft molding of complex geometries that cannot be directly extracted from hard molds. As a proof of concept, an impeller was casted in a 3D printed SBR sIPN mold with Field's metal (a eutectic alloy of bismuth, indium, and tin) and successfully extracted from the soft mold without damaging either component (FIG. 8G).

Scheme 10: Emulsion polymerization of MMA and HMA to yield random copolymer latexes with a wide range of thermomechanical properties.

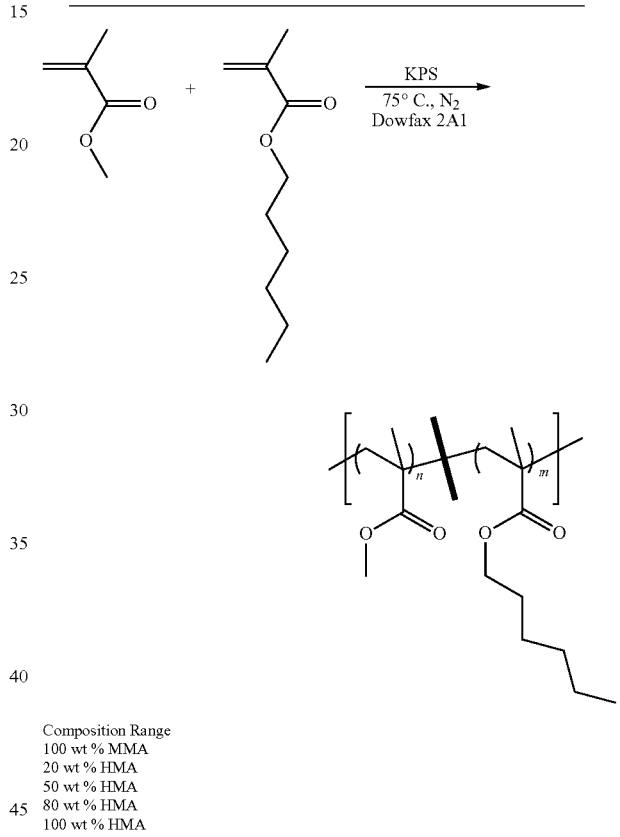

Composition Range
100 wt % MMA
20 wt % HMA
50 wt % HMA
80 wt % HMA
100 wt % HMA

TABLE 2

Summary of latex molecular weight and particle size across compositional range

| wt % HMA | $M_n$ (kg/mol) | $M_w$ (kg/mol) | Đ | Solids Content (wt %) | Particle Diameter (nm) |
|---|---|---|---|---|---|
| 100 (PHMA) | 147 | 955 | 6.51 | 48.2 | 113 |
| 80 | 83.8 | 342 | 4.08 | 46.2 | 109 |
| 50 | 94.3 | 367 | 3.89 | 48.1 | 117 |
| 20 | 64.0 | 260 | 4.05 | 48.2 | 104 |
| 0 (PMMA) | 73.4 | 326 | 4.45 | 48.8 | 122 |

Scheme 11. Photocrosslinking reaction of aqueous scaffold precursors, N,N'-methylenebisacrylamide (MBAm) and N-vinyl pyrrolidinone (NVP), with photoinitiator lithium acylphosphinate (LAP) in latex continuous phase.

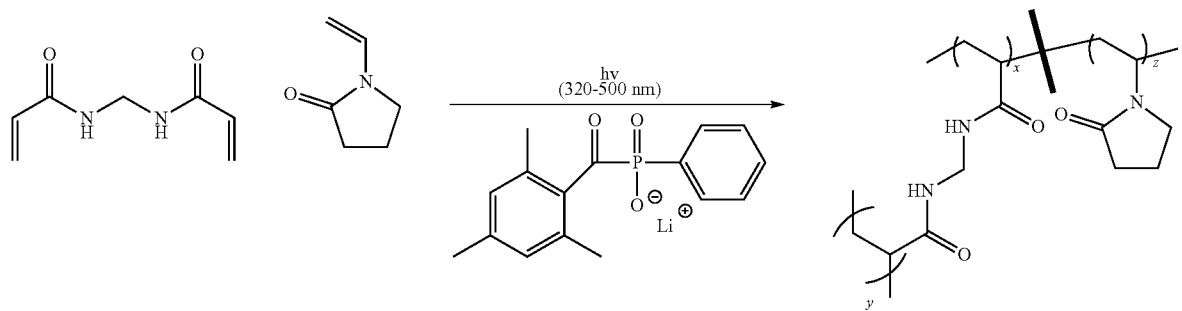

CONCLUSIONS

We report concurrent polymer and machine design to address the vat photopolymerization (VP) printability-mechanical performance paradox with photo-reactive polymeric colloids (latex); we report the first-ever printed styrene-butadiene rubber (SBR) elastomer. The introduction of tunable photoreactivity into polymer latex and computer-vision-based process parameter generation enabled VP printing of polymeric colloids to yield mechanically strong and geometrically complex 3D geometries. An unprecedented strategy for sIPN formation manifests the mechanical properties of the dispersed polymeric particles upon 3D coalescence throughout the printed object without disrupting feature fidelity. This work expands the opportunities for VP printing of elastomers with intricate features that exhibit extensibilities above 500%, nearly 200% above the leading commercial VP elastomers.[33] The tunability and modularity of this approach, when combined with diverse scaffold and polymeric particle compositions, suggests versatility beyond SBR latexes and elastomers.

Example 2. Polymer-Inorganic Hybrid Colloids for Ultraviolet-Assisted Direct Ink Write of Polymer Nanocomposites Inorganic-polymer hybrid colloids present a modular and tunable route to fabricate polymer nanocomposites from low viscosity precursors; however, their use in additive manufacturing remains limited. This work introduces 3D printable, photocurable hybrid colloids via the incorporation of continuous-phase photocrosslinking chemistry and water-dispersible silica nanoparticles to polymer (styrene-butadiene rubber, SBR) latex. Varied relative concentrations of polymer and inorganic particles allowed precise tuning of filler loading in the final nanocomposite and introduced a bimodal particle size distribution with major rheological implications that enable extrusion-based 3D printing. Ultraviolet-assisted direct ink write (UV-DIW) additive manufacturing of photocurable hybrid colloid pastes generated free-standing green bodies embedded with both SBR and silica particles. Subsequent drying of these green bodies allowed SBR particle coalescence throughout the scaffold and around the silica particles, yielding a nanocomposite semi-interpenetrating network (sIPN). Facile tuning of silica content in the hybrid colloid enabled tuning of both hybrid colloid rheological behavior and the mechanical properties of the final sIPN nanocomposites to achieve 3D printing of silica-SBR nanocomposites with ultimate strains above 300% and ultimate strengths of 10 MPa.

Materials

Carboxylated styrene-butadiene rubber (SBR) latex (Rovene 4176) was generously donated by Mallard Creek Polymers Inc. The latex has a solids content of 50 wt % in water and a particle diameter range of approximately 120-170 nm. The SBR copolymer was approximately 50/50 by weight styrene and butadiene with a low level of carboxylic acid monomer neutralized with ammonia to provide colloidal stability. The polymer contains a high insoluble (gel) content from the polymerization process due to intra-particle crosslinking during the polymerization process.

1-vinyl-2-pyrrolidinone (NVP), poly(ethylene glycol) 575 g/mol (PEGDA 575), lithium bromide (LiBr), (3-aminopropyl)triethoxysilane, and succinic anhydride were purchased from Millipore Sigma and used as received. Methyl ethyl ketone (MEK), dimethyl phenylphosphonite and 2,4,6-trimethylbenzoyl chloride were purchased from Alfa Aesar and used without further purification. Colloidal silica nanoparticles (10-15 nm) dispersed in MEK (MEK-ST) were generously donated by Nissan Chemical Corporation. HPLC-grade tetrahydrofuran (THF), dimethyl formamide (DMF), diethyl ether, and hexanes were purchased from Fisher Scientific and used without further purification.

Analytical Methods

Dynamic light scattering (DLS) was performed with a Malvern Zetasizer Nano at 25° C. Thermogravimetric analysis (TGA) was performed with an TA Instruments Q500 at a rate of 10° C./min and an isothermal drying step at 120° C. for 10 min. Tensile tests were performed with an Instron 5500R equipped with a 200 lb load cell at 50 mm/min from dogbones that were both die-cut (ASTM D-638 V) from photocast films and 3D printed via direct ink write (DIW) (ASTM D-638 IV, scaled proportionally to a 55 mm length). Cyclic experiments were performed on the same Instron instrument at a rate of 200%/min with a 30 s hold at 0% strain between cycles. Dynamic mechanical analysis (DMA) was performed on a TA Instruments Q800 at 1 Hz, 3° C./min, and 0.2% strain. Rheological analysis was performed on a TA Instruments DHR-2 rheometer with a concentric cylinder geometry (28 mm bob diameter, 42 mm bob length, 30.4 mm cup diameter) for both continuous flow and oscillatory experiments at 25° C. An oscillatory time sweep experiment was performed to investigate the recovery time of colloidal network structure to gauge wait time between experiments. Stress and strain sweeps were performed at a constant frequency of 1 Hz. Photorheology was performed with the same rheometer equipped with a 20 mm parallel plate geometry with a UV light guide attachment and OmniCure S2000 Spot UV Curing System light source. Unless stated otherwise, photorheological tests were performed at 0.2% strain, 1 Hz, and with a measured UV intensity of 250 mW/cm$^2$. Scanning electron microscopy (SEM) samples were freeze-fractured in liquid nitrogen prior to imaging on a FEI Quanta 600 FEG utilizing the back-scattering detector and 20 kV accelerating voltage. Samples were sputter-coated with 7 nm of gold/palladium for imaging.

Synthesis of Lithium Acylphosphinate Photoinitiator (LAP)

Lithium acylphosphinate photoinitiator (LAP) was synthesized according to a previous procedure from literature.[78,79] In a typical example 3.00 g (17.5 mmol) of dimethyl phenylphosphonite was added to a 250-mL round bottomed flask and purged with argon for 15 min while stirring. 3.20 g (17.5 mmol) of 2,4,6-trimethylbenzoyl chloride was added dropwise via syringe to the flask while stirring and allowed to react 18 h. It is important to note that methyl chloride is a toxic, gaseous byproduct of this reaction and therefore the reaction purge outlet was bubbled through an aqueous ethanolamine trap. 6.1 g (70.1 mmol) of LiBr was dissolved in 100 mL of MEK and the solution was added to the reaction. The reaction was subsequently heated to 50° C. for 10 min after which a white precipitate formed. The reaction was then cooled and allowed to rest at room temperature for 4 h to allow full precipitation. The supernatant was decanted, and the white powder precipitate was washed three times with MEK. The LAP powder was then dried at room temperature in vacuo overnight and stored in a sealed amber jar.

Surface Functionalization of Silica Nanoparticles

Surface functionalization of colloidal silica nanoparticles followed methods described previously in literature.[70] In a typical example, 100 g of a colloidal silica in MEK dispersion (25 g dry silica) was combined with 100 mL of THF in a sealed 500-mL round bottomed flask and purged 20 min with argon while stirring vigorously. 3.258 g (14.7 mmol) of (3-aminopropyl)triethoxysilane was added to the flask. The reaction was heated to 60° C. and allowed to react for 16 h. The reaction dispersion was subsequently poured into a series of 50-mL centrifuge tubes, each diluted 5× with hexanes, and centrifuged at 6,000 rpm for 5 min to precipitate the particles. The supernatant was discarded, and the particles were redispersed in THF. This purification process was repeated 3× before finally redispersing the amine-functionalized nanoparticles in 200 mL DMF in a 500-mL round bottomed flask and purged with argon for 20 min while stirring. 4.22 g (42.2 mmol) of succinic anhydride was dissolved in 10 mL DMF and added via syringe and the reaction was allowed to proceed for 12 h at room temperature. The resultant carboxylic acid (COOH) functional particles were precipitated from diethyl ether, centrifuged 3× (in a similar fashion as described above), and finally stored as a dispersion in ethanol for storage. Degree of functionalization, expressed as mmol COOH/g silica, was determined via potassium hydroxide titration in ethanol.

Synthesis of Photocurable Polymer-Inorganic Hybrid Colloids

The design of all hybrid colloids targeted a constant total solids (SBR polymer and/or silica) content in water and liquid scaffold precursors (NVP & PEGDA). The composition of the solids was then systematically altered from 0% to 50% silica (0:100 to 50:50 Silica:SBR) without altering the total solids content of the colloid. To these hybrid colloids compositions, a constant loading of scaffold precursors (NVP&PEGDA) was added (3.56:1 Solids:Scaffold, 2.5:1 NVP:PEGDA) which was experimentally determined to provide sufficient greenbody modulus.

In a typical example, a net solids content of 40 wt % solids in water and scaffold precursors was targeted with a solids ratio of 50:50 Silica:SBR, ie. 20 wt % each for the SBR polymer and silica. COOH-functionalized silica nanoparticles (NP—COOH) were precipitated from stock ethanol solution by the addition of diethyl ether and centrifugation at 6000 rpm for 5 min. The supernatant was decanted, and the particles dried at room temperature in a vacuum oven to remove all solvent. 2.25 g of dried nanoparticle was dispersed in a solution of 3.16 g deionized $H_2O$, 0.903 g NVP, 0.361 PEGDA (575 g/mol), and 50.0 mg LAP by vortex and sonication until forming a viscous, clear dispersion with an amber hue. 4.688 g of SBR latex was added to the dispersion and the hybrid colloid was vortex until thoroughly mixed. Due to the high viscosity of high-silica hybrid colloids, the retention of bubbles proved an issue for the formation of pore-free photocured films and objects. Light centrifugation (1000 g/mol, 2 min) enabled the removal of bubbles from the paste-like colloids without causing sedimentation of the particles.

UV-DIW Printing Process

The Ultraviolet-Assisted Direct Ink Write (UV-DIW) printer consisted of two Zaber A-LST500 linear slides that provided the extruder 500 mm of in the XY direction and a Zaber A-LST250 linear slide that provided the build plate 250 mm of travel in the Z direction. A Nordson EFD Ultimus V DIW System was responsible for extruding material and a Keynote Photonics LC4500-UV Digital Light Processing (DLP) projector provided UV-irradiation at 405 nm with a measured intensity of 14 mW/cm2 on the build plate was responsible for curing the photosensitive ink. The projector is mounted adjacent to the extruder and can be turned on and off which allows the entire layer to be extruded and then be cured homogeneously at once. This ex-situ curing method eliminates nozzle clogging due to unwanted photocuring of the material at the nozzle exit.[50] As demonstrated, the latex ink had the appropriate rheology to retain its shape after deposition without the need for immediate UV curing. However, by exposing each layer to UV irradiation for a fixed period after deposition was complete ensures the ink was not over cured and enough photocurable groups remained to form a strong interlayer adhesion with the next layer. Additionally, a homogenous cure likely contributed to more isotropic material properties. The printer was controlled with a custom-built LabVIEW control software that used standard GCODE to control the printer's movements and turn the extrusion on and off.

Both ink formulations were printed using a stainless-steel nozzle with an inner diameter of 0.61 mm and 12.7 mm length supplied by Nordson EFD. Parts were printed onto glass substrates with a deposition speed of 4 mm-s and each layer was exposed to UV irradiation for 15s. 50:50 Silica:SBR inks were extruded at a pressure between 41.4 and 48.3 kPa. 30:70 Silica:SBR inks were extruded at a pressure between 10.3 and 17.2 kPa. Extrusion pressures varied within the listed range due to slight variability between batches. Due to evaporation of the continuous phase (Water and NVP), nozzle clogging was occasionally observed. Clogging was reduced by purging the nozzle between prints at high pressures (+200 kPa) for-5 seconds and frequently replacing nozzle.

Tensile bars consisted of 3×200 µm layers. Truss and Honeycomb structures were printed from 25×250 µm layers.

Tensile bar extrusion roads were varied from 0, 45, and 90° orientation with respect to elongation direction and were spaced by 650 µm.

Post-Cure Processing (Drying and Particle Coalescence, Extraction)

All photocured green bodies were dried at 40° C. overnight in a vacuum oven to facilitate water removal for SBR particle coalescence and sIPN formation. Parts were then extracted in 5/95 v/v THE and water with solvent exchanges at 2, 4, and 12 h. The solvent was then changed to pure THE with solvent extractions at the same intervals to remove the water. Extracted objects were then dried in a vacuum oven at room temperature overnight to remove THF.

Result and Discussion

Figure 25:
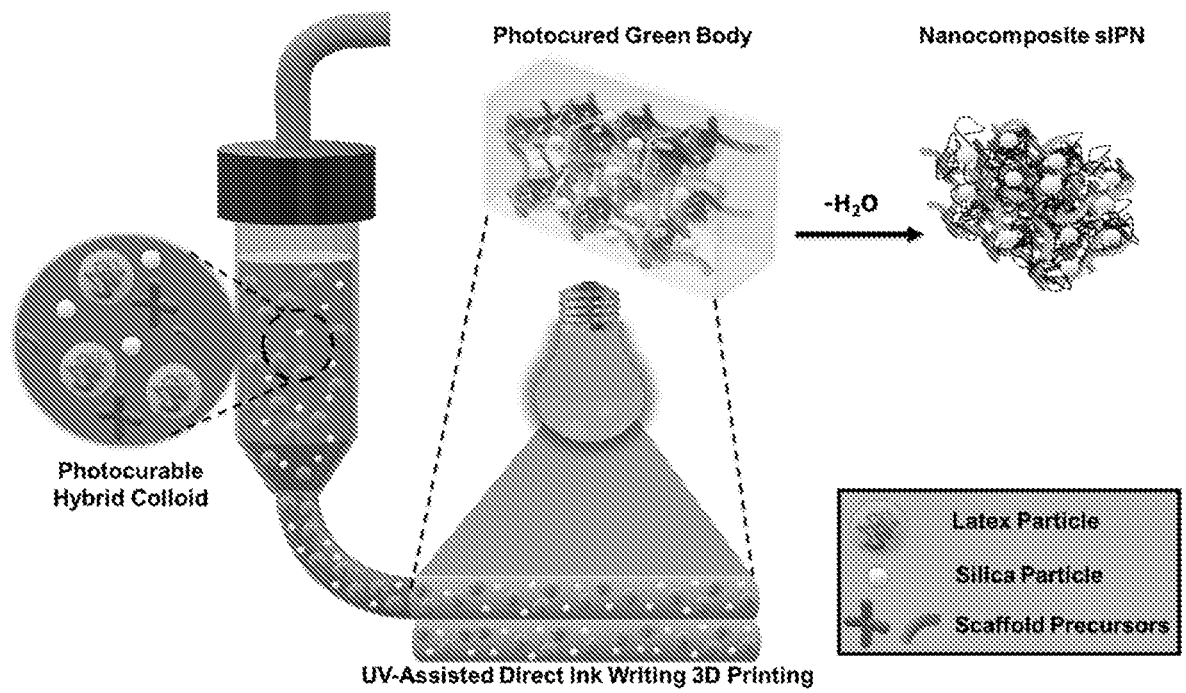
FIG. 25 is a schematic photocurable polymer-inorganic hybrid colloids enable UV-DIW 3D printing of hydrogel green bodies which yield semi-interpenetrating polymer network (sIPN) nanocomposites upon drying according to certain aspects of the disclosure.

FIG. 25 illustrates the strategy for 3D printing elastomer nanocomposites via UV-DIW of photocurable polymer-inorganic hybrid colloids. Our previous investigations introduced the ability to 3D print latex polymer colloids via photoactivated network formation in the continuous phase, which yielded a particle-imbedded hydrogel "green body".[69] Subsequent water removal enabled semi-interpenetrating polymer network (sIPN) formation due to the coalescence of polymer particle throughout the photocrosslinked scaffold. The localization of photochemistry in the aqueous phase of the latex affords unique modularity in particle selection, provided a preservation of colloidal stability. Incorporation of water-dispersible inorganic nanoparticles therefore enabled a facile route to nanocomposites. Carboxylated silica nanoparticles contain similar negative surface charges to carboxylated styrene-butadiene (SBR) particles and readily mixed with polymer latex without disrupting colloidal stability. The addition of photocrosslinkable network precursors into the continuous phase yielded stable, photocurable hybrid colloids amenable to UV-based AM processes. Photocrosslinking and subsequent SBR coalescence throughout the scaffold and around the silica nanoparticles yielded an elastomer nanocomposite without disruption in geometric fidelity of the printed part.

Figure 26A:
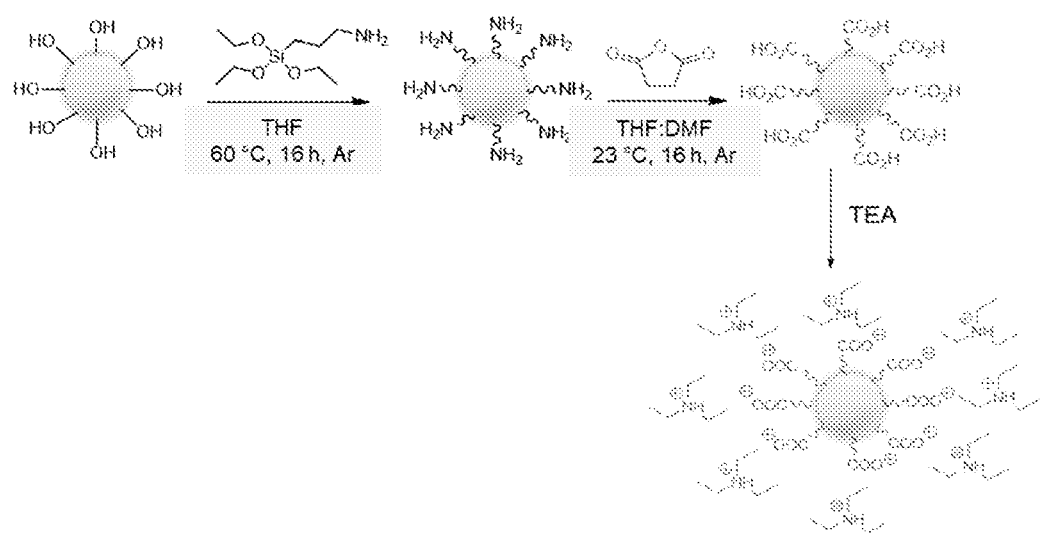
FIG. 26A is a diagram of how carboxylate functionalization of silica nanoparticles enables water dispersibility.
Figure 26B:
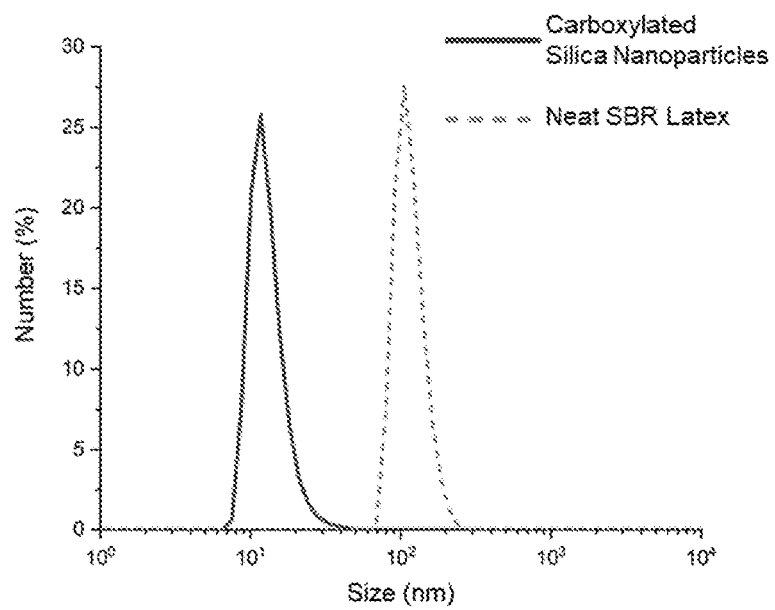
FIG. 26B is a plot of dynamic light scattering confirming size of dispersed nanosilica and polymer particles in water (1 wt %).

Carboxylation of colloidal silica nanoparticles via facile silane chemistry[70] enabled dispersibility in aqueous media, illustrated in FIGS. 26A-26B. Condensation of (3-aminopropyl)triethoxysilane with surface silanol groups yielded amine-functionalized nanoparticles. Subsequent nucleophilic ring-opening of succinic anhydride by the amines generated surface-bound carboxylic acid moieties. Titration of the surface acids confirmed a surface loading of approximately 0.350 mmol COOH/g silica which corresponds to an approximate surface concentration of 0.84 acid-groups/nm$^2$. Upon stoichiometric addition of triethylamine, the generation of negatively charged triethylammonium carboxylate moieties enabled colloidal stability and dispersibility in water, evident by DLS measurements in FIG. 26B. Dynamic light scattering (DLS) confirmed nanoscopic dispersion of the silica in water, with a particle size of approximately 12 nm.

Design of all colloids in this study focused on a constant solids (SBR and silica) content of 40 wt %, with the liquid continuous phase consisting of water and the scaffold precursors n-vinyl pyrrolidone (NVP) and poly(ethylene glycol) diacrylate (PEGDA, 575 g/mol). Systematic variation of the solids composition from pure SBR particles (0:100 Silica:SBR) to equal parts by mass of silica and SBR (50:50) yielded stable, photocurable hybrid colloids. The bimodal particle distribution introduced by the combination of silica nanoparticles (12 nm) and SBR particles (140 nm) resulted in drastic rheological changes over this compositional range. At a given weight percent, the particle concentration for small silica nanoparticles was significantly higher than that for the much larger SBR particles. As a result, increasing silica loading resulted in increased particle concentration while maintaining constant solids content in the colloid. Steady-shear rheological measurements, illustrated in FIGS. 27A-27B, elucidate the major impact of this increased particle concentration on colloid viscosity.

Shear thinning behavior is a well-studied phenomenon in disperse systems, including latex colloids.[71] Typical investigations demonstrate an increase in viscosity with volume fraction of solids ($\phi_{solids}$), owing to increased interactions between particles as the colloid becomes more concentrated.[71] However in this work, the density of silica (~2 g/cm$^3$) is larger than that of SBR[72] (0.94 g/cm$^3$), and therefore increasing the Silica:SBR mass ratio causes a decrease in $\phi_{solids}$ from approximately 0.39 to 0.32, for 0:100 and 50:50 Silica:SBR, respectively, despite a constant total solids mass fraction of 40 wt %.

To better understand the observed increase in viscosity (FIGS. 27A-27B) despite a decreasing $\phi_{solids}$, it is important to consult previous investigations into the rheology of bimodal particle distributions. In bimodal systems with two discrete particle sizes at a constant $\phi_{solids}$ and constant particle diameter ratio, viscosity increases with increasing relative fraction of small to large particles (beyond a critical value) due to a resultant increase in total particle concentration and decrease in particle-particle distance. In other words, it requires more small particles to achieve the same overall $\phi_{solids}$ compared to larger particles.[73-74] In this work, the size difference between silica nanoparticles and SBR latex particles causes the overall particle concentration to increase by a factor of approximately 400 from the pure SBR latex (0:100 Silica:SBR) to the 50:50 Silica:SBR hybrid colloid. This provides an explanation for the observed increase in viscosity with increasing Silica:SBR, shown in FIGS. 27A-27B, despite the decrease in $\phi_{solids}$.

Figure 27A:
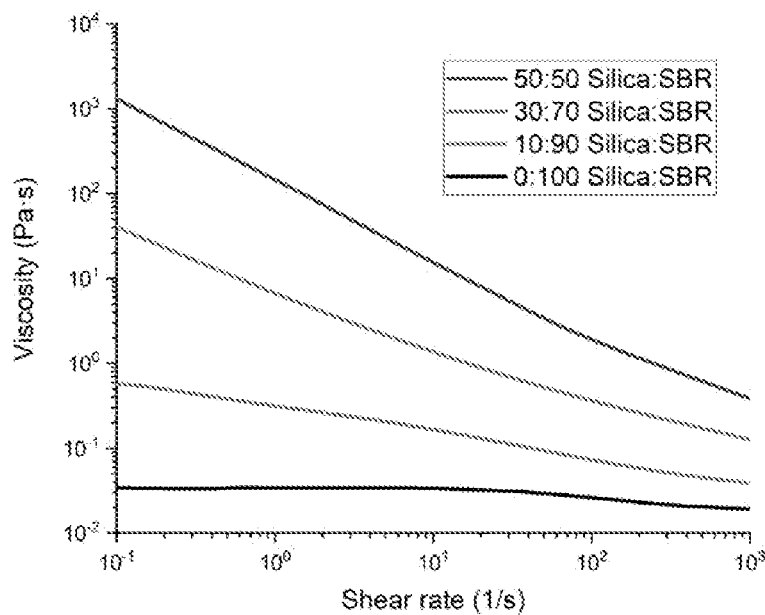
FIG. 27A is a graph of steady-state shear analysis elucidates shear thinning behavior for all colloids with increasing viscosity at higher silica loadings (higher Silica:SBR). Total solids content is constant between all samples (40 wt %).
Figure 27B:
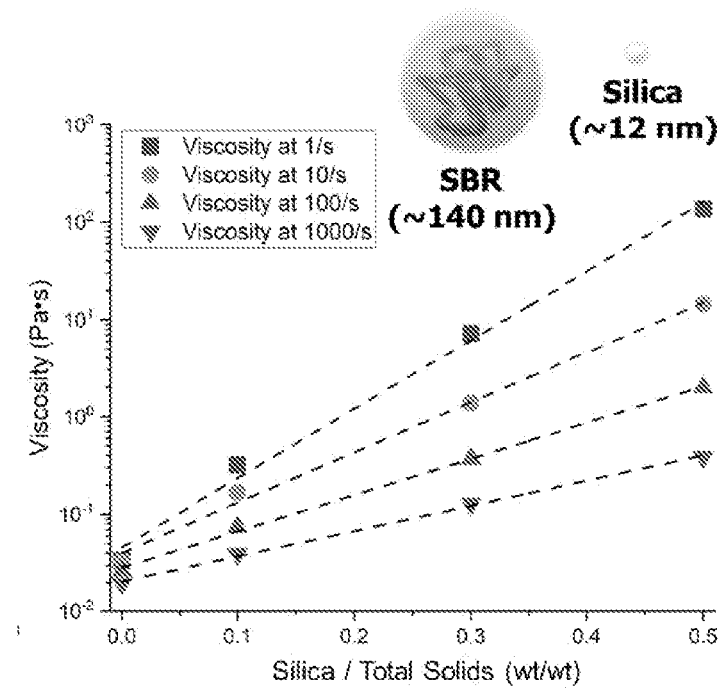
FIG. 27B is a graph of viscosity at various shear rates as a function of fractional silica in the total solids (Silica:SBR), ie. 30:70 Silica:SBR corresponds to 0.3.

VP is generally limited to printing resins with a maximum viscosity of 10-15 Pa·s,[75,76] thus precluding VP printing of a Silica:SBR ratio above 10:90 (FIGS. 27A-27B). DIW successfully prints higher viscosity liquids that are unsuitable for VP and therefore provides an avenue for 3D printing of the high-silica hybrid colloid pastes. During DIW extrusion, the nozzle applies shear rates of ~50 s$^{-1}$, reducing the viscosity of the 30:70 ink to 0.5-0.6 Pa·s and of the 50:50 ink to 3-4 Pa·s due to the large degree of shear thinning.

Figure 28A:
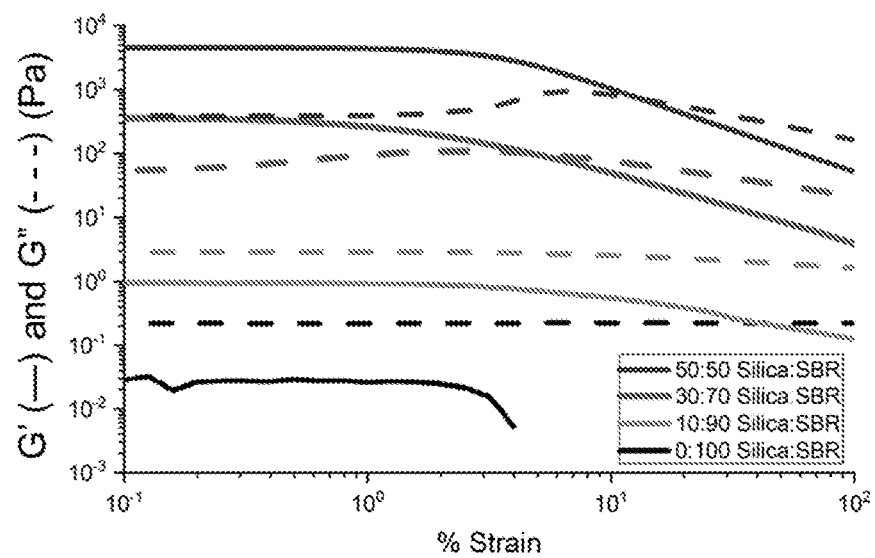
FIGS. 28A-28B show plots of the oscillatory rheology experiments elucidate shear-dependent crossovers of storage G' (-) and loss G" (---) shear moduli for high-silica hybrid colloids.
Figure 28B:
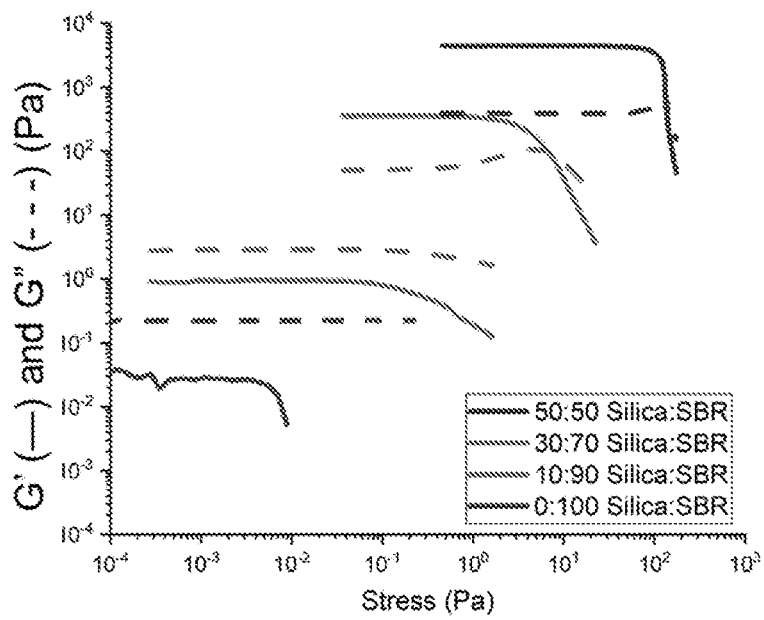

In addition to their shear-thinning behavior, the occurrence of rheological solid-liquid transitions positions these hybrid colloids as uniquely ideal candidates for the platform. Oscillatory rheological measurements probed the storage (G') and loss (G") shear moduli of each colloidal ink over increasing shear strains and stress (FIGS. 28A-28B.) Generally, values of G'>G" indicate "solid-like" properties which is an ideal state for DIW ink to exhibit minimal flow and deformation upon deposition. Conversely, G">G' values indicate "liquid-like" behavior and flow, which is ideal for extrusion through the nozzle.[51]

Discussed previously, many DIW examples utilize the stress-induced, reversible liquid-solid transitions of yield stress/strain materials to induce flow under a shear stress imparted by extrusion through the nozzle and to achieve subsequent solidification upon deposition, when shear stress is removed, for retaining the as-deposited shape.[51,56,60,63,64,67,68] Hybrid colloids with a bimodal distribution enabled tuning of this phenomenon through relative particle concentrations, as shown in FIGS. 28A-28B. At 30:70 Silica:SBR and above, the colloids exhibited ideal yield stress rheological behavior for DIW. These colloids were solid-like (G'>G") at low shear strains and stress; however, beyond a critical yield point, the colloidal structure rapidly disrupted, and the colloid undergoes a modulus crossover to the liquid-like state. Upon removal of this stress, the colloids rapidly re-solidified. Silica to SBR mass ratios below 30:70 do not exhibit a shear yield stress and inks behave entirely as low-viscosity liquids (G">G') at all measured shear strains/stresses. This precluded them from DIW selection due to their tendency to flow and spread upon deposition which makes high resolution features and subsequent layers impossible to achieve via DIW. Shear modulus systematically increased with silica content (particle concentration), and for the 30:70 and 50:50 Silica:SBR ratios, critical yield stress/strains appeared which followed the same trend. Unlike studies of filled systems which increase vol % filler to achieve yield stress behavior; these colloids decrease in vol % solids with increasing Silica:SBR (with constant wt % solids). However, as discussed previously with viscosity effects, the increase in particle concentration with the addition of the smaller silica nanoparticles significantly increases the number of charged surfaces and decreases the average distance between particles. This facilitates greater particle-particle interaction which yields stronger colloidal networks, evidenced by the greater shear moduli and higher yield stresses observed in FIGS. 28A-28B. It is important to note that because the rheological behavior is primarily dictated by net particle concentration and relative particle size, tuning of the latter parameter could enable adjustment of rheological behavior for either VP for DIW regardless of desired silica content (e.g. high-silica liquids for VP or low silica pastes for DIW), with the use of larger silica particles or smaller SBR particles.

Equation 1 describes the calculation of maximum shear stress imparted by the DIW nozzle during extrusion, $$\tau = \frac{\Delta P}{2L} r \quad (1)$$

where ΔP is the pressure applied for extrusion, L is the nozzle length, and r is the nozzle diameter.[61] In this study a nozzle length of 12.7 mm and radius of 0.305 mm. The 30:70 Silica:SBR was extruded at 13.79 kPa, corresponding to a maximum shear stress of 165.6 Pa, well above its shear modulus crossover stress of 7.5 Pa. Similarly, the 50:50 Silica:SBR was extruded at 44.82 kPa, corresponding to a maximum shear stress of 538.1 Pa, well above its shear modulus crossover stress of 129 Pa.

Figure 29A:
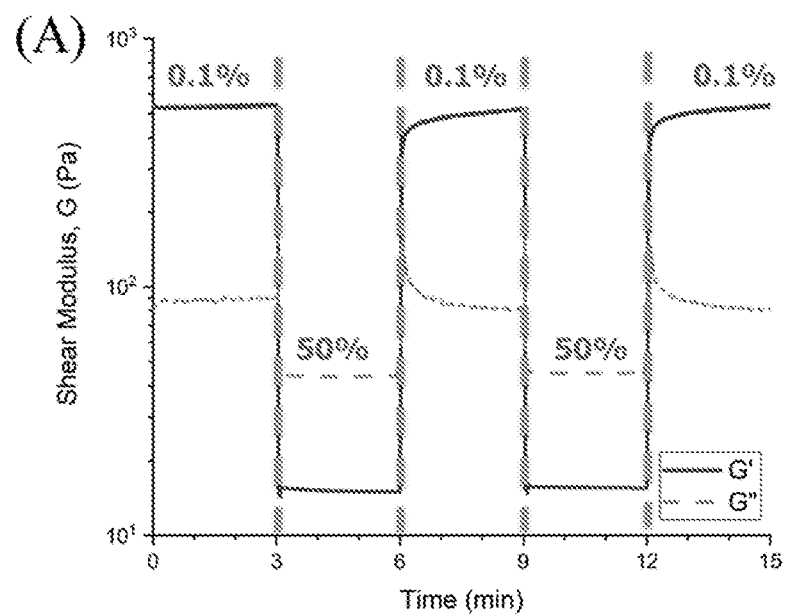
FIGS. 29A-29B show plots of hybrid colloids at (FIG. 29A) 30:70 Silica:SBR and (FIG. 29B) 50:50 Silica:SBR exhibit rapid and reversible crossovers at low (0.1%) and high (50%) strain amplitudes. Reversible liquid-solid transitions evident by crossovers of shear storage (-) and loss (---) modulus.
Figure 29B:
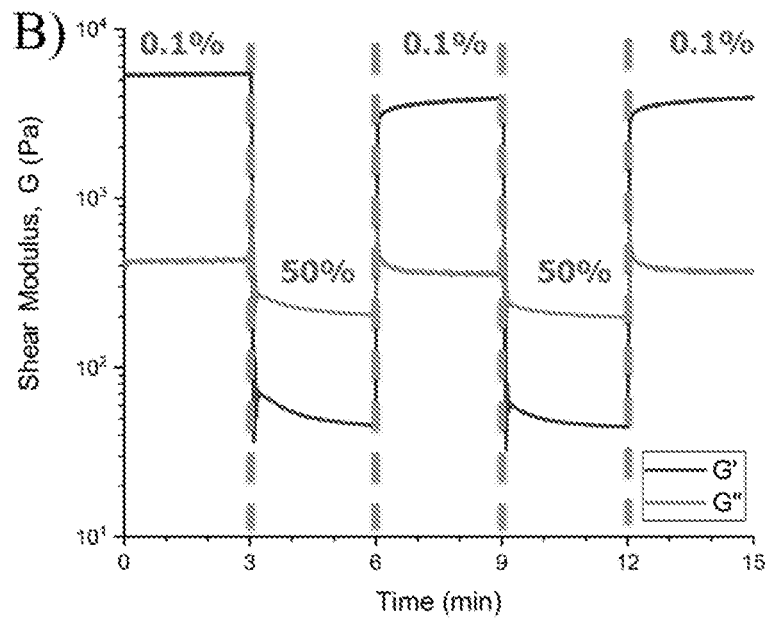

The timescale of the recovery of colloidal structure to its solid-like state after the removal of shear stress is critically important for ensuring shape retention upon deposition. To measure the time of structure yield and recovery, FIGS. 29A-29B illustrates an oscillatory shear experiment that alternates between low (0.1%) and high (50%) strains that are below and above the yield point of both the 30:70 and 50:50 Silica:SBR hybrid colloid compositions (FIGS. 28A-28B). The step change from high to low strain mimics the removal of stress when the material is extruded from the nozzle and records how quickly the network structure reforms to exhibit solid-like (G'>G" crossover) behavior.

Both higher-silica hybrid colloids (30:70 and 50:50 Silica:SBR) exhibited rapid transitions between flow and solidification at high and low strains, respectively, and consistent reproducibility of this transition over multiple cycles. The G'/G" crossovers occurred nearly instantaneously, suggesting that the inks would transition to solid-like behavior soon after exciting the DIW nozzle and the extruded bead would exhibit minimal spreading. After crossover to solid-like properties, the recovery of storage modulus progressed over the course of minutes and approached the original modulus exhibited before disruption within 3 min for 30:70 Silica: SBR (FIG. 29A). Although also exhibiting near-instantaneous crossovers, the 50:50 Silica:SBR colloid showed slower G' recovery than 30:70 and did not reach the original modulus over the same timespan (FIG. 29B). This may be explained by the significantly higher modulus of the 50:50 colloid (approximately an order of magnitude) which restricts mobility and slows the recreation of colloidal network structure.

Figure 30A:
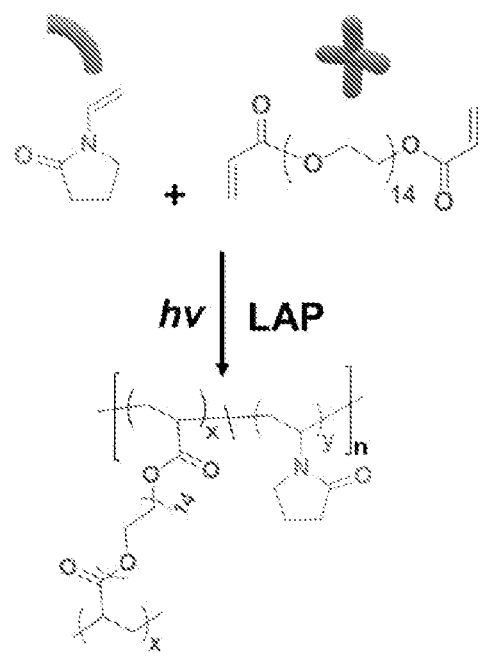
FIG. 30A shows NVP and PEGDA provide photocrosslinkable scaffold precursors in the continuous phase of colloids.
Figure 30B:
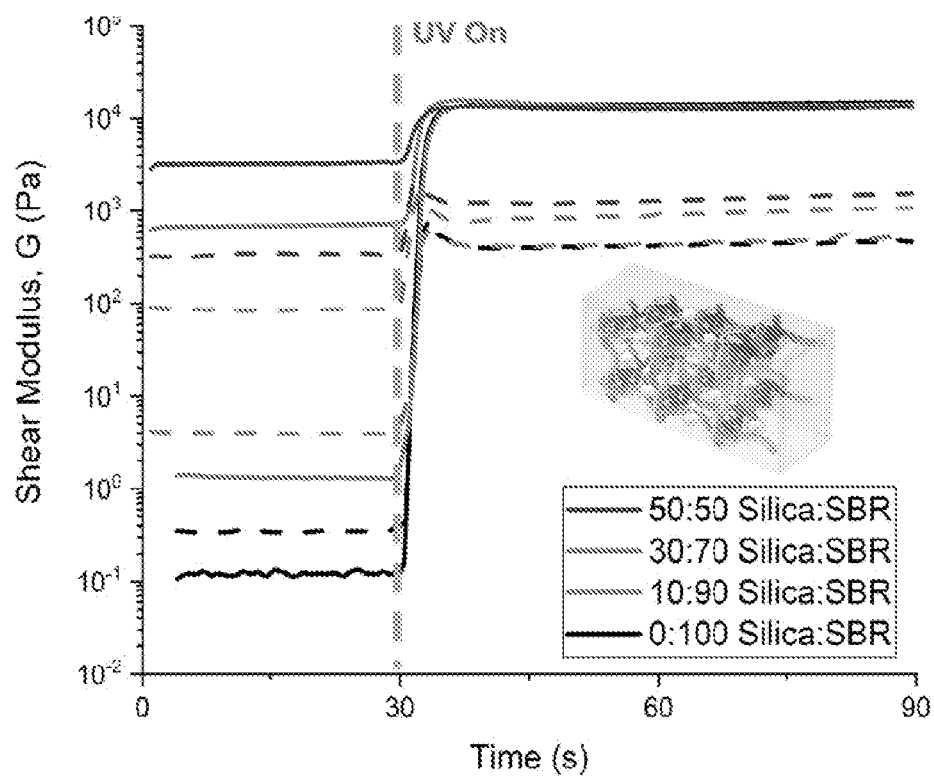
FIG. 30B is a plot of photorheology showing rapid photocuring at both low and high silica contents. Irreversible solidification evident by increase of shear storage (-) and loss (---) modulus, with crossovers evident for liquid 10:90 and 0:100 Silica:SBR samples.

While often utilized in lieu of these rheological transitions[53], photocrosslinking introduced a second, irreversible solidification mechanism for the hybrid colloids, thus establishing a multi-faceted processing window for UV-assisted DIW. Photocrosslinking further increased the strength of the deposited material, sufficient to support the weight of subsequently deposited layers. Additionally, the increased strength enabled handling of the greenbody and minimizes warping during removal from the printer for drying. FIGS. 30A-30B illustrates the photoactivated crosslinking chemistry which produced a scaffold network in the continuous phase around the particles and permanently solidified the colloid. This "green body" state comprised a water-swollen hydrogel embedded with both SBR and silica particles. FIG. 30B details photorheological measurements across all investigated Silica:SBR mass ratios. These measurements occurred at low oscillatory strains (0.2%), and therefore the higher-silica colloids displayed solid-like behavior prior to UV irradiation at the 30-second mark. Upon irradiation, both G' and G" rapidly increase, with liquid samples achieving permanent crossovers within 5 s.

Figure 30C:
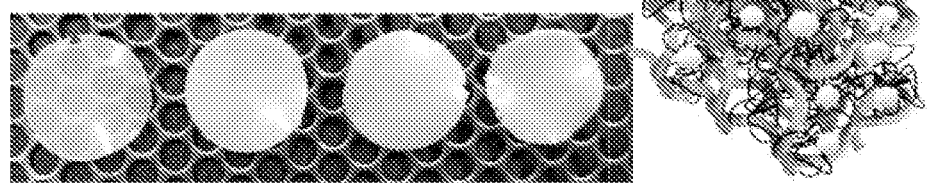
FIG. 30C is an image of dried nanocomposite IPN films with 0:100, 10:90, 30:70, and 50:50 Silica:SBR, from left to right.

Observed in our previous investigations[69], drying of greenbodies in vacuo enabled the SBR particles to coalesce with each other throughout the photocrosslinked scaffold, yielding a semi-interpenetrating network (sIPN). The loss of discrete mesoscale SBR phases decreased the scattering of visible light and the networks became translucent. FIG. 30C shows this same occurrence for the unfilled sample, however the silica-loaded sIPN's exhibited increasing opacity with silica concentration. Because the individual particles were too small to scatter visible light, evidenced by their formation of clear dispersions in water, their opacity suggested silica aggregation to mesoscale or greater dimensions which will be discussed further.

Designing hybrid colloids on a particle-by-particle basis, rather than as composite or encapsulated particles synthesized via miniemulsion, enables precise tuning of composition and final filler content. Thermogravimetric analysis confirmed silica loading from 0 to 46 wt % (for 0:100 and 50:50, respectively) in the final sIPN nanocomposite, tuned through facile mixing of pure SBR and aqueous silica dispersions. Hybrid colloids comprised 40 wt % solids (silica and SBR), approximately 10 wt % liquid scaffold precursors (NVP, PEGDA), and 50 wt % water. After water removal, the final sIPN comprised approximately 80 wt % Silica/SBR and 20 wt % photocrosslinked scaffold network. The latter remained constant across all colloid compositions and provided sufficient green body modulus for printing (~$10^4$–$10^5$ Pa).

For this work, the allure of inorganic nanofillers centered on their potential to strongly direct and reinforce (thermo) mechanical properties of elastomers. By combining the modular tunability and processing advantages of hybrid colloids with the functional effects of nanofillers, this approach introduced the capability to process high-performance and functional materials at low temperatures and forces and with the geometric complexity characteristic of 3D printing. Dynamic mechanical analysis (DMA) probed the thermomechanical effects of nanosilica incorporation to latex-formed sIPN structures. Targeting different silica concentrations enabled tuning of the reinforcement of the rubbery plateau tensile modulus (E') by over three orders of magnitude. Our previous investigations of these sIPN's demonstrated shifting of the SBR glass transition temperature ($T_g$) due to phase mixing with the photocrosslinked scaffold through which it interpenetrated.[69] The $T_g$'s for the nanocomposite sIPN's, as observed by a maximum in the tan δ, remained generally consistent with the unfilled sIPN, yet significantly broadened with higher silica concentrations due to increased interactions between the silica interfaces the sIPN network.

Figure 31A:
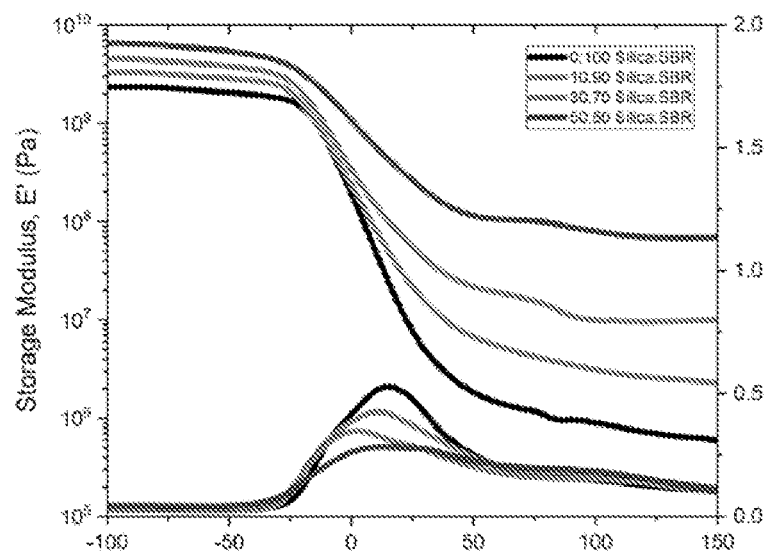
FIGS. 31A-31D show (FIG. 31A) Dynamic mechanical analysis and (FIG. 31B) tensile analysis confirm silica reinforcement of sIPN nanocomposites.
Figure 31B:
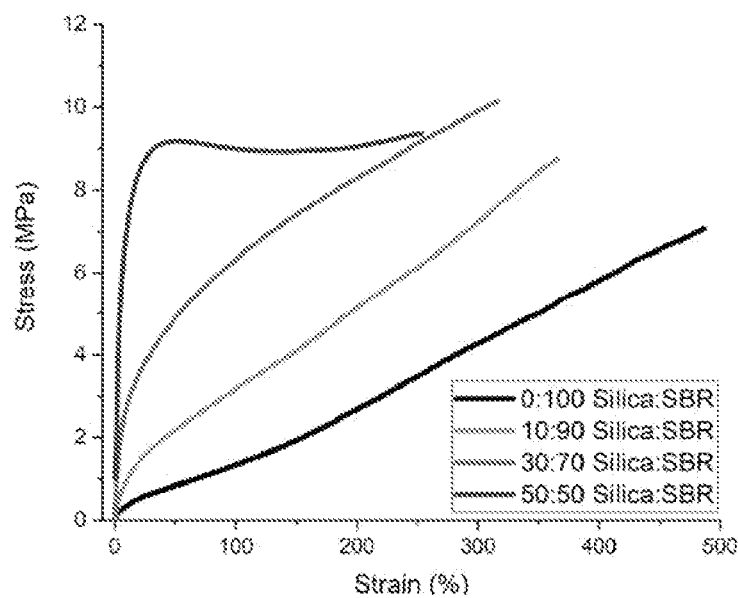
Figure 31C:
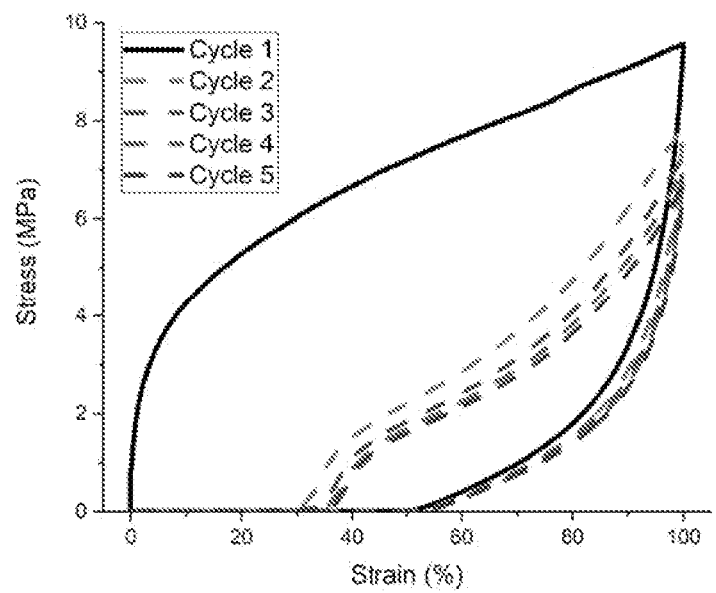
Figure 31D:
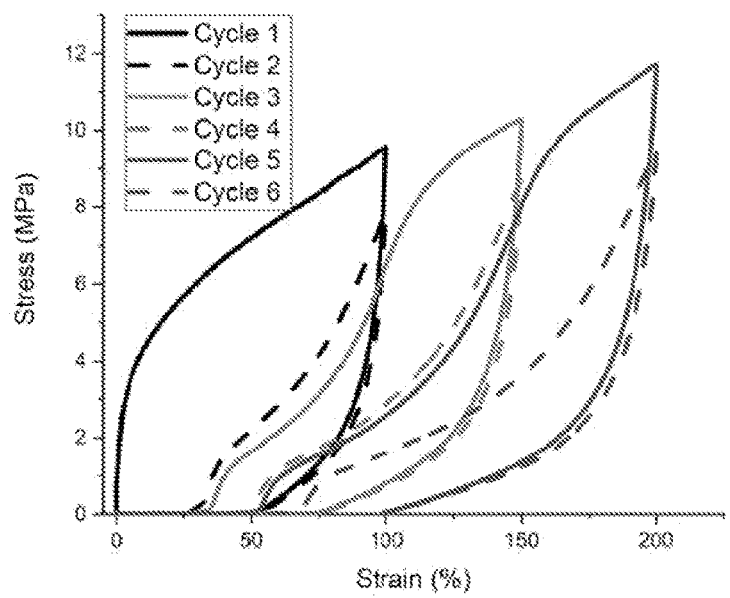
Figures 32A, 32B, 32C, 32D, 32E, 32F, 32G, 32H:
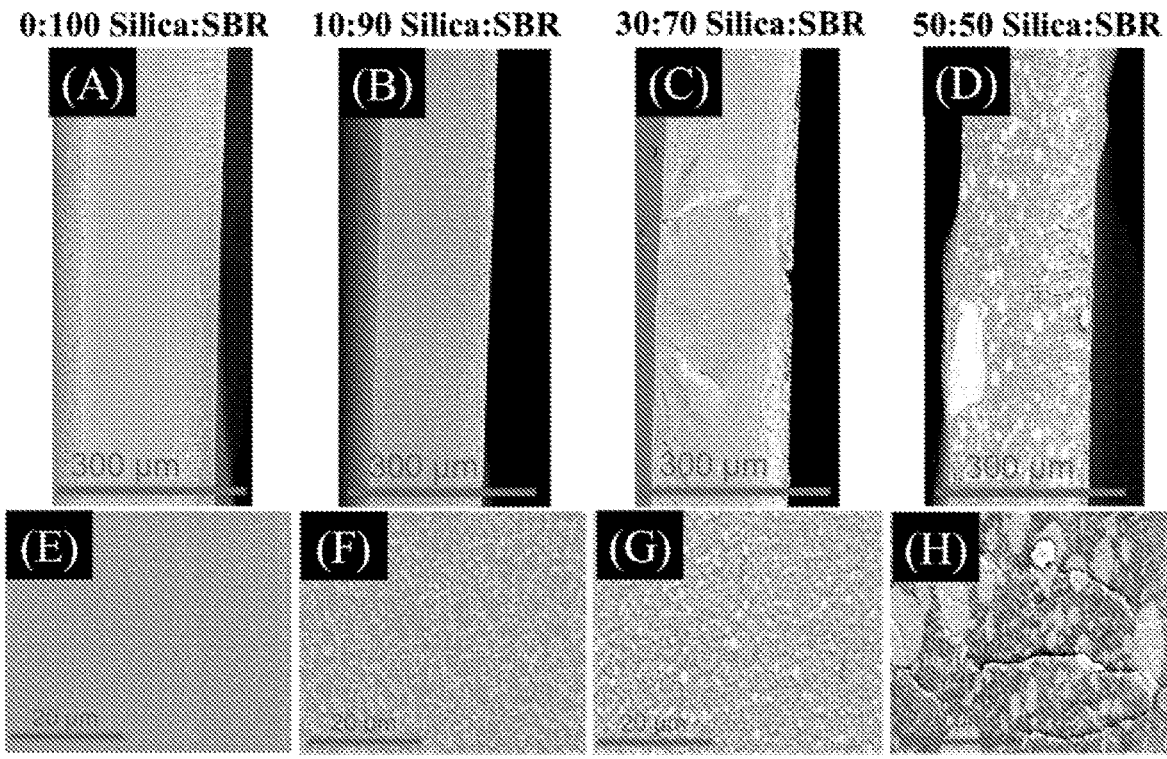
FIGS. 32A-32H show SEM analysis of freeze-fractured surfaces of IPN nanocomposites at compositions.

Tensile analysis (FIG. 31B) confirmed ultimate strains above 300% for all sIPN's nanocomposites up to 30:70 Silica:SBR loading. However, the highly filled 50:50 Silica:SBR composition displayed lower ultimate strains and stresses which may be due to the large silica aggregates formed at this composition (see FIGS. 32A-32H). Young's modulus and ultimate stress also significantly increased with silica concentration. Previously, cyclic tensile experiments examined the reversible elongation of the unfilled system which exhibited some plastic deformation and strain softening attributed to the slippage of uncrosslinked SBR chains and breakage of the photocrosslinked scaffold. Cyclic tensile experiments of 30:70 both at a static 100% strain maximum (FIG. 31C) and progressively increased (100%, 150%, 200%) maximum strains (FIG. 31D) show significant softening of the composite observed as lower stresses upon reloading/unloading (Cycles 2,4,6) than during the first loading to each strain (Cycles 1,2,3). This observation closely resembles the Mullins effect, which is a viscoelastic effect exaggerated by the presence and breakage of filler structures.[77]

Scanning electron microscopy (SEM) of freeze-fractured surfaces offered insight into the size and distribution of silica particles throughout the sIPN. FIGS. 32A-32H contains SEM micrographs for loadings from the unfilled (0:100 Silica:SBR) to the highest filled (50:50 Silica:SBR) compositions. Imaging of backscattered electrons enabled strong contrast between the silica aggregates and polymer matrix. Energy dispersive X-ray spectroscopy (EDS) provided elemental analysis to confirm the chemical identity of imaged structures based on relative concentrations of carbon, oxygen, and silicon. As discussed previously, opacity increased with silica loading which suggested aggregation beyond the 12 nm diameter of individually dispersed silica nanoparticles. Silica aggregates clearly appeared for all filled systems, with a trend toward larger sizes for higher silica concentrations. SEM confirms the presence of uniquely large aggregate at 50:50 Silica:SBR. However, both 10:90 and 30:70 Silica:SBR exhibited evenly distributed microscale dispersions of silica. It is important to note that only the larger silica aggregates are visible via SEM and therefore these micrographs do not preclude the presence of individually dispersed silica nanoparticles. Because DLS does not provide evidence of micron-scale particles, silica aggregation likely occurs during either the photocuring or drying/coalescence stages. The latter is a more probable explanation as coalescence and penetration likely provide sufficient mobility and force to drive aggregation of previously dispersed silica nanoparticles. However, this method of sIPN formation from latex is unprecedented beyond our own work, and future investigations are necessary to better understand this mechanism.

As discussed, DIW printing focused on the 30:70 and 50:50 Silica:SBR hybrid colloid compositions due to exhibiting their appropriate shear yield stress behavior. In agreement with predictions based on the rheological tests, both inks were extrudable at moderate pressures and, upon deposition, maintained their as-deposited shape, maintaining shape fidelity over the timescale required to print a single layer. UV irradiation then photocured the paste into a robust solid green body capable of supporting subsequent layers. Thus, DIW fabricated three-dimensional objects in a layer-by-layer approach which, upon water removal in vacuo, generated elastic sIPN nanocomposite geometries.

Figure 33:
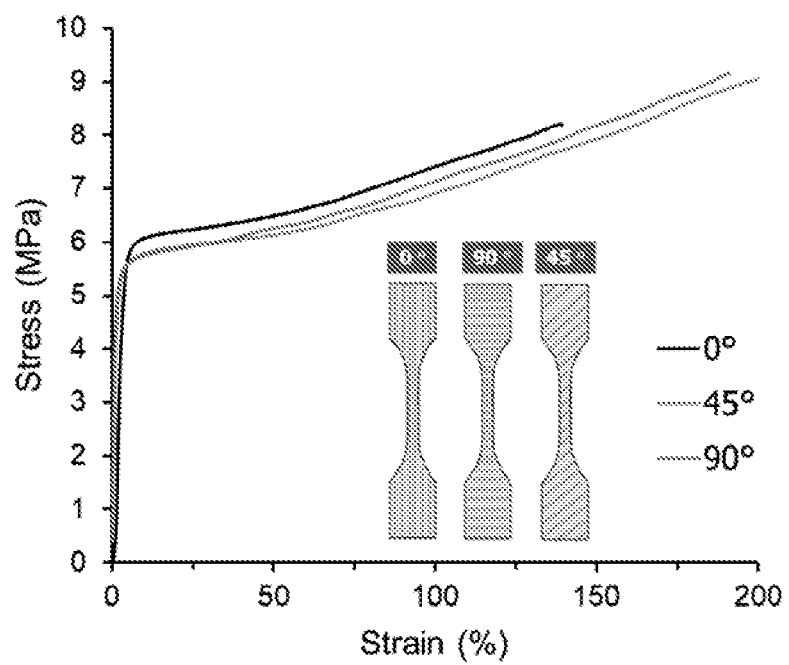
FIG. 33 is a graph of the tensile analysis showing comparable performance for DIW-printed dogbones (30:70 Silica:SBR) with x-y layers printed at 0°, 45°, and 90° with respect to the elongation direction.
Figure 33A:
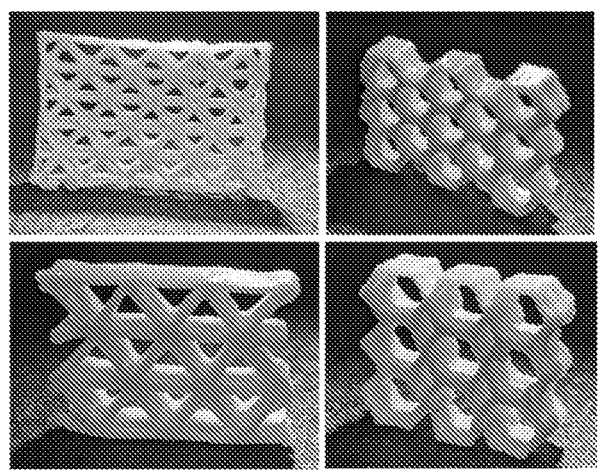
Figure 33B:
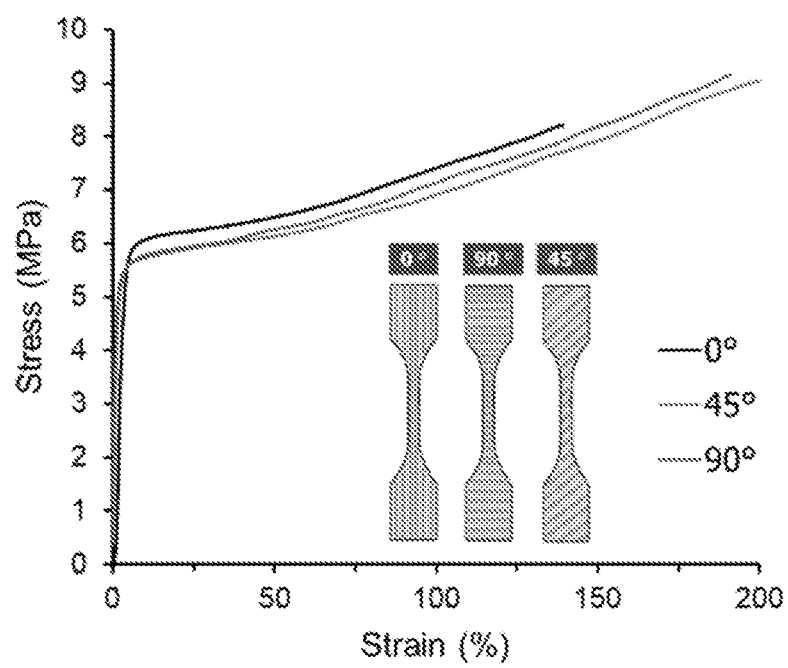

Unlike mask-projection VP, which fabricates entire layers simultaneously, the extrusion-based approach of DIW yields interfaces within the x-y layers of objects in addition to the z direction (height). Therefore, the orientation of filaments within the x-y layers can lead to anisotropy of mechanical properties due to the presence of weak interfaces between filaments. The transition of latex-based printing to UV-DIW opens the opportunity to study the effect of polymer particle 3D coalescence on process-induced anisotropy. FIG. 33B illustrates design and tensile curves for UV-DIW-printed dogbones with x-y interfaces at 0°, 45°, and 90° with respect to the tensile direction. All specimens followed similar stress-strain profiles and exhibited comparable ultimate strains, which suggested minimal effect of filament direction for printed nanocomposite sIPN's.

CONCLUSIONS

Photocurable hybrid colloids present a modular and highly tunable system for 3D printing multi-component materials. Hybrid colloid design on a particle-by-particle basis (rather than composite particles) allows for precise, independent loading of inorganic fillers (silica) into the final nanocomposite, and the concomitant bimodal distribution strongly directs the colloid's rheological behavior and accesses new possibilities for AM platform selection beyond VP. Shear-dependent liquid-solid transitions in concert with irreversible continuous-phase photocrosslinking generates a unique processing window for UV-DIW printing which enables the fabrication of shape with subsequent photocuring to generate robust, stackable green body layers. The full implications of this unique processing window remain to be explored in future work. Upon water removal, SBR polymer particle coalescence throughout the photocrosslinked scaffold and around silica nanoparticles generates nanocomposites which exhibit well-dispersed silica aggregates and significant reinforcement to (thermo)mechanical properties while retaining high ultimate strains and reversible deformation. Isotropic polymer particle coalescence throughout printed objects appears to mitigate concerns of anisotropy due to filament orientation. In sum, the design of photocurable hybrid colloids simultaneously introduced tunable combinations of high molecular weight elastomer and silica nanofillers with suitable processability for UV-DIW to enable the generation of 3D architectures of high-performance elastomer nanocomposites.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim:

1. A method of additive manufacturing of an article, the method comprising:
   a) photopolymerizing a resin composition to form a green body, the resin composition comprising
      i. a polymer colloid comprising a discontinuous polymer phase comprising polymer particles and a continuous solvent phase;
      ii. one or more photocrosslinkable scaffold precursors; and
      iii. a photoinitiator;
      wherein the green body comprises a photocrosslinked network of the scaffold precursors having the polymer particles entrapped and dispersed therein;
   b) drying the green body to produce the article, wherein the drying results in penetration of the polymer from the polymer particles through the scaffold and coalescence of the polymer between the polymer particles.

2. The method according to claim 1, wherein the polymer particles comprise a polymer having a number average molecular weight of about 100 kg mol$^{-1}$ to about 5000 kg mol$^{-1}$.

3. The method according to claim 1, wherein the polymer particles comprise a dispersible polymer selected from the group consisting of polycarbonates, polymethacrylates, polystyrenes, polyamides, polyurethanes, poly(ethylene terephthalate), poly(lactic acid), poly(glycolic acid), polyhydroxybutyrate, polydioxanones (including 1,4-dioxanine), δ-valerolactone, 1-dioxepanones (including 1,4-dioxepan-2-one and 1,5-dioxepan-2-one), polyesters, poly(ethylene glycol), (poly(ethylene oxides), polyacrylamides, vinyl polymers, silk, collagen, alginate, chitin, chitosan, hyaluronic acid, chondrontin sulfate, glycosaminoglycans, poly(hydroxyethyl methacrylate), polyvinylpyrrolidone, poly(vinyl alcohol), poly(acrylic acid), polyacetate, polycaprolactone, poly(propylene, glycol)s, poly(amino acids), copoly(etheresters), poly(alkylene oxalates), polyamides, poly(iminocarbonates), polyoxaesters, polyorthoesters, polyphosphazenes, polypeptides and copolymers, block copolymers, homopolymers, blends and combinations thereof.

4. The method according to claim 1, wherein the polymer particles comprise an elastomer.

5. The method according to claim 4, wherein the elastomer is selected from the group consisting of natural rubber, polyisoprene rubber, styrenic copolymer elastomers (which includes those elastomers derived from styrene and at least one other monomer, elastomers that include styrene-butadiene (SB) rubber, styrene-butadiene-styrene (SBS) rubber, styrene-ethylene-butadiene-styrene (SEBS) rubber, styrene-ethylene-ethylene- styrene (SEES) rubber, styrene-ethylene-propylene-styrene (SEPS) rubber, styrene- ethylene-ethylene-propylene-styrene (SEEPS) rubbers, styrene propylene-styrene (SPS) rubber, and others, all of which may optionally be hydrogenated), polybutadiene rubber, nitrile rubber, butyl rubber, and olefinic elastomer including ethylene-propylene-diene rubber (EPDM) and ethylene-octene copolymers, and copolymers and blends thereof.

6. The method according to claim 1, wherein the polymer particles comprise one or both of high $T_g$ polymer and a polymer selected from the group consisting of a poly(arylether), polyester, a polyamide, acrylate polymers including poly(methacrylate) and poly(methyl methacrylate) and copolymers thereof.

7. The method according to claim 1, wherein the polymer particles comprise polymers having a $T_g$ of about 300° C. or less.

8. The method according to claim 1, wherein the polymer particles comprise a polymer having a $T_g$ below a thermal degradation temperature of the photocrosslinked network of the scaffold precursors.

9. The method according to claim 1, wherein the particles have an average diameter of about 50 nm to about 1 μm.

10. The method according to claim 1, wherein the solvent phase comprises water or other aqueous solvents, organic solvents, or a mixture thereof.

11. The method according to claim 1 wherein the polymer particles comprise alkene containing polymers selected from the group consisting of homopolymers and copolymers containing the monomers butadiene, isoprene, dicyclopentadiene (DCPD), ethylidene norbornene (ENB), vinyl norbornene (VNB), and chloroprene.

12. The method according to claim 1, wherein the polymer particles comprise polymers having pendant acidic functionality some of which has been converted to ionic functionality via reaction with a base including mono- and multivalent salts, hydroxide salts, amine-containing compounds, carbonate salts, hydrides, and nitrogenous bases.

13. The method according to claim 1, wherein the polymer particles comprise polymers having pendant basic functionality some of which has been converted to ionic functionality with an acid including hydrogen halides, carboxylic acids, sulfuric acid, ammonium-containing compounds, carbonic acids, citric acid, acetic acid, and phosphoric acid.

14. The method according to claim 1, wherein the photocrosslinkable scaffold precursors comprise crosslinkable groups selected from the group consisting of hydrogen halides, carboxylic acids, sulfuric acid, ammonium-containing compounds, carbonic acids, citric acid, acetic acid, and phosphoric acid.

15. The method according to claim 1, wherein the photoinitiator is a ultraviolet free radical photoinitiator including diphenyl(2, 4, 6-trimethylbenzoyl) phosphine oxide (TPO), lithium phenyl-2,4,6-trimethylbenzoylphosphinate (LAP), oligo(2-hydroxy-2-methyl-1-(4-1-methylvinyl)phenyl)propanone), 2-hydroxy-2-methyl-1-phenyl-1-propanone, 2,4,6-trimethylbenzophenone, 4-methylbenzophenone, 2,2-dimethoxy-1,2-diphenylethanone, 2-butoxy-1,2-diphenylethanone, 2(2-methyl propoxy)-1,2-diphenrylethanone, benzophenone, 2-alpha hydroxy ketone, other benzophenone derivatives or mixtures thereof.

16. The method according to claim 1, wherein a weight ratio of the polymer material to the scaffold precursor material is about 2:1 to about 20:1.

17. The method according to claim 1, wherein drying the green body is done at a temperature above a glass transition temperature of the polymer in the polymer particles.

18. The method according to claim 1, wherein the article has a $T_g$ that is within 25% of a theoretical prediction of the Tg using the Fox method and based on random copolymers of the polymer and neat scaffold.

19. The method according to claim 1, wherein the polymer colloid further comprises inorganic particles; and
   wherein the coalescence of the polymer results in the inorganic particles being encapsulated and dispersed within the polymer.

20. The method according to claim 19, wherein the inorganic particles comprise silica, carbon particles, metal particles, and ceramic particles.

* * * * *